United States Patent
Lolla et al.

(10) Patent No.: US 11,320,552 B2
(45) Date of Patent: *May 3, 2022

(54) ENHANCED SURVEILLANCE OF SUBSURFACE OPERATION INTEGRITY USING NEURAL NETWORK ANALYSIS OF MICROSEISMIC DATA

(71) Applicant: ExxonMobil Upstream Research Company, Spring, TX (US)

(72) Inventors: Sri Venkata Tapovan Lolla, Houston, TX (US); Jeffrey R. Bailey, Houston, TX (US); Simona O. Costin, Calgary (CA); Michael S. Hons, Calgary (CA); Helen Yam, Calgary (CA); Arslan Akhmetov, St. Johns (CA); Tim W. Hayward, Calgary (CA); Richard J. Smith, Calgary (CA); Colum M. Keith, Cochrane (CA); Marc-Andre P. Chen, Calgary (CA); Xinlong Liu, Calgary (CA)

(73) Assignee: ExxonMobil Upstream Research Company, Spring, TX (US)

(*) Notice: Subject to any disclaimer, the term of this patent is extended or adjusted under 35 U.S.C. 154(b) by 421 days.

This patent is subject to a terminal disclaimer.

(21) Appl. No.: 16/447,560

(22) Filed: Jun. 20, 2019

(65) Prior Publication Data

US 2019/0324166 A1 Oct. 24, 2019

Related U.S. Application Data

(63) Continuation-in-part of application No. 16/271,203, filed on Feb. 8, 2019, now Pat. No. 10,921,471.

(Continued)

(51) Int. Cl.
*G01V 1/28* (2006.01)
*G06N 3/08* (2006.01)

(52) U.S. Cl.
CPC ............... *G01V 1/288* (2013.01); *G06N 3/08* (2013.01); *G01V 2210/1234* (2013.01)

(58) Field of Classification Search
CPC .... G01V 1/288; G01V 1/30; G01V 2210/123; G01V 2210/65; E21B 49/00; E21B 43/2406; E21B 47/06; E21B 47/065
See application file for complete search history.

(56) References Cited

U.S. PATENT DOCUMENTS

| | | | |
|---|---|---|---|
| 6,049,508 A * | 4/2000 | Deflandre | G01V 1/42 367/48 |
| 2003/0067843 A1 | 4/2003 | Therond et al. | |

(Continued)

OTHER PUBLICATIONS

Aminzadeh, F et al. (2011) "Artificial Neural Network Based Autopicker for Micro-Earthquake Data," *Seg Technical Program Expanded Abstracts*, pp. 1623-1625.

(Continued)

*Primary Examiner* — Yong-Suk (Philip) Ro
(74) *Attorney, Agent, or Firm* — Leandro Arechederra, III

(57) ABSTRACT

Methods are disclosed for monitoring operation integrity during hydrocarbon production or fluid injection operations. According to the methods, received microseismic data is processed to obtain a plurality of data panels corresponding to microseismic data measured over a predetermined time interval. For each data panel, trigger values are calculated for data traces corresponding to sensor receivers of the microseismic monitoring system. At least one data panel is selected as a triggered data panel that satisfies predetermined triggering criteria. A value is calculated for each of at least two event attributes of a plurality of event attributes of the event. An event is classified into at least one event category of a plurality of event categories based on the event score. Related non-transitory computer usable mediums are also disclosed.

22 Claims, 26 Drawing Sheets

Related U.S. Application Data

(60) Provisional application No. 62/649,924, filed on Mar. 29, 2018.

(56) References Cited

U.S. PATENT DOCUMENTS

| | | | | |
|---|---|---|---|---|
| 2009/0299637 | A1* | 12/2009 | Dasgupta | G01V 1/40 702/12 |
| 2012/0120767 | A1* | 5/2012 | Vu | G01V 1/50 367/31 |
| 2014/0123748 | A1* | 5/2014 | Airey | E21B 43/26 73/152.58 |
| 2014/0169172 | A1* | 6/2014 | Hu | H04W 28/18 370/236 |
| 2016/0124100 | A1 | 5/2016 | Rawles et al. | |

OTHER PUBLICATIONS

Lin, B. et al. (2018) "Automatic Classification of Multi-Channel Microseismic Waveform Based on DCNN-SPP," v. 159, pp. 446-452.

Maity, D. et al. (2013) "Fracture Characterization in Unconventional Reservoirs Using Active and Passive Seismic Data With Uncertainty Analysis Through Geostatistical Simulation," pp. 1-16.

Bailey, J. R. et al. (2008) "Passive Seismic Data Management and Processing to Monitor Heavy Oil Steaming Operations," *Soc. of Petro. Eng.*, SPE/PS/CHOA 117484, PS2008-379, Calgary, AB, CA, Oct. 20-23, 2008, 10 pages.

Bohnhoff, Marco et al. (2017) "M4ShaleGas—Measuring, Monitoring, Mitigating and Managing the Environmental Impact of Shale Gas Seismic Sensors and Data Evaluation for Leakage Detection Authors and Affiliation," *M4ShaleGas*, (XP055586632), pp. 1-31.

Boone, T. J. et al. (1999) "Microseismic Monitoring for Fracturing in the Colorado Shales above a Thermal Oil Recovery Operation," (ARMA-99-1069) *Rock Mechanics for Industry*, ISBN9058090523, pp. 1069-1076.

Duncan, P. M. et al. (2010) "Reservoir Characterization using Surface Microseismic Monitoring," *Geophysics*, v.75, No. 5, pp. 75A139-75A146.

Fei, T. et al. (1995) "Finite-Difference Solutions of the 3-D Eikonal Equation," *SEG*, SMig1.1, pp. 1129-1132.

Qin, F. et al. (1990) "Solution of the Eikonal Equation of a Finite-Difference Method," *SEG Expanded Abstracts*, SD1.6, pp. 1004-1007.

Talebi, S. et al. (2007) "Microseismic Detection of Casing Failures at a Heavy Oil Operation," U.S. Rock Mechanics Symposium, American Rock Mechanics Association (ARMA-07-208), 7 pages.

Tan, Jeff et al. (2007) "Analysis and Classification of Microseismic Events," *University of Clagary Crewes*, pp. 1-3, 7-8, 10-12.

Urbancic, Ted et al. (2015) "Microseismic Monitoring Applications in Heavy Oil Reservoirs Microseismic Monitoring: How It Works," pp. 38, 40.

Warpinski, N. R. et al. (2010) "Source-Mechanism Studies on Microseismicity Induced by Hydraulic Fracturing," *Soc. of Petro. Eng.*, SPE 135254, Florence, Italy, Sep. 19-22, 2010, 18 pages.

Withers, R. J. et al. (1996) "Fracture Development During Cuttings Injection Determined by Passive Seismic Monitoring," *SEG Expanded Abstracts*, 4 pages.

Withers, R. J. et al. (1998) "Siesmic Imaging of Cotton Valley Hydraulic Fractures," *SEG Expanded Abstracts*, 4 pages.

Zinno, R. (1998) "Overview: Cotton Valley Hydraulic Fracture Imaging Project," *SEG Expanded Abstracts*, 4 pages.

\* cited by examiner

ENHANCED SURVEILLANCE OF SUBSURFACE OPERATION INTEGRITY USING NEURAL NETWORK ANALYSIS OF MICROSEISMIC DATA

CROSS-REFERENCE TO RELATED APPLICATIONS

This application is a Continuation-In-Part (CIP) of U.S. patent application Ser. No. 16/271,203, filed Feb. 8, 2019, titled "ENHANCED SURVEILLANCE OF SUBSURFACE OPERATION INTEGRITY USING MICROSEISMIC DATA," which claims the priority benefit of U.S. Patent Application No. 62/649,924 filed Mar. 29, 2018, titled ENHANCED SURVEILLANCE OF SUBSURFACE OPERATION INTEGRITY USING MICROSEISMIC DATA, the entirety of which is incorporated by reference herein.

BACKGROUND

Field of Disclosure

The present disclosure relates generally to processes and methods to monitor the integrity of subsurface operations related to the recovery of hydrocarbons from, and the injection of fluids and waste material into, the subsurface. More specifically, the disclosure relates to using microseismic data to monitor well integrity, geomechanics, and other parameters during oil and gas production operations.

Description of Related Art

This section is intended to introduce various aspects of the art that may be associated with the present disclosure. The discussion is meant to provide a framework to facilitate a better understanding of particular aspects of the present disclosure. Accordingly, it should be understood that this section should be read in this light, and not necessarily as an admission of prior art.

In oil and gas production operations, particularly those involving Enhanced Oil Recovery (EOR) techniques and other types of fluid injection, human activity may impact stress distribution in the subsurface. For example, in thermal injection processes such as Cyclic Steam Stimulation (CSS), Steam-Assisted Gravity Drainage (SAGD), and variations of these processes, the high-pressure, high-temperature steam injected into a reservoir may generate thermal stresses around the well and areas adjacent to the injection site. The overburden may also experience shear stresses due to reservoir dilation resulting from the injection of steam. Formation dilation and geomechanical stresses may also arise from the injection of water, gas, and other fluids, such as carbon dioxide from carbon capture and storage (CCS) or slurrified waste injection operations. In the absence of appropriate risk mitigation measures, these stresses may cause casing or liner failures, casing or liner slips, cement micro-fractures or de-bonding, fluid incursions, breaching to surface, and other operation integrity problems. The microseismic waves generated from such events can be recorded and analyzed to evaluate operation integrity. As such, these types of events are hereafter referred to as "microseismic" events.

Microseismic events are low-scale seismic disturbances often caused by human activity (to be distinguished from large-scale seismic events generated by earthquakes and other natural causes). Microseismic events are typically $10^4$ to $10^6$ times lower in magnitude than the natural earthquakes that can be felt at the Earth's surface. Because of the link between operation integrity issues and microseismic events, passive microseismic monitoring has become an important tool to monitor subsurface conditions. Passive microseismic monitoring relies on sensitive devices that are able to detect relatively low-intensity seismic waves in the ground. While seismic activity in the subsurface near the wellbores may result from multiple factors involving not only human activity but also natural causes, microseismic monitoring technology has evolved to provide sufficiently accurate data for trained operators to distinguish and identify potential casing failures, subsurface fractures, and other events threatening the integrity of production operations.

The industry has progressed microseismic monitoring technology since the early 1990's. R. J. Withers and R. Dart describe a program to evaluate a hydraulic fracture treatment in *Seismic Imaging of Cotton Valley Hydraulic Fractures* (SEG 1998-0968). This field experiment was also presented in *Overview: Cotton Valley Hydraulic Fracture Imaging Project* by R. Zinno, J. Gibson, R. N. Walker, and R. J. Withers (SEG 1998-0926). R. J. Withers and S. Rieven describe a permanent monitoring system to evaluate fracture growth of a waste injection operation in *Fracture Development During Cuttings Injection Determined by Passive Seismic Monitoring* (SEG 1996-0106). The relationship of the recorded event data to the source mechanism has been investigated, for example, in *Source-Mechanism Studies on Microseismicity Induced by Hydraulic Fractures* (SPE-135254, 2010). Previous publications related to the present subject matter include: S. Talebi, M Cote, and R. J. Smith, *Microseismic Detection of Casing Failures at a Heavy Oil Operation*, U.S. Rock Mechanics Symposium, American Rock Mechanics Association (ARMA-07-208) 2007; T. J. Boone, S. Nechtschein, R. J. Smith, D. Youck, and S. Talebi, *Microseismic Monitoring for Fracturing in the Colorado Shales above a Thermal Oil Recovery Operation* (ARMA-99-1069); and J. R. Bailey, R. J. Smith, C. M. Keith, K. H. Searles, and L. Wang, *Passive Seismic Data Management and Processing to Monitor Heavy Oil Steaming Operations* (SPE-117484, 2008), the contents of all of which are incorporated in their entirety by reference herein.

Throughout these and other applications, a common theme has been the challenge created by the vast quantity of recorded data generated by several dozen sensors recording acoustic data (microseismic data) continuously at 2,000 samples per second, or more. Current microseismic monitoring systems generate enormous amounts of data that require multiple hours of manual review by trained operators each day. Consequently, a need exists for systems and methods to more efficiently analyze and classify microseismic data gathered during oil and gas production and other injection operations to quickly identify and isolate significant incidents that may affect operations and require corrective action.

SUMMARY

In an example, the present disclosure provides a computer-implemented method for monitoring operation integrity during hydrocarbon production or fluid injection operations. The method may comprise detecting microseismic waves in a subsurface area of operation using a seismic monitoring system; receiving, from the seismic monitoring system, microseismic data representative of the microseismic waves; processing the microseismic data to obtain a plurality of data panels corresponding to microseismic data measured over a predetermined time interval; determining, with a neural network analysis implemented on the computer, whether any of the plurality of data panels includes a noise event or a non-noise event; for data panels including a non-noise event, then calculating, for each data panel, trigger values for data traces corresponding to sensor receivers of the microseismic monitoring system; selecting, as a triggered data panel, at least one data panel that satisfies predetermined triggering criteria; selecting, as a non-trivial data panel containing microseismic data representative of an event, at least one triggered data panel that satisfies spectral density criteria; calculating a value for each of at least two event attributes of a plurality of event attributes of the event; determining an event score based on the values of the plurality of event attributes; and classifying the event into at least one event category of a plurality of event categories based on the event score.

According to the disclosed aspects, determining whether any of the plurality of data panels includes a noise event or a non-noise event may include determining a number of data levels to be used in the neural network analysis, and for each dataset, adjusting a number of data levels associated with each dataset to match the determined number of data levels, wherein each dataset is associated with a respective array of seismic receivers. The adjusting may include adding data levels to the dataset, the added data levels having neutral data values or zeroed data values therein. Additionally or alternatively, the adjusting may include discarding data levels in the dataset by calculating, for each trace of each data level, short-time (STSD) and long-time (LTSD) moving standard deviations of data in said each trace, calculating STSD-to-LTSD ratios (SLR) for each trace, identifying a maximum SLR and a location of the maximum SLR for each trace, calculating a frequency threshold for each trace such that a predetermined portion of energy of said each trace is contained below the frequency threshold, and discarding a data level if the frequency threshold is below a cutoff frequency for at least 50% of the traces in the data level. If, after discarding the data level, the number of the remaining data levels exceeds the determined number of data levels, it is determined which data level of the remaining data levels has a lowest maximum SLR, and said data level is discarded. This process is repeated until the number of the remaining data levels equals the determined number of data levels. It may be determined whether a moveout attribute exists for each trace, the moveout attribute being the maximum SLR and its location, and the moveout attribute may be fed into the neural network analysis. The moveout attribute may also include a maximum STSD value over the standard deviation of said each trace, and the location of the maximum STSD value. Additionally, noise spikes may be identified and fed into the neural network analysis.

The plurality of event attributes may comprise magnitude, proximity, polarity, P/S ratio, and SH/SV ratio. Magnitude in turn may comprise at least one of peak particle velocity, energy flux, moment flux, and RPPV (Range×Peak Particle Velocity). Further, proximity may comprise at least one of: distance between event location and sensor receivers, distance between event location and offset wellbores, distance between event location and wellbore intervals, distance between event location and reservoir layers, and distance between event location and natural fractures or faults.

The method may further comprise validating the event classification using at least one type of non-seismic operational surveillance data, such as wellhead pressures, injection rates, delta flow-pressure alarms, nitrogen soak trends, wellhead temperature, casing head pressure, casing head temperature, downhole pressure, downhole temperature, injection flow rate, and production flow rate. In some embodiments, processing the microseismic data to obtain a plurality of data panels may comprise dividing the microseismic data in data segments of specified length; and dividing the data segments into the data panels. In yet other embodiments, the trigger values may be calculated using an STA/LTA analysis, absolute amplitude thresholding, relative amplitude thresholding, wavelet transform calculations, or a combination thereof.

The predetermined triggering criteria may comprise that at least one data panel has overlapping triggered time windows for data from at least two sensor receivers; or that at least one data panel has overlapping triggered time windows for data from at least two sensor receivers and that at least one of the triggered sensor receivers has at least two triggered channels. In yet other embodiments, the non-trivial data panel may be selected using a spectral density selection criteria, such that the 90% cumulative spectral density of the data lies below 300 Hz.

In other embodiments, calculating a value for each of at least two event attributes of a plurality of event attributes may comprise determining an event location; and using the event location to calculate at least one of the values. Event location may be determined based on P-wave arrivals on at least two sensor receivers; or P-wave arrivals on at least two sensor receivers and an S-wave arrival on at least one sensor receiver. In some examples, event location may be used to calculate a proximity value by determining at least one of a distance between event location and sensor receivers, a distance between event location and offset wellbores, distance between event location and wellbore intervals, a distance between event location and reservoir layers, and distance between event location and natural fractures or faults.

In another example, determining an event score may comprise calculating a score for the at least two event attributes; and combining the scores for at least two event attributes. Determining an event score may in turn comprise calculating a magnitude score, a polarity score, a proximity score, an SH/SV score, and a P/S score; and adding the magnitude score, polarity score, proximity score, SH/SV score, and P/S score to obtain the event score. The plurality of event categories may comprise casing failure, casing slip, Continuous Microseismic Radiation (CMR) event, heel event, heave event, cement crack, surface noise, and rod noise. In some embodiments, the method may further include adjusting one or more operation parameters of the hydrocarbon production or fluid injection operations based on the event category. The operation parameters comprise fluid injection rate, fluid injection pressure, nitrogen injection rate, and nitrogen injection pressure. If the event category is a casing failure, a casing integrity check may be performed.

In another example, a method for monitoring operation integrity during hydrocarbon production or fluid injection operations is provided. The method includes: detecting microseismic waves in a subsurface area of operation using a seismic monitoring system; receiving, from the seismic monitoring system, microseismic data representative of the microseismic waves; processing, with a computer, the microseismic data to obtain a plurality of data panels corresponding to microseismic data measured over a predetermined time interval; determining, with a neural network analysis implemented on the computer, whether any of the plurality of data panels includes a noise event or a non-noise event; for data panels including a non-noise event, calculating with the computer, for each data panel, trigger values for data traces corresponding to sensor receivers of the microseismic monitoring system; selecting with the computer, as a triggered data panel representative of an event, at least one data panel that satisfies predetermined triggering criteria; calculating, with the computer, a value for each of at least two event attributes of a plurality of event attributes of the event; and using, with the computer, a classification algorithm to classify the event into at least one event category of a plurality of event categories based on the values.

In still another example, a method for monitoring operation integrity during hydrocarbon production or fluid injection operations is provided. The method includes: detecting microseismic waves in a subsurface area of operation using a seismic monitoring system; receiving, from the seismic monitoring system, microseismic data representative of the microseismic waves; processing, with a computer, the microseismic data to obtain a plurality of data panels corresponding to microseismic data measured over a predetermined time interval; determining, with a neural network analysis implemented on the computer, whether any of the plurality of data panels includes a noise event or a non-noise event; for data panels including a non-noise event, calculating with the computer, for each data panel, trigger values for data traces corresponding to sensor receivers of the microseismic monitoring system; selecting with the computer, as a triggered data panel, at least one data panel that satisfies predetermined triggering criteria; selecting with the computer, as a non-trivial data panel containing microseismic data representative of an event, at least one triggered data panel that satisfies spectral density criteria; determining, with the computer, an event location; and using, with the computer, the event location to classify the event into at least one event category of a plurality of event categories.

In yet another example, a computer-implemented method for monitoring operation integrity during hydrocarbon production or fluid injection operations may comprise detecting microseismic waves in a subsurface area of operation using a seismic monitoring system; receiving, from the seismic monitoring system, microseismic data representative of the microseismic waves; processing the microseismic data to obtain a plurality of data panels corresponding to microseismic data measured over a predetermined time interval; determining, with a neural network analysis implemented on the computer, whether any of the plurality of data panels includes a noise event or a non-noise event; for data panels including a non-noise event, then calculating, for each data panel, trigger values for data traces corresponding to sensor receivers of the microseismic monitoring system; selecting, as a triggered data panel, at least one data panel that satisfies predetermined triggering criteria; selecting, as a non-trivial data panel containing microseismic data representative of an event, at least one triggered data panel that satisfies spectral density criteria; calculating a value for each of at least two event attributes of a plurality of event attributes of the event; and using a classification algorithm to classify the event into at least one event category of a plurality of event categories based on the values. Using the classification algorithm may comprise first training the classification algorithm using a training dataset of microseismic data corresponding to known event types; and next using the trained classification algorithm and the values for the at least two event attributes to classify the event. The classification algorithm may be a Decision Tree, a Discriminant Analysis, a Support Vector Machine, a k-Nearest Neighbor Classifier, an Ensemble-based classifier, or a Neural Network.

In still another example, a method is provided for identifying an event during hydrocarbon production or fluid injection operations using microseismic data. The method includes: detecting microseismic waves in a subsurface area of operation using a seismic monitoring system; receiving, from the seismic monitoring system, microseismic data representative of the microseismic waves; determining, with a neural network analysis implemented on a computer, whether any portion of the microseismic data includes a noise event or a non-noise event; and for portions of the microseismic data including a non-noise event, classifying, with the computer, the event into at least one event category of a plurality of event categories. Determining whether any portion of the microseismic data includes a noise event or a non-noise event comprises: determining a number of data levels to be used in the neural network analysis; and for each dataset, adjusting a number of data levels associated with each dataset to match the determined number of data levels; each dataset being associated with a respective array of seismic receivers; using the computer, determining whether a moveout attribute exists for each trace, wherein the moveout attribute comprises the maximum SLR and the location of the maximum SLR; using the computer, identifying noise spikes; and feeding the moveout attribute and the identified noise spikes into the neural network analysis.

The foregoing has broadly outlined the features of the present disclosure so that the detailed description that follows may be better understood. Additional features will also be described herein.

BRIEF DESCRIPTION OF THE DRAWINGS

FIG. 7A presents the Easting-Northing view; FIG. 7B shows the Easting-Depth view; and FIG. 7C provides the Northing-Depth view.

FIG. 10A shows a symmetric error function resulting from travel time differences; FIG. 10B shows an asymmetric error function from the inclination angle differences; FIG. 10C shows the error function in plan view resulting from azimuth angle differences; FIG. 10D is a plan view of the composite (or total) error map.

Figure 1A:
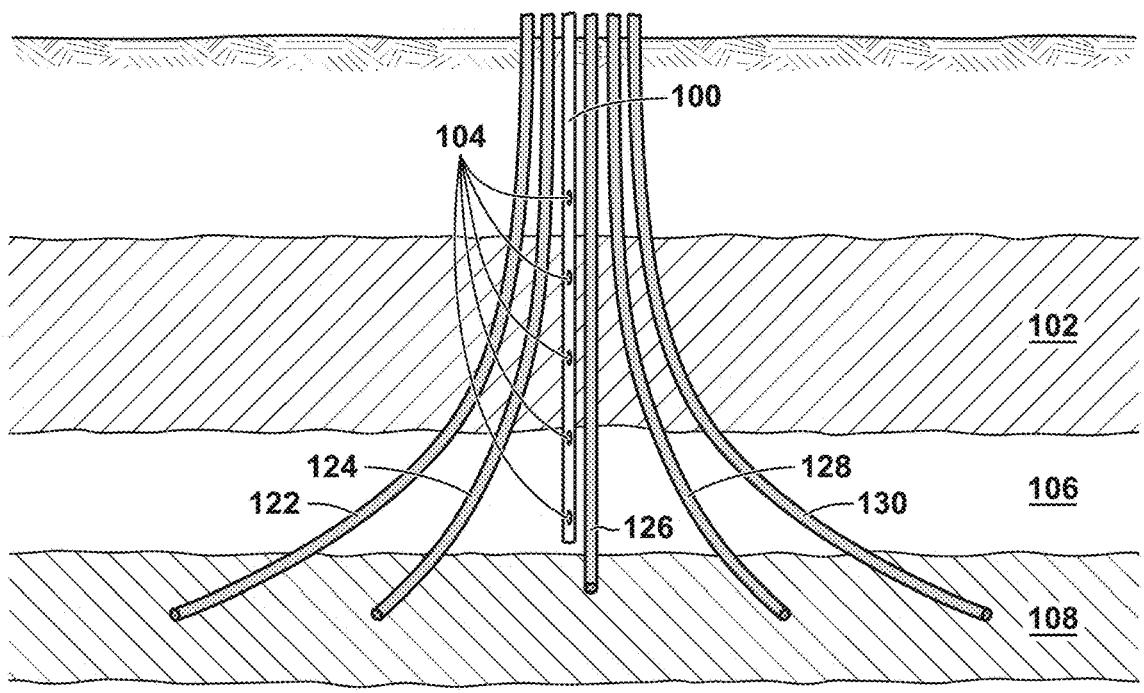
FIG. 1A is a simplified diagram of an exemplary monitoring well associated with a seismic monitoring system.

It should be noted that the figures are merely examples and no limitations on the scope of the present disclosure are intended thereby. Further, the figures are generally not drawn to scale, but are drafted for purposes of convenience and clarity in illustrating various aspects of the disclosure. Certain features and components herein may be shown exaggerated in scale or in schematic form and some details of conventional elements may not be shown in the interest of clarity and conciseness. In addition, for the sake of clarity, some features not relevant to the present disclosure may not be shown in the drawings.

DETAILED DESCRIPTION

To promote an understanding of the principles of the disclosure, reference will now be made to the features illustrated in the drawings. No limitation of the scope of the disclosure is hereby intended by use of specific language. Any alterations and further modifications, and any further applications of the principles of the disclosure as described herein are contemplated as would normally occur to one skilled in the art to which the disclosure relates. When referring to the figures described herein, the same reference numerals may be referenced in multiple figures for the sake of simplicity.

Definitions

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The terms "including" and "comprising" are used in an open-ended fashion, and thus, should be interpreted to mean "including, but not limited to."

The term "seismic sensor" refers to a device capable of measuring or detecting seismic vibrations or waves and transmitting a corresponding electronic signal. Examples include, but are not limited to, geophones (which measure ground velocity) and accelerometers (which measure ground acceleration). Hereafter, the terms "seismic sensor" and "channel" may be used interchangeably.

The term "sensor receiver" refers to a plurality of seismic sensors arranged or connected so as to detect seismic vibrations or waves along multiple directions. Sensors oriented along at least three coordinate axes are required to determine the motion in three dimensions. A recording of three or more traces, or channels, from a seismic sensor receiver may be referred to as a "trace set".

The term "seismic sensor array" or "sensor array" refers to a plurality of seismic sensors or a plurality of sensor receivers arranged in a particular geometric configuration (e.g., circular, linear, etc.) to optimize detection range and facilitate locating the source of seismic events.

The term "P-wave" refers to a type of seismic wave characterized in that the direction of wave propagation is the same as the direction of particle movement.

The term "S-wave" refers to a type of seismic wave characterized in that the direction of wave propagation is perpendicular to the direction of particle movement.

The term "data acquisition system" or "DAS" refers to a system capable of receiving and sampling seismic data from sensors or sensor receivers (typically in analog form), converting analog signals into digital signals, and receiving and storing the resulting digital signals suitable for computer processing and analysis.

The term "monitoring well" refers to a wellbore in the ground made by drilling or inserting a conduit into the subsurface to introduce one or more seismic sensors, sensor receivers, and/or sensor arrays to monitor seismic activity in the vicinity of a region of interest, such as a plurality of producing wells or injection sites. A monitoring well may be a dedicated well for the sole purpose of monitoring, or it may have been converted temporarily or permanently from a production or injection well. In some cases, the monitoring well may concurrently be a production or injection well if so designed and constructed.

The term "microseismic event" refers to any source of seismic activity or disturbances detectable by a passive monitoring system. Examples include, but are not limited to, well integrity events such as casing breaks or failures, casing slips, cement cracks, or continuous microseismic radiation (CMR), small harmonic tremors, as well as other events surrounding a wellbore or injection site, such as shear-dominated events and other surface events. The terms "seismic event" and "acoustic event" may be used interchangeably with the term "microseismic event."

The articles "the," "a" and "an" are not necessarily limited to mean only one, but rather are inclusive and open ended so as to include, optionally, multiple such elements.

The terms "approximately," "about," "substantially," and similar terms are intended to have a broad meaning in harmony with the common and accepted usage by those of ordinary skill in the art to which the subject matter of this disclosure pertains. These terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

The phrases "for example," "as an example," and/or simply the terms "example" or "exemplary," when used with reference to one or more components, features, details, structures, methods and/or figures according to the present disclosure, are intended to convey that the described component, feature, detail, structure, method and/or figure is an illustrative, non-exclusive example of components, features, details, structures, methods and/or figures contemplated in the present disclosure. Thus, the described component, feature, detail, structure, method and/or figure is not intended to be limiting, required, or exclusive/exhaustive; and other components, features, details, structures, methods and/or figures, including structurally and/or functionally similar and/or equivalent components, features, details, structures, methods and/or figures, are also within the scope of the present disclosure. Any embodiment or aspect described herein as "exemplary" is not to be construed as preferred or advantageous over other embodiments.

Where two or more ranges are used, any number between or inclusive of these ranges is implied.

Microseismic Data Acquisition

Thermal injection and solvent-assisted processes are commonly employed in recovering bitumen and heavy oil from underground reservoirs such as oil sands. For example, a well can be drilled in an oil sand reservoir and steam, hot gas, solvents, or a combination thereof, can be injected to release the hydrocarbons. In Cyclic Steam Stimulation (CSS), for instance, steam may be injected into the well at fracturing or below fracturing pressure and allowed to permeate the reservoir for a period of time to permit the steam and condensed water to heat the viscous oil. The thinned oil is then pumped out of the well and the cycle repeated. In Steam Assisted Gravity Drainage (SAGD), a plurality of horizontal wells may be drilled in the heavy oil reservoir and high pressure steam injected into the upper well(s) to reduce the oil viscosity and allow it to drain to lower wellbores for production. Other variants of thermal recovery processes exist that facilitate recovery of heavy oil from oil sands. Solvent-assisted processes, which rely on solvent injection to mobilize viscous oil instead of thermal means, may also be conducted in cycles of injection and production. Both hydrocarbon recovery through thermal injection and solvent-assisted processes are cost-effective ways to produce heavy oil from oil sands, where the high viscosity of bitumen is an obstacle to economic production. Similarly, produced water and slurrified waste may be injected underground into formations for disposal, and there is recent interest in sequestering carbon dioxide from power plants and other sources with subsequent injection for permanent disposal. However, steam, water, waste slurries, carbon dioxide, and other injectants may alter the physical state of the overburden and surrounding formations that may affect operation integrity.

Processes and methods described herein improve the efficiency and reliability of passive seismic monitoring of oil production and fluid injection operations, including those involving extraction of heavy oil and bitumen from oil sands. Aspects of the automated monitoring processes and methods described herein increase the integrity of recovery or injection processes by providing early detection of microseismic events of interest including those indicative of well-integrity events (e.g. casing failures), as well as providing tools for evaluation of undesirable fracturing of the formations above the production interval. Whereas alternating injection and production of fluids into a reservoir occurs in cyclic production processes, disposal of water, waste, and carbon dioxide may also be conducted as injection-only operations that may increase pressure underground, and seismic monitoring may further help understand containment of these fluids. Seismic monitoring of such operations may be used in combination with additional monitoring technologies, including but not limited to: surface seismic monitoring; surface deformation monitoring using GPS, tiltmeters, and satellite interferometry; downhole tiltmeter monitoring; downhole pressure recording; downhole formation displacement measurement; and combinations thereof.

Specifically, to monitor operation integrity using underground seismicity, one or more dedicated monitoring wells may be installed in the vicinity of producing wells or other injection sites as part of a passive seismic monitoring system. It should be understood that, while systems described herein may be referred to as passive seismic systems, the waveforms may be described as microseismic waves because they are most typically of very low amplitude relative to common terminology regarding seismic waves. For example, microseismic waves relevant to applications described herein may have a Richter magnitude of about −1 to −3, whereas seismic tremors are typically felt at the surface at about +3 magnitude, or many orders of magnitude greater than microseismic events. Accordingly, passive seismic in this disclosure may also be referred to as microseismic monitoring interchangeably.

A simplified diagram of an exemplary monitoring well installation of a microseismic monitoring system is illustrated in FIG. 1A. In this example, a monitoring well 100 is installed at a production site. As shown in FIG. 1, the monitoring well 100 may be installed at a central location within a group of producing wells 122, 124, 126, 128, and 130. An array of seismic sensor receivers 104 may be placed within a certain depth of the monitoring well. In this example, the sensor array 104 is located at depths spanning the intermediate formation 102 and the rock layer 106 separating the intermediate formation 102 and a reservoir 108. The seismic sensor receiver array 104 includes 5 sensor receivers, but it should be understood that sensor arrays may include any number of seismic sensors or sensor receivers, and other wellbore and or surface geometries are envisioned within the scope of this invention.

Although individual geophones or accelerometers may be employed, tri-axial receiver arrangements may be preferable to monitor seismic events in three directions. Specifically, tri-axial geophone and accelerometer receivers are designed to detect seismic vibrations and transmit a voltage signal indicative of velocity and acceleration, respectively, of the earth movement, along three axes. With three or more such sensors arranged in an appropriate pattern, a three-dimensional recording of the wave propagation is feasible. The monitoring well 100 may preferably include between 5 and 12 tri-axial receivers comprising 15 to 36 individual sensors, or more, that record microseismic data continuously at about 2,000 to 3,000 samples per second. Sensors and sensor receivers in the sensor array 104 may be located at different depths within the monitoring well 100. In some instances, sensor receivers within the sensor array 104 may be spaced uniformly along the length of the monitoring well 100, typically tens of meters apart.

It should be noted, however, that passive monitoring systems may rely on other types of sensors and sensor arrays, including without limitation, fiber-optic sensor strings for distributed acoustic sensing, and hydrophone sensor strings. In addition, sensor systems that record only one component of the acoustic signal may be arranged in a different sensor pattern to be able to locate the source of the acoustic event, as described, for example, in P. Duncan et al., *Reservoir Characterization Using Surface Microseismic Monitoring*, Geophysics, 75(5) pp. 75A139-75A146 (2010), the contents of which are incorporated in their entirety by reference herein. Deployment of the sensor array 104 underground may be implemented in any advantageous geometric pattern designed to detect passive waves within a specified area and from any direction.

Figure 1B:
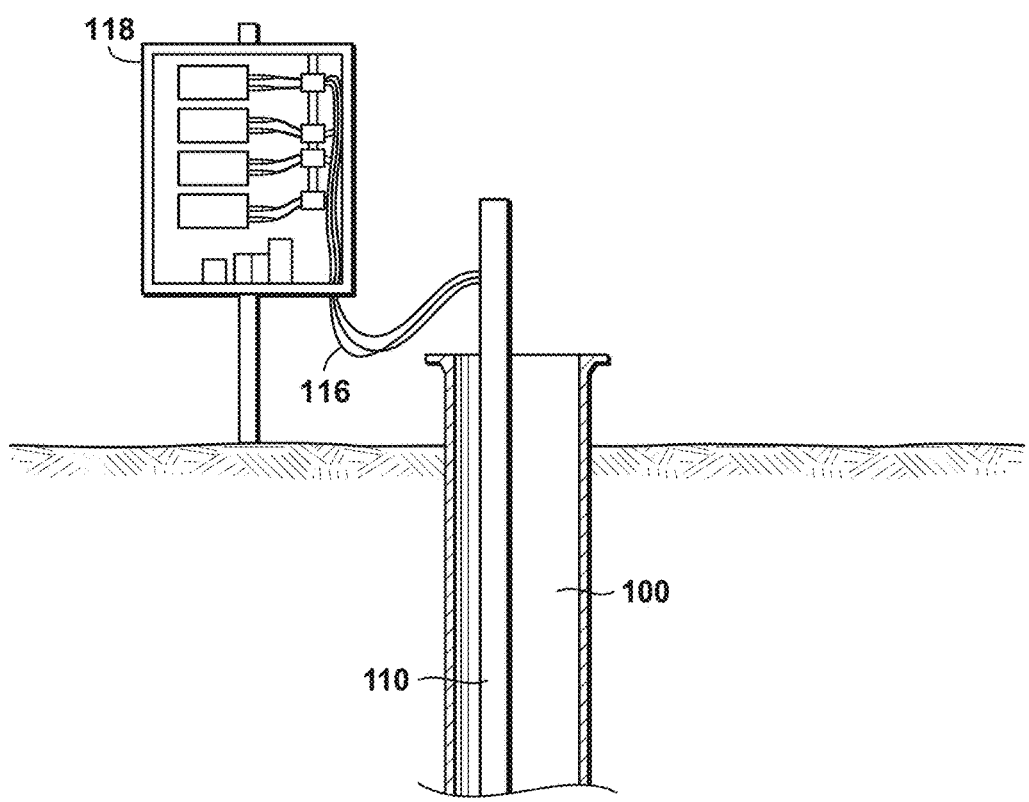
FIG. 1B is a simplified diagram of an exemplary configuration of surface components of a seismic monitoring system.

FIG. 1B is a simplified diagram of surface equipment at the wellhead of a microseismic monitoring well 100. Sensor receivers may be mounted on a coiled tubing 110 and cemented in place for the purpose of maintaining the desired position and orientation of the sensor receivers within the monitoring well 100. Alternatively, the sensor receivers may be run on a cable and clamped to the wellbore in a retrievable configuration. The sensor receivers may be connected to instrumentation cables 116 that may run to a junction or instrumentation box 118 near the surface of the well 100. The instrumentation box 118 may be connected or otherwise communicate with a computer located near the well 100 or in a control building nearby. The instrumentation box 118 and the computer constitute the data acquisition system (DAS) in this example. Both cemented and retrievable arrays may also be equipped with means for running a distributed fiber optic sensing system that may record downhole temperature.

Figure 2:
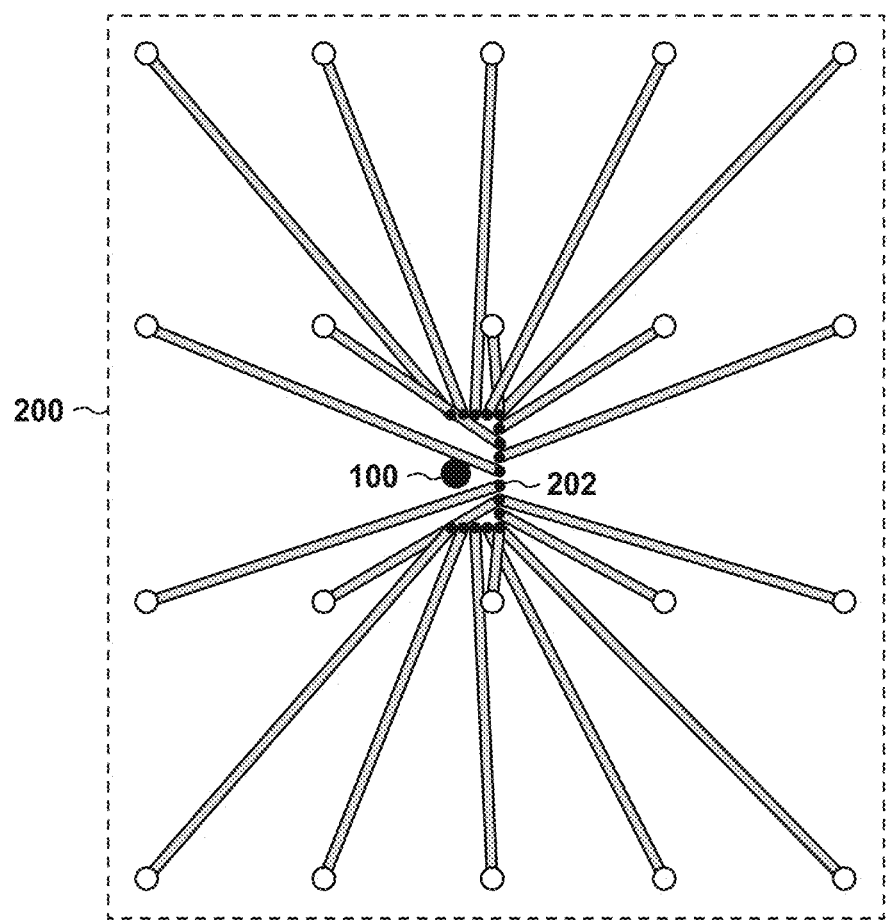
FIG. 2 is a top view of an exemplary well pad configuration including a monitoring well and twenty production wells.

Monitoring wells may be strategically positioned in a variety of configurations suitable for both monitoring producing operations and injection-only operations. With respect to producing operations, FIG. 2 shows a simplified diagram of an exemplary arrangement of producing wells around a monitoring well—i.e., a well "pad." In this production operations example, the well pad 200 may consist of any number of producing wells grouped for monitoring purposes. In one embodiment, the number of producing wells may range between 10-30 wells depending on the distance between the wells. The location and path of the monitoring well 100 may be designed such that the producing wellbores of the well pad 200 are within a distance suitable for signal detection. In some embodiments, this distance may be about 150 meters from the monitoring well 100, through the intermediate formation intervals or, alternatively, any depth range of interest. This criterion has been adopted in some embodiments because acoustic event magnitudes of −3 have been associated with events of interest and have also been observed at a range up to 150 meters from the monitoring well. Monitoring wells may vary in size and depth, but are often subvertical and terminate several meters above the producing interval which can become hotter than the temperature limits of the sensors. In some instances, abandoned production wells may be used for temporary or permanent monitoring systems, after appropriate cool down and following an appropriate workover to prepare the well for monitoring. In other instances, observation wells that are used to monitor subsurface pressure may also be used for removable seismic arrays. In large production fields there can be up to a hundred, or more, monitoring systems installed in production pads.

In the exemplary illustration of FIG. 2, well pad 200 includes twenty producing wells and monitoring well 100 roughly positioned at the center of the well pad 200. In this instance, the producing wells' wellheads are arranged at the surface in a pattern indicated by 202. The distance between wells at the surface may vary, but typically ranges from 5 meters or less to more than 15 meters. The distance between the monitoring well 100 and any given producing well of the well pad 200 typically varies with depth. For example, in FIG. 2, the producing wells incline and diverge away from the monitoring well 100 at increasing depths. Although illustrated as a symmetrical pattern of 5×4 wells at the subsurface, it should be understood that seismic monitoring systems contemplated herein include those designed to monitor well pads and injection sites of varying geometrical configurations (symmetrical and asymmetrical) and any number of producing wells or injection sites. In production operations, the producing wells may be active or inactive, vertical or non-vertical. It should be noted that in this context there is no distinction between production and injection wells. Indeed, in the CSS process, each wellbore is used for both production and injection.

The monitoring well 100 may be positioned anywhere within well pad 200, preferably at a position that maximizes monitoring seismic waves from producing wells at the well pad 200. In a preferred pad geometry, the monitoring well may be placed at a location such that the azimuth angle to each of the monitored wells is different, to provide a span of azimuth angles to each of the wellbores through the depth range of greatest interest, which may be a formation at an intermediate depth, which has the capacity to contain fluids in the event of incidental fluid losses. Similar principles are applicable to injection-only applications involving injection site pads.

Upon installing a microseismic monitoring system within a monitoring well, a controlled set of events may be generated at known locations so as to allow the sensor receivers to be calibrated. In this calibration process, surface and/or downhole acoustic sources may be recorded by the monitoring system. The recorded data may be collected and analyzed to determine the orientation of the axes of the recording system. This calibration allows the orientation of the acoustic wave to be determined as it impinges on the receiver system. In the absence of such calibration, or if there are less than three orthogonal axes in the receivers, the arrival time of a microseismic wave may be the only measurement that is available to determine the location of the event source, which may be acceptable for some array geometries. However, with the benefit of a tri-axial receiver array, the angular orientations of the P- and S-waves may be determined in horizontal and vertical planes. These orientations are of significant value in algorithms used to determine the source location.

Data management issues from large-scale networks of microseismic monitoring systems may be challenging. In some networks, a central server may receive data from each well pad or injection site pad and make the data available for downloading from a simple webpage. Each day, pre-packaged bundles of event data and pad statistics may be downloaded from the central server to a server located at the offices of data analysts. However, the vast amount of data may require hours of manual sorting and analysis to extract the required information from the data.

Exemplary Microseismic Event Classes

Figure 3A:
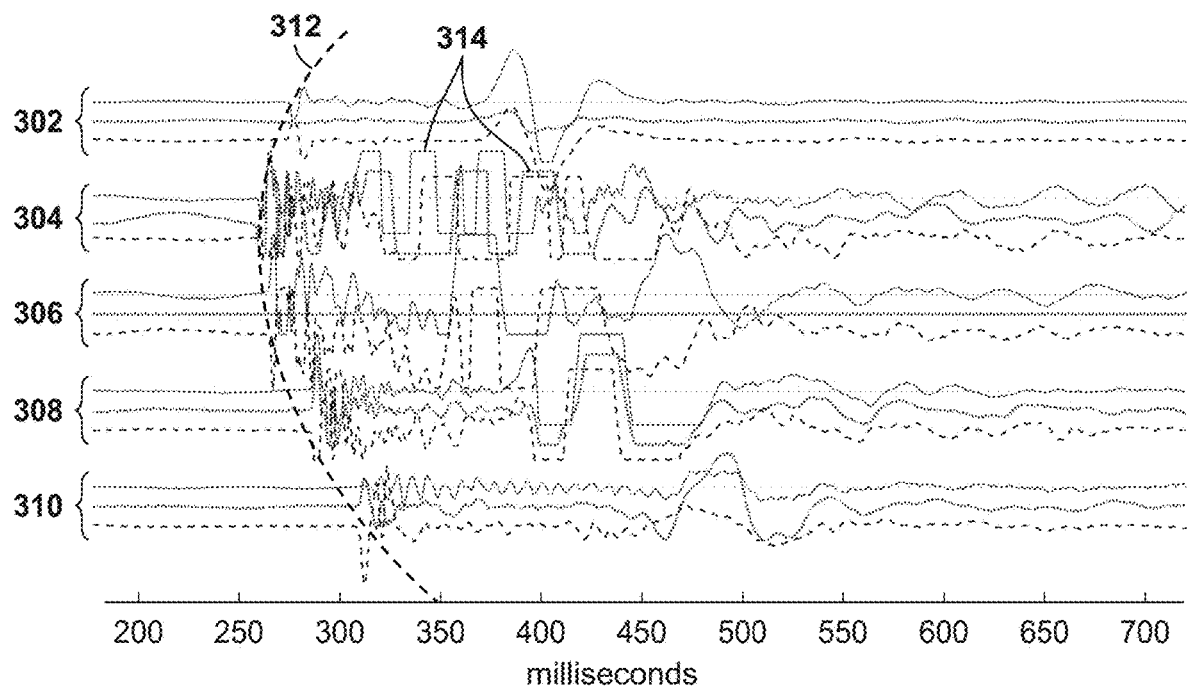
FIG. 3A shows an exemplary microseismic data segment associated with a casing failure event.

According to some aspects of the present disclosure, the characteristic pattern observed in seismic data resulting from particular acoustic events may be employed to automate and expedite the interpretation of microseismic data. For example, FIG. 3A shows an exemplary seismic data segment corresponding to a casing failure event, a type of well-integrity event often of immediate interest to production operations. Casing break events, sometimes also referred to as "casing failures," are often characterized by high energy, typically with comparable distributions of P- and S-wave components at some receiver sensors. In particular, with reference to FIG. 3A, the data segment may comprise five trace sets 302, 304, 306, 308, and 310, each corresponding to data generated by a sensor receiver. In this illustration, each sensor receiver is a tri-axial receiver comprising three seismic sensors, so each trace set includes three data traces corresponding to the three orthogonal directions along which the sensors detect microseismic waves. In this instance, the data segment is about 550 milliseconds long. As can be appreciated from the exemplary data segment, P- and S-waves may be comparable in energy at certain receivers, and different at other receivers, according to the orientation of the event and the corresponding acoustic radiation pattern.

An additional aspect that may be relied upon by an automated system to distinguish between events of interest may be the "moveout" pattern associated with the P-wave arrivals on different sensor receivers of a single array of the monitoring well. For example, FIG. 3A shows a moveout pattern (generally along line 312) observed as a result of a casing failure event. This casing failure event illustrates the convex acoustic event moveout pattern corresponding to wave propagation described by the Eikonal equation in which arrivals at more distant sensors are delayed by the acoustic wave travel time in the corresponding media. In this case, the P-wave arrival is observed first by a sensor receiver that is not located at an extreme position within the sensor array, thus suggesting the event occurred somewhere within the span of the array. The data segment of this example suggests that the sensor receiver corresponding to trace set 304 is the closest receiver to the event and the sensor receiver corresponding to trace set 310 is farthest away from the event. Estimates of an event's location depend on calculations of travel time that include the speed of propagation of the P-wave and S-wave components through each formation interval, which depend on the formation properties, and the angles of impingement of the arrival at each receiver.

An additional aspect that may be relied upon by an automated system to identify high-energy events, such as casing failures, is a clipped waveform recorded by the sensor receivers, examples of which are indicated by 314 in FIG. 3A. In heritage microseismic recording systems such as 12- or 14-bit systems, the presence of clipping may indicate a high-magnitude microseismic event. In one embodiment, the recording gains of the receivers at different depths may be set with high sensitivity in the intermediate formations and lower sensitivity at the top and bottom of the array. In this configuration, detection is improved in the interval of interest and arrival times may be determined. Recordings from the receivers at the top and bottom, using lower amplitude gain values, may not clip, thus providing higher fidelity data for the purpose of determining event incidence angles. However, modern 24-bit systems may not clip for even large microseismic events for most values of system gains because of the increased dynamic range of the recording system.

Figure 3B:
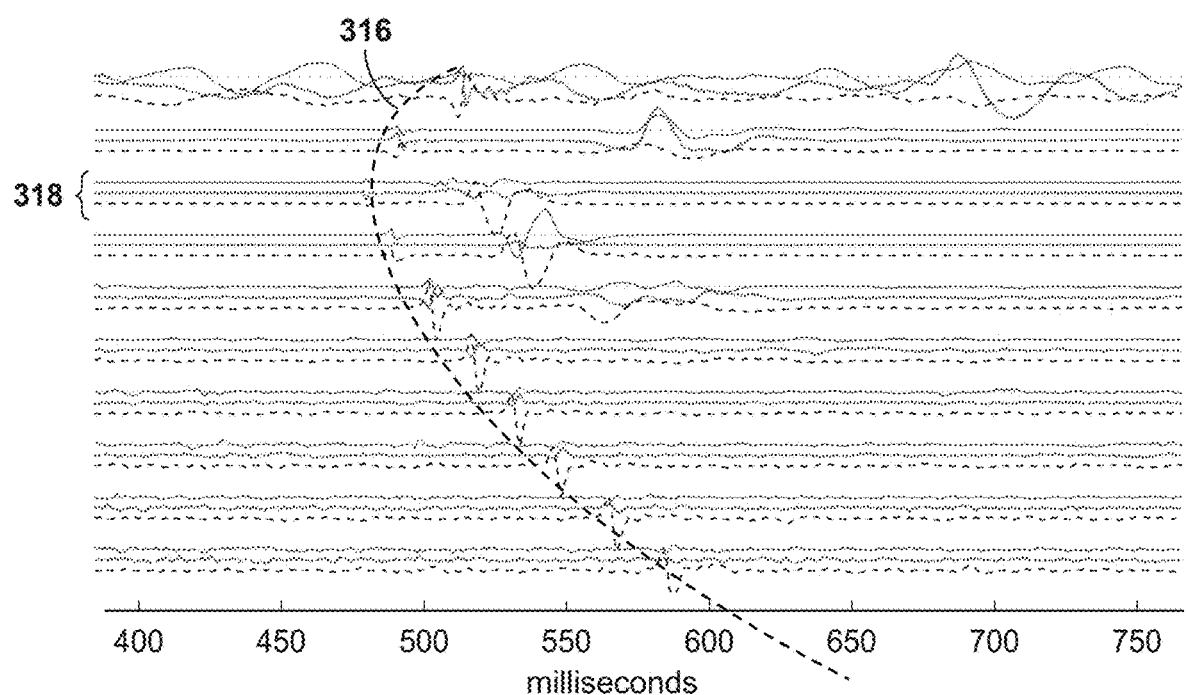
FIG. 3B shows an exemplary microseismic data segment associated with a casing slip event.

Other microseismic events of interest may be visually characterized by different P-wave and S-wave arrivals, moveout patterns, etc. For instance, FIG. 3B shows an exemplary data segment corresponding to a "casing slip" event, caused by a slip of production casing relative to surface casing. This data segment is approximately 350 milliseconds long and includes 10 trace sets corresponding to data gathered by an array of 10 tri-axial receivers. As may be appreciated from FIG. 3B, casing slip events may be characterized in that their P- and S-energies are roughly equal at several receivers. The P-wave at several receivers may also be of high frequency. Also, the event location of a casing slip is close to a wellbore and at or above the surface casing shoe depth. Additionally, as indicated by the moveout pattern 316, in this instance the event is closest to the third sensor receiver from the surface, corresponding to trace set 318. A comparison of the depth of the closest sensor receiver to the surface casing depth may indicate if the event is a surface casing slip candidate.

Figure 3C:
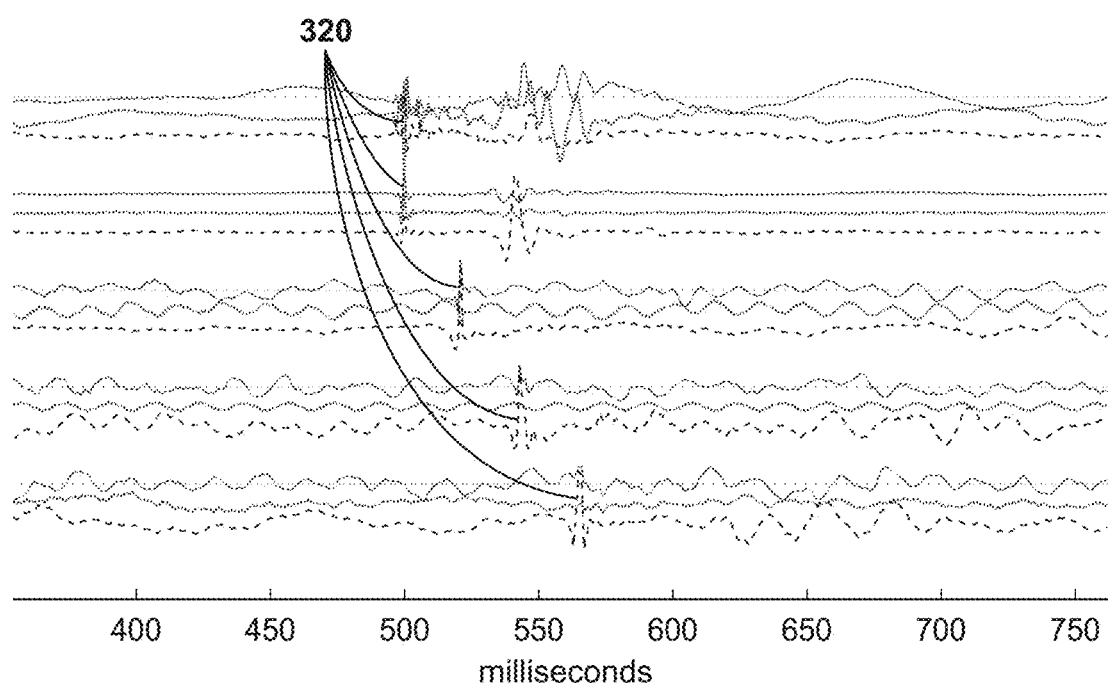
FIG. 3C shows an exemplary microseismic data segment associated with a cement crack event.

In contrast, cement cracks (cement de-bonding caused by thermal expansion or contraction from, for example, steaming) typically would be characterized by a high frequency P-wave arrival with relatively little energy distributed in the S-wave component across the array. For instance, FIG. 3C shows an exemplary data segment corresponding to a "cement crack" event. This data segment is approximately 400 milliseconds long and includes 5 trace sets corresponding to data gathered by an array of 5 tri-axial receivers. As may be appreciated from the figure, the cement crack waveforms include sharp P-wave components 320 and less S-wave energy overall.

Figure 3D:
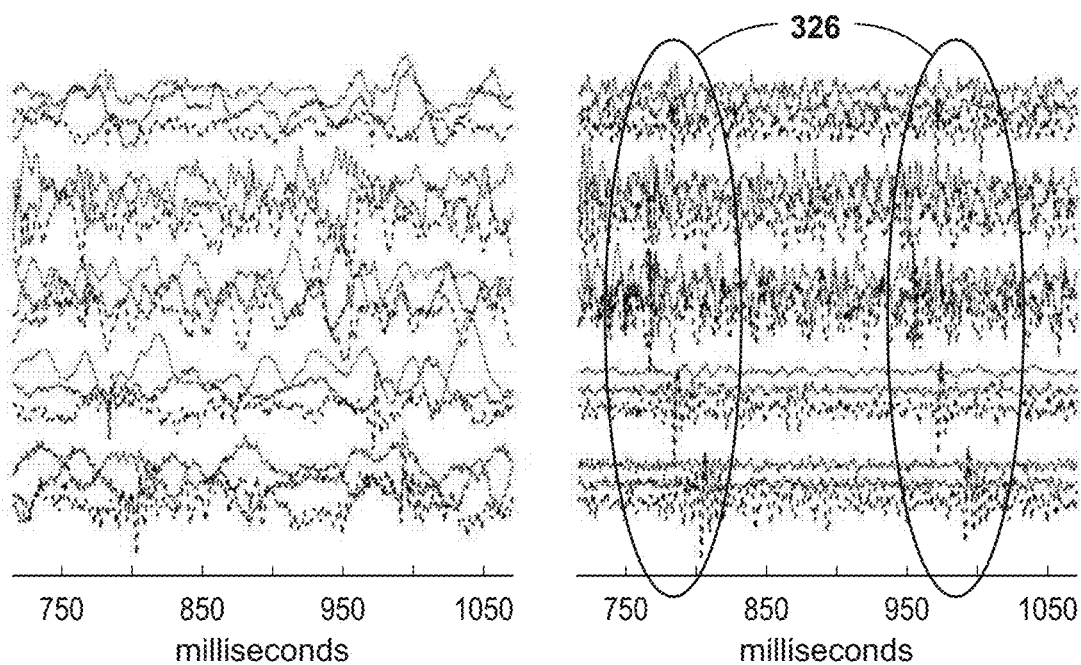
FIG. 3D shows an exemplary microseismic data segment associated with a continuous microseismic radiation (CMR) event (raw data on the left side and band-pass filtered data on the right side).

As a further example of a type of event of interest in production or injection operations, FIG. 3D shows two views of microseismic data corresponding to a Continuous Microseismic Radiation (CMR) event. CMR events are micro-events caused by fluid release into fractures in the overburden rock (similar to small harmonic tremors). On the left side of FIG. 3D is shown the raw data segment, whereas the right side shows a band-pass filtered view of the same data. In both views, the data segment is approximately 375 milliseconds long and includes 5 trace sets corresponding to data gathered by an array of 5 tri-axial receivers. With reference to the left view, it can be appreciated from the raw data that CMR events may be characterized by small low-energy waves that repeat at irregular intervals. With reference to the right side view, it can be appreciated that the P-wave moveout pattern 326 may be more apparent in the filtered waveforms. As such, analysis of CMR events may advantageously be performed on filtered data segments instead of the raw data segments.

Figure 3E:
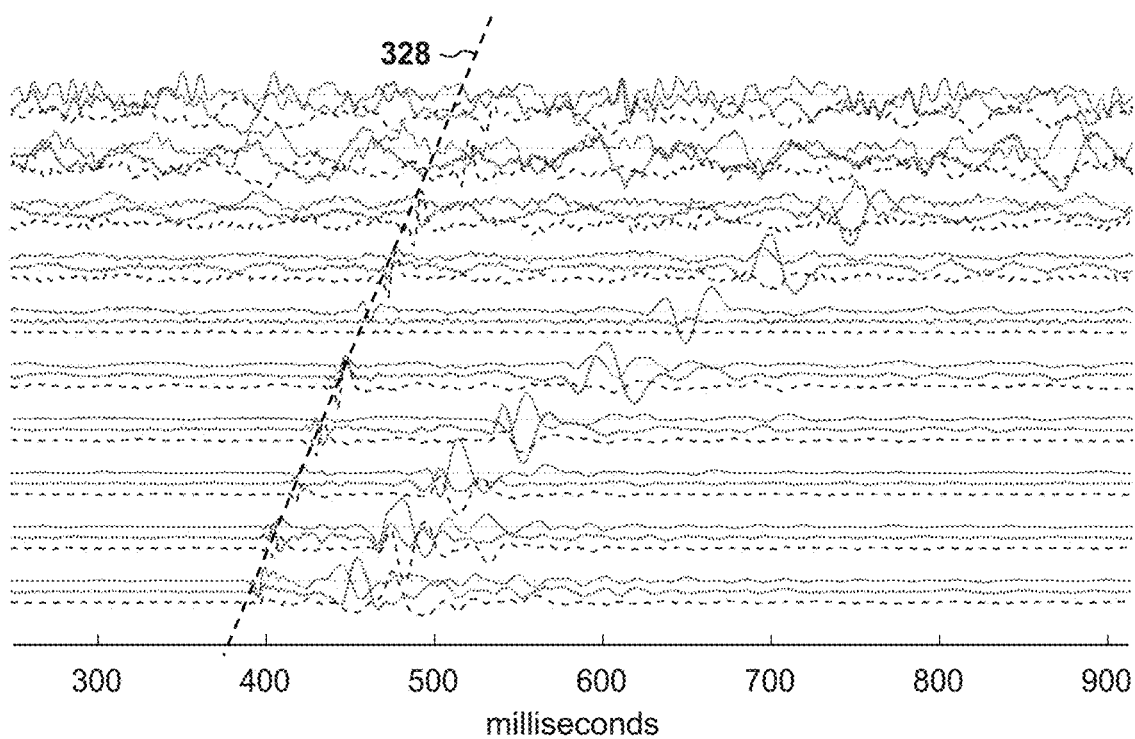
FIG. 3E shows an exemplary microseismic data segment associated with a heel event.

In contrast to the foregoing, "heel" events may be characterized by high energy flux, moderately high frequency content and a long tailed P- or S-wave, or both, as shown in the exemplary signature data segment in FIG. 3E. Heel events may be caused at the curvature of deviated wells due to turbulent flow of injected/produced fluid or instabilities caused by sudden changes to injection/production rates, or perhaps by the positional adjustment of equipment located in the well. The exemplary data segment of FIG. 3E is approximately 650 milliseconds long and includes 10 trace sets corresponding to data gathered by an array of 10 tri-axial receivers. The moveout pattern 328 of the P-wave arrival indicates that the event in this example is located closest to the deepest sensor receiver, and below the span of the sensor receiver array.

Figure 3F:
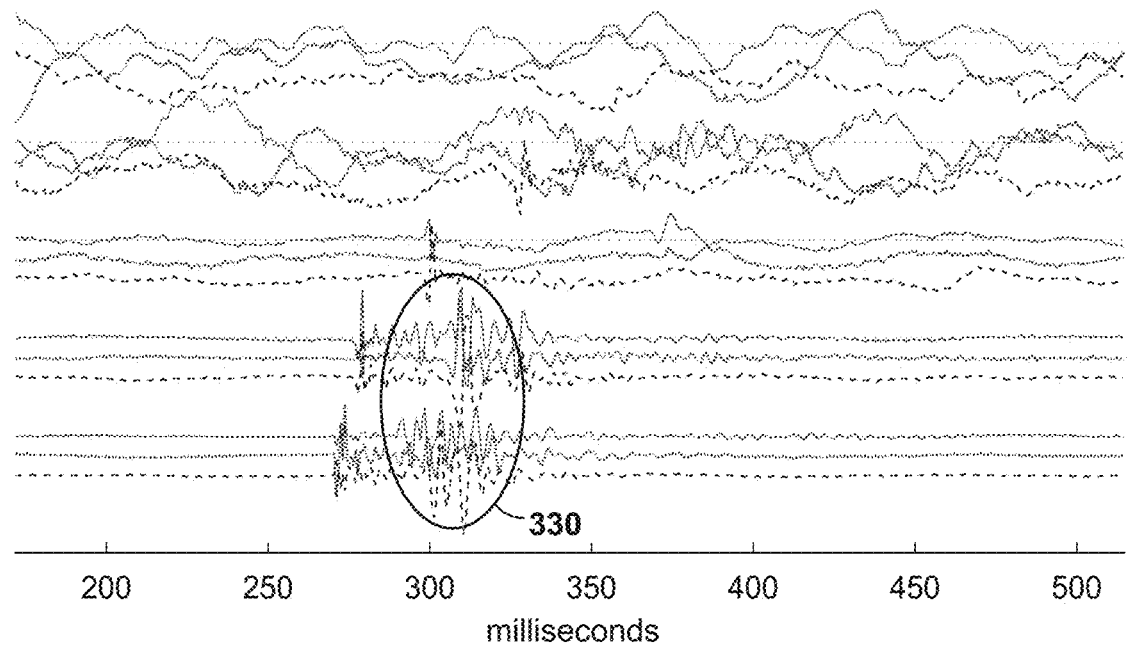
FIG. 3F shows an exemplary microseismic data segment associated with a heave event.

Other events not directly related to well integrity that may also be automatically detected according to some aspects of the present disclosure based on the characteristic pattern observed in seismic data include shear-dominated "heave" events. An exemplary data segment for a shear-dominated heave event is shown in FIG. 3F. This data segment is approximately 350 milliseconds long and includes 5 trace sets corresponding to data gathered by an array of 5 tri-axial receivers. Heave events are often caused by subsurface deformation and shear-slip planes resulting from poro-elastic effects or fluid movement through fractures or mechanically weak rocks (for example, swelling, exfoliating shale). Events that are located in the intermediate depth formation and are not close to wellbores are most likely small heave events. Heave events may also be generated by communication with natural fractures and faults. Seismic data associated with subsurface heave events may be dominated by an S-wave component 330 and a lower energy P-wave component in comparison, as shown in FIG. 3F.

Figure 3G:
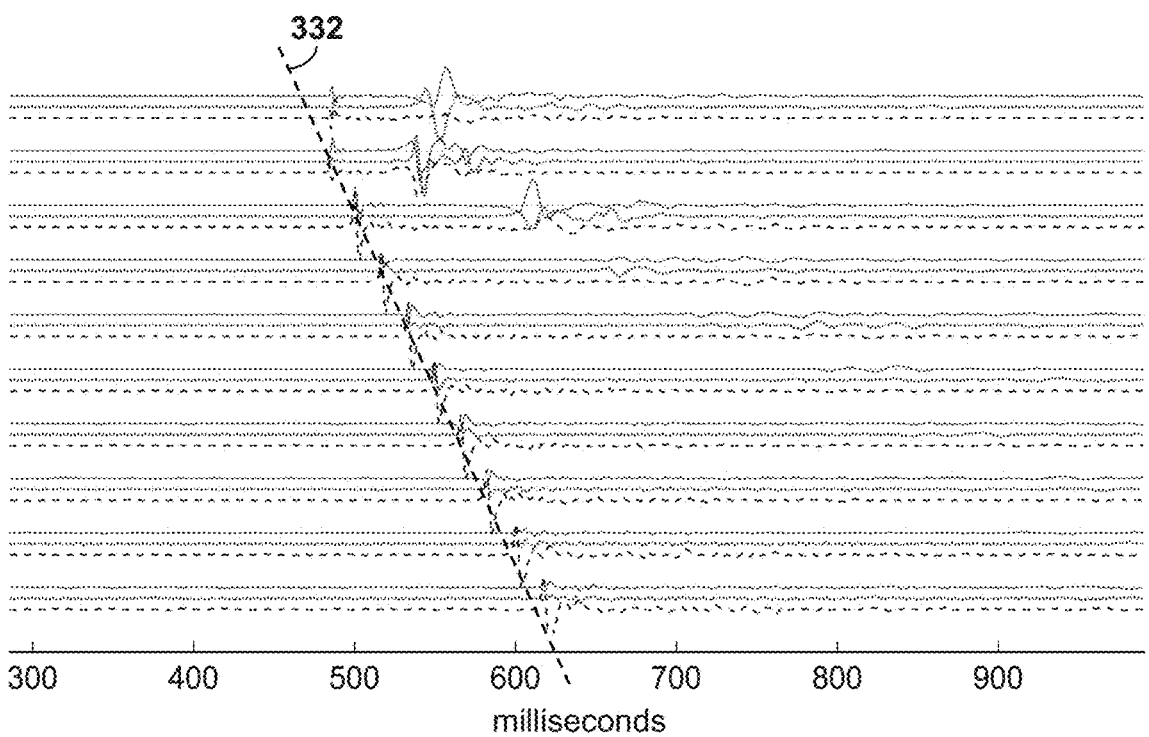
FIG. 3G shows an exemplary microseismic data segment associated with a surface noise event.

Finally, surface events such as rig noise, truck movement, calibration shots, etc. may also be detected by a microseismic monitoring system. Surface events are often characterized by high-energy P-wave components and may be detected by shallower sensor receivers prior to the deeper ones if the source is close to the monitoring well. For instance, FIG. 3G shows an exemplary data segment associated with a surface noise event. This data segment is approximately 700 milliseconds long and includes 10 trace sets corresponding to data gathered by an array of 10 tri-axial receivers. As can be appreciated from the moveout pattern 332 in this data segment, P-waves associated with surface events may be first intercepted by shallow sensor receivers located near the surface of a monitoring well for source locations near the monitoring well. Note that more distant source locations, for example those generated during calibration check shots, may actually arrive first at a deeper receiver (possibly level two, three, or four) due to ray-bending effects in which the shortest travel time is observed for wave propagation downwards first and then laterally through higher velocity formations. Indeed, close inspection shows that the arrival on the first receiver, in the slowest velocity intervals, appears delayed relative to the dominant moveout based on the other receiver levels.

Figure 3H:
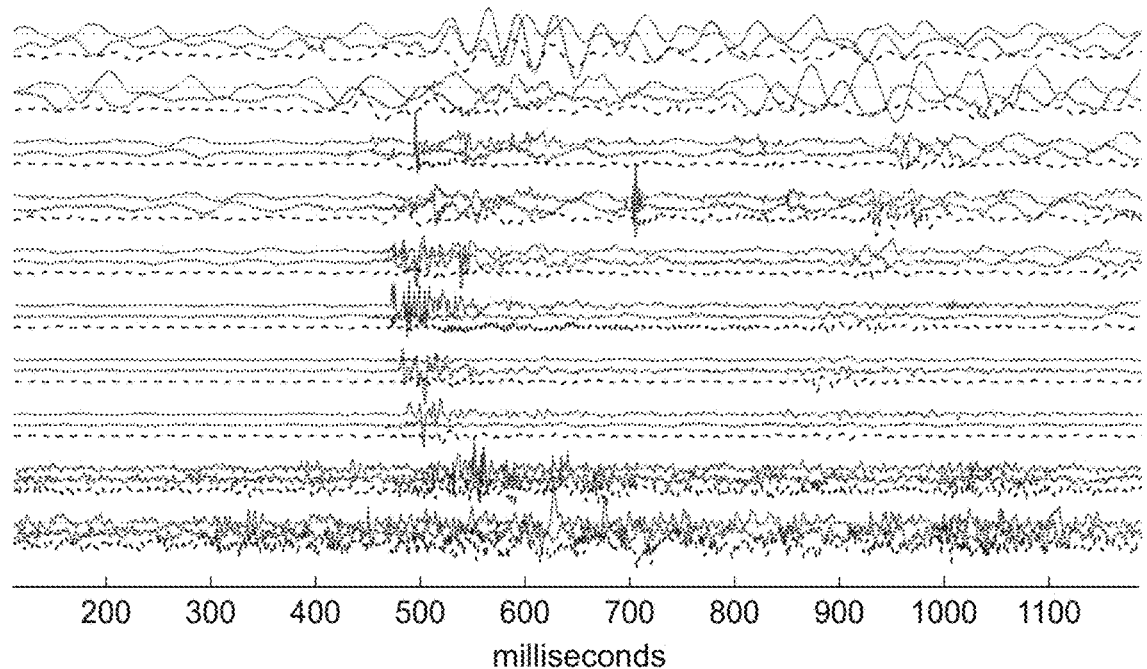
FIG. 3H shows an exemplary microseismic data segment associated with rod noise.

In contrast, noise from deep in the formation (which may be related to workover operations, including perforating, on relatively close wells, or possibly from more distant wells for signals comprising refracted waves) may be first observed by sensor receivers located deeper within the monitoring well. This can be seen in FIG. 3H, which illustrates an exemplary data segment corresponding to mechanical rod noise in wells that are artificially lifted using rod pumps. This data segment is approximately 1.1 seconds long and includes 10 trace sets corresponding to data gathered by an array of 10 tri-axial receivers. Rod noise can be caused by the rod as it makes contact with the inner tubing string during its motion, and is typically characterized by a repeated pattern of high-frequency waveforms. In some instances, the time between successive arrivals may be close to the time-period of the rod pump, but in other cases the time between waveforms may appear random because of a vibrational pattern developed in the rod string. Events seen at only one receiver level are by definition small because the radiation pattern is not sufficient to provide much of a response on nearby receivers only a short distance away, as seen at about 700 milliseconds on receiver level 4 in this example.

Figure 3I:
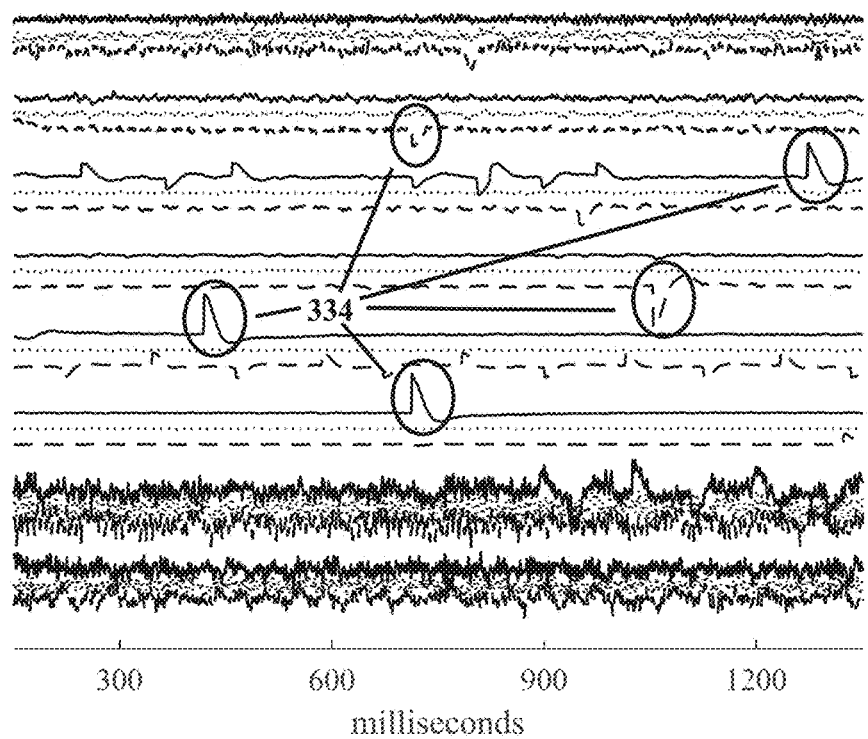
FIG. 3I shows an exemplary microseismic data segment associated with an electrical noise event.
Figure 3J:
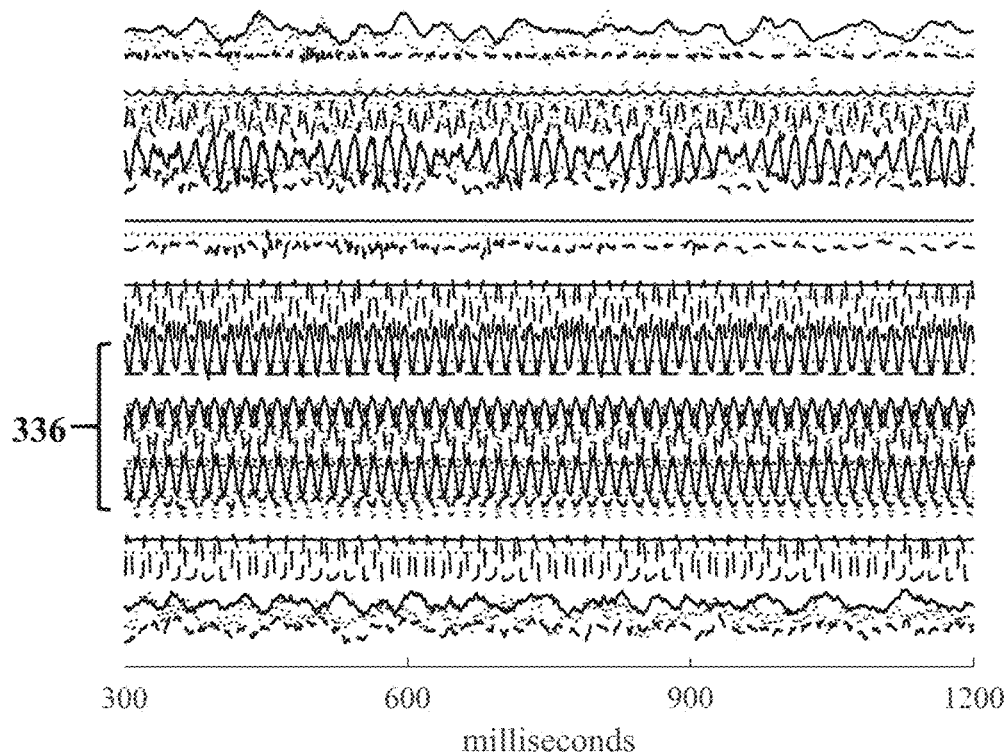
FIG. 3J shows an exemplary microseismic data segment associated with a bad channel event.
Figure 3K:
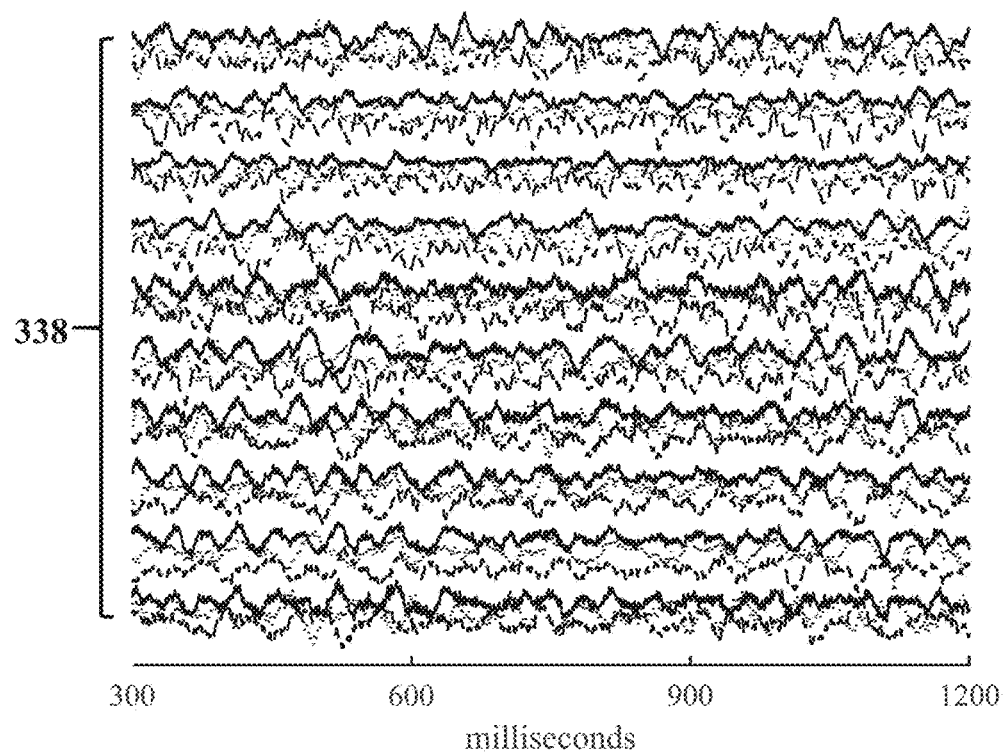
FIG. 3K shows an exemplary microseismic data segment associated with a white noise event.
Figure 3L:
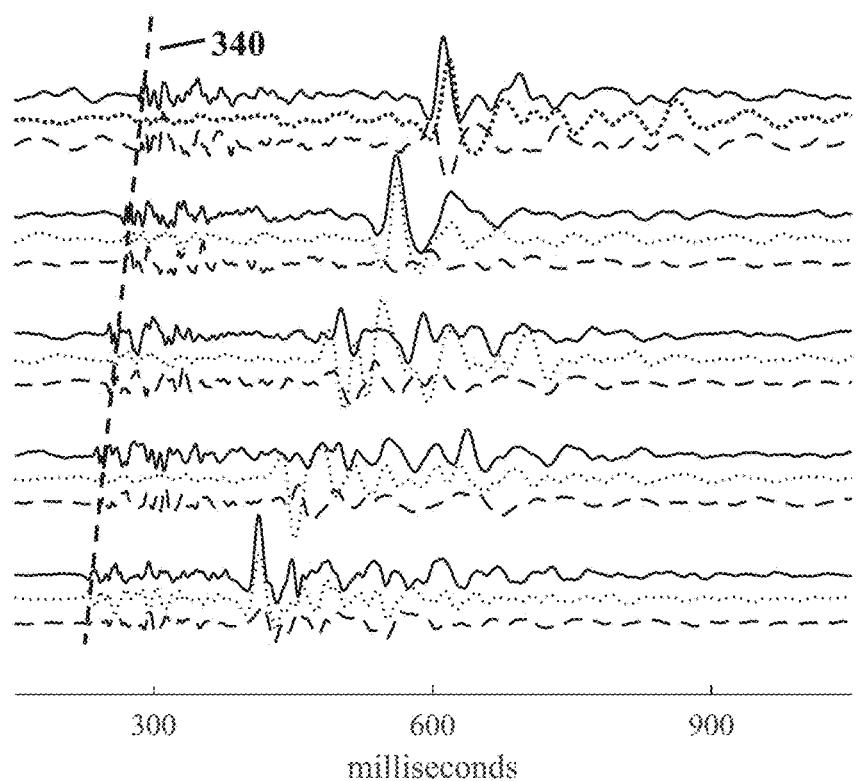
FIG. 3L shows an exemplary microseismic data segment associated with a slimhole/other event.
Figure 3M:
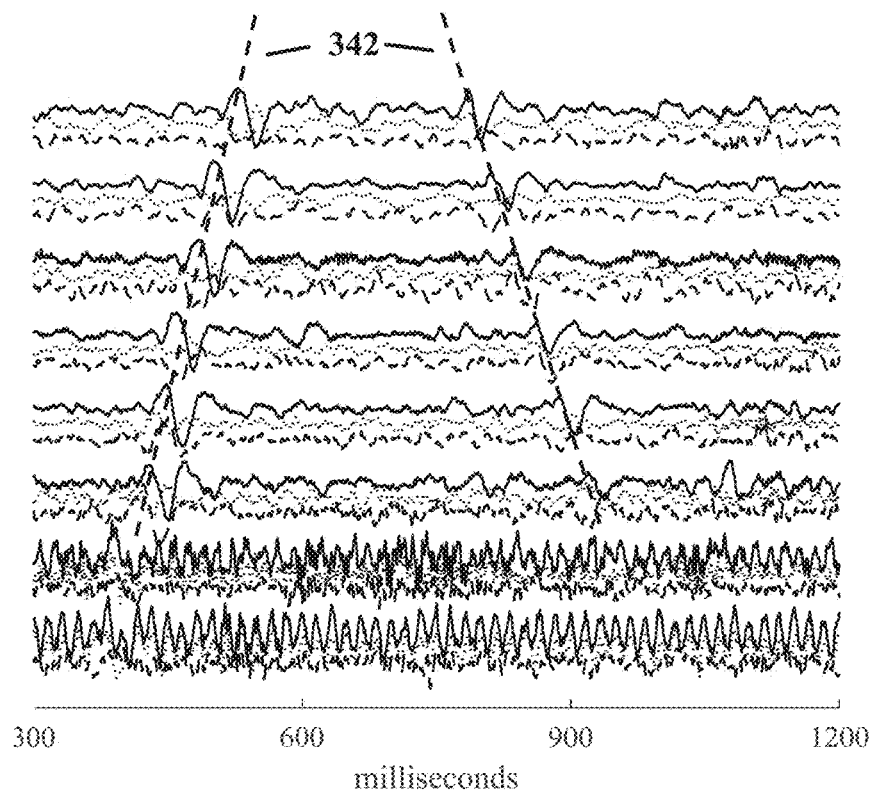
FIG. 3M shows an exemplary microseismic data segment associated with a V event.
Figure 3N:
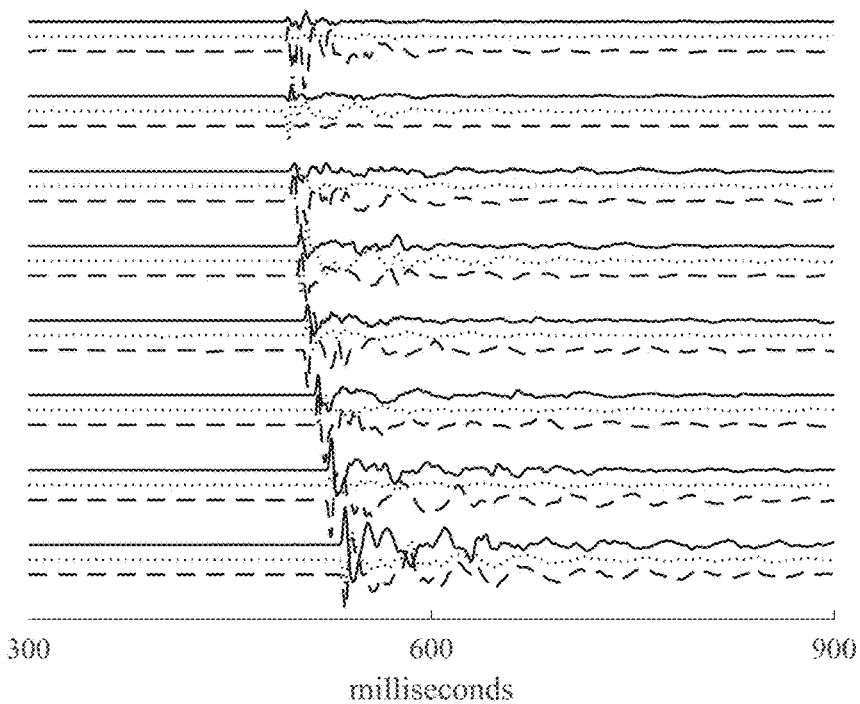
FIG. 3N shows an exemplary microseismic data segment associated with a seismic shot event.
Figure 3O:
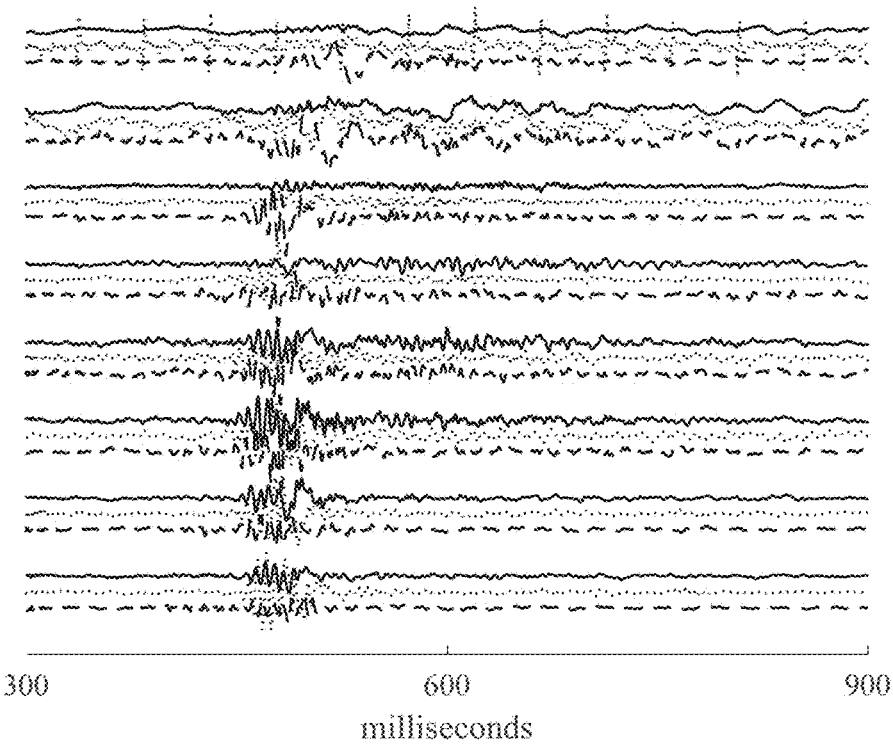
FIG. 3O shows an exemplary microseismic data segment associated with an $H_2O$ event.
Figure 3P:
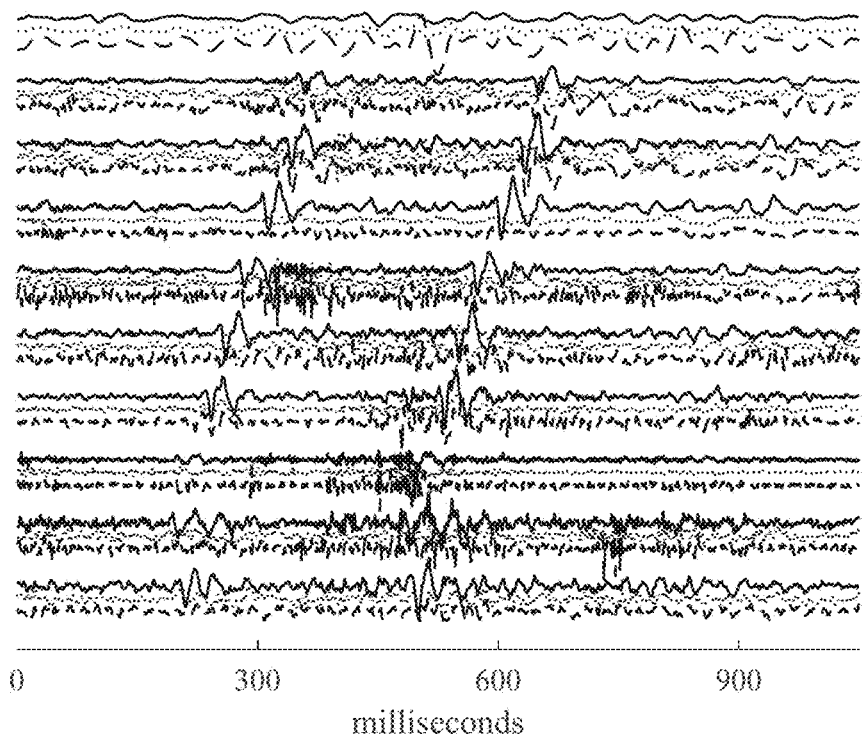
FIG. 3P shows an exemplary microseismic data segment associated with a ripple event.
Figure 3Q:
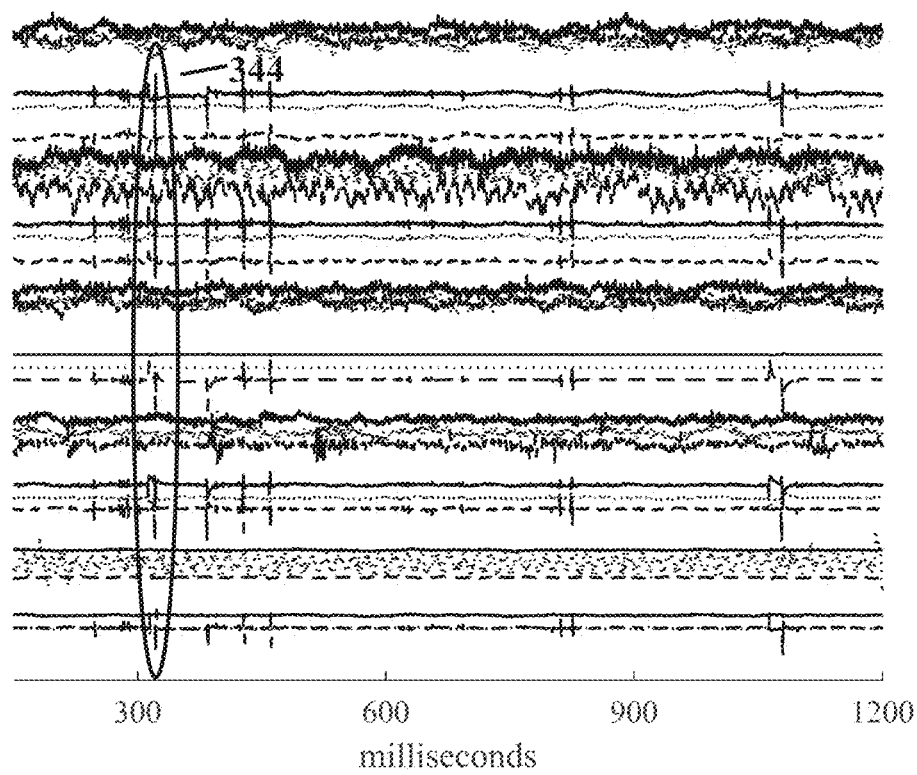
FIG. 3Q shows an exemplary microseismic data segment associated with a bad cable event.

Additionally, there are also other types of events that may warrant investigation. FIG. 3I shows an exemplary data segment corresponding to an electrical noise event, where examples of high-energy electrical noise spikes are indicated by 334. FIG. 3J shows an exemplary data segment corresponding to a bad channel event, where examples of bad channel trace sets with harmonic waves are indicated by 336. FIG. 3K shows an exemplary data segment corresponding to a white noise event, where examples of white noise trace sets without significant information are indicated by 338. FIG. 3L shows an exemplary data segment corresponding to a slimhole/other event, which may be caused by noise from slimhole, liner hanger, casing patch, or other sources Slimhole/other events have a similar moveout pattern, indicated by 340, as casing failure events or heel events. FIG. 3M shows an exemplary data segment corresponding to a V event, where a reversed "V" pattern is indicated by 342. FIG. 3N shows an exemplary data segment corresponding to a seismic shot event. FIG. 3O shows an exemplary data segment corresponding to an $H_2O$ event. FIG. 3P shows an exemplary data segment corresponding to a ripple event. FIG. 3Q shows an exemplary data segment corresponding to a bad cable event, where high-energy spikes caused by a bad cable are indicated by 344.

Data Processing

According to some aspects of the present disclosure, the microseismic data obtained by a passive monitoring system may be processed by a DAS to convert, if required, analog signals gathered from individual sensors into digital signals that are stored and transmitted to a remote computer or server. In regard to data storage, data may be stored in physical or cloud-based servers. Data may also be arranged as a "ring buffer" that continuously overwrites prior data after a period of time, such as several weeks or months. Such ring buffers may be removed from the DAS and provided to data analysts for study as necessary, with a fresh ring buffer replacing the one removed from service. The microseismic data may be processed by any conventional computer to generate data segments, which are a compilation of data measured over a predetermined amount of time (for example, 10 seconds). Data segments may be filtered before further processing into smaller data panels, or divided into data panels prior to filtering and further processing.

Figure 4:
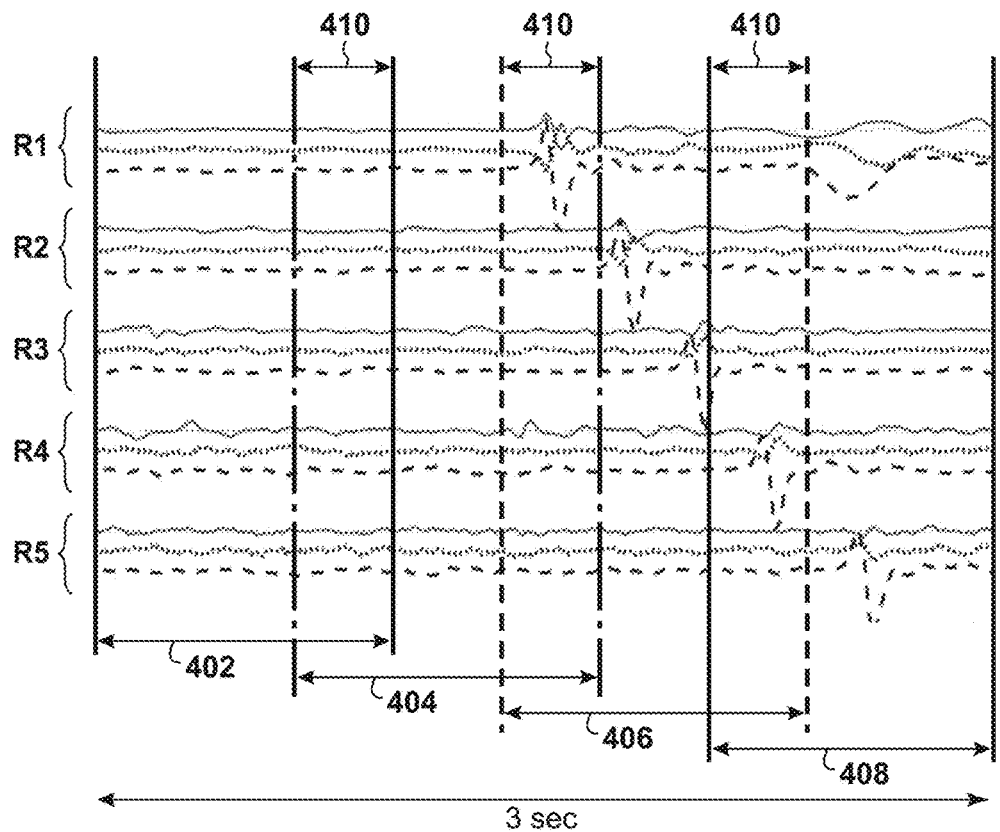
FIG. 4 is a simplified diagram of an exemplary 3-second data segment divided into four overlapping data panels.

In this regard, FIG. 4 shows an exemplary division of a data segment into overlapping data panels. The data segment includes 5 data trace sets R1, R2, R3, R4, and R5 collected by five separate sensor receivers of a sensor array over a 3 second time span. In this example, the data segment is divided into four data panels 402, 404, 406, and 408. Each data panel in this example is 1.33 seconds long. The data panels 402, 404, 406, and 408 may overlap by about 0.33 seconds, as shown in overlap regions 410. However, the present disclosure contemplates data segments of any predetermined length, which may be divided into data panels of any time duration. In some embodiments, the length of data panels may be between 0.5 seconds and 10 seconds. The data panels may further be adjacent or overlapping. The amount of overlap between data panels may vary depending on their size, and in some embodiments it may be between 10% and 50%, more preferably, between 25% and 35%. Alternatively, only portions of a data panel may be used by the system, or, in other applications, it may be necessary to create additional data panels by combination of two or more data panels. It should be understood that there is no artificial limit to the notion of a data panel, and it is a collection of contiguous data values arranged for convenience for processing purposes.

One advantage of generating data panels is that a smaller amount of data may be analyzed faster. Overlapping of data panels may ensure that all of the required event waveform is captured in one dataset to facilitate analysis. A second advantage is related to the consistency of calculated metrics. Signal-to-noise (S/N) ratio criteria are dependent on the typical amount of signal and noise in a data panel. The duration of many events of interest is typically about 0.5-1.0 seconds. For that reason, S/N criteria may be more differentiating if calculated on data panels of, for example, 1.5 seconds than if calculated on data panels of 10 seconds. In the former case, the event duration may be on the order of 25-35% of the record, whereas in the latter case the duration may be less than 5%. Typically, there may be more statistical differentiation observed in a noisy dataset when the signal is a greater portion of the event. Accordingly, in some embodiments of the present disclosure, data panels may preferably have a length of about 1.5 seconds, with an overlap of about 33%, without being limited to these specific values. In some applications, such a configuration has certain benefits when calculating event triggers to determine if there is meaningful information in each data panel.

Differentiating Between Noise Events and Non-Noise Events Using Neural Network Analysis In an aspect, it may be possible to employ neural network analysis to differentiate between noise events and non-noise events in data panels or other subdivisions of the microseismic data. Such differentiation may eliminate the need to further process the noise events, thereby reducing buffer storage size as well as processing time.

The goal of this binary noise identification process is to classify events detected in the data panels (or other subdivisions of the microseismic data) into two categories: events with noise attributes (noise events), and events with non-noise attributes (non-noise events). Non-noise events include things such as: casing failure events, casing slip events, cement crack events, heel events, heave events, surface noise events, slimhole/other events, V events, seismic shot events, $H_2O$ events, ripple events, and bad cable events. Noise events include electrical noise events, rod/steam noise events, bad channel events, and white noise events. It should be noted that some types of noise events, such as surface noise events, are classified as non-noise events instead of noise events in this step because they have a clear moveout. Table 1 lists different types of events categorized as noise events or non-noise events. Table 1 also lists the number of each event type used in an example herein to show how the noise events and non-noise events can be differentiated in the data panels.

TABLE 1

| Category | Number | Event type | Number |
|---|---|---|---|
| Noise events | 2278 | Electrical noise event | 1009 |
| | | Rod/steam noise event | 887 |
| | | Bad channel event | 240 |
| | | White noise event | 142 |
| Non-noise events | 2206 | Casing failure event | 185 |
| | | Casing slip event | 227 |
| | | Cement crack event | 209 |
| | | Heel event | 71 |
| | | Heave event | 167 |
| | | Surface noise event | 13 |
| | | Slimhole/other event | 24 |
| | | V event | 400 |
| | | Seismic shot event | 400 |
| | | H2O event | 200 |
| | | Ripple event | 200 |
| | | Bad cable event | 110 |

A pattern recognition neural network typically requires the same number of input variables. However, different passive seismic arrays may have different numbers of receivers associated therewith, and the dataset) generated by each seismic array will have a number of data levels corresponding to the number of receivers in the array. Each data level has three traces, as explained previously herein. Therefore, to apply the neural network, data may need to be pre-processed to provide a common number of data levels between the datasets to be used. In the pre-processing, data with more or less than a determined number of data levels are converted to have the determined number. For example, if the determined number of data levels is eight, datasets with more or less than eight data levels are adjusted to have eight data levels. For example, for a dataset with five data levels, three data levels having data values of zero (or otherwise neutral values) are added to the dataset. In other words, the dataset is padded with enough neutral or zeroed data levels to reach the determined number of data levels. On the other hand, a dataset having ten data levels will have two data levels discarded. According to disclosed aspects, one method of data discarding includes calculating, for each trace of each data level, short-time (STSD) and long-time (LTSD) moving standard deviations of data over a relatively shorter time period (e.g., 16 milliseconds) and a relatively longer time period (e.g., 64 milliseconds), respectively. For each trace, STSD-to-LTSD ratios (SLR) are calculated, and the maximum SLR and its location in time is identified as the "moveout attribute". Next, a frequency threshold is calculated for each trace such that 95% (or some other amount) of the total energy of the signal for that trace is contained below the frequency threshold (this frequency threshold will later be defined as $\omega_{95}$ based on Eq. 1). Then, if the frequency threshold is lower than a cutoff frequency (such as 40 Hz) for at least 50% (e.g., two out of three) of the traces for one data level, the data level is deemed as a trivial level without significant information, and the data level is discarded. If more than eight data levels still exist after this procedure, the level with the lowest moveout attribute (maximum SLR) is repeatedly discarded until eight data levels remain.

After the pre-processing, the moveout attribute of non-noise events and the identification of spikes in electrical noise events are the most heavily weighted attributes in the classification with the neural network. Spikes in electrical noise events are evaluated in this aspect because they account for a sizeable proportion of false casing failure alerts. Identification of other types of noise events for input into the neural network may be performed at this point in the disclosed process. FIGS. 3H-3K show examples of noise events, while non-noise events with clear moveout attributes throughout almost all levels are shown in other figures in FIG. 3. As evident from FIG. 3I, the peaks 334 appear at random locations throughout all receiver levels.

According to disclosed aspects, the moveout attribute for each trace can be defined as (a) the maximum SLR and (b) the location of said maximum SLR, as identified in the data pre-processing step. The moveout attribute is then fed into the neural network. Additionally, for each trace the maximum value of the STSD over the standard deviation of the whole trace, and the location of said maximum STSD value, are extracted and fed into the neural network. This maximum STSD information complements the maximum SLR information. Spikes in electrical noise events are then identified. Various methods of spike identification may be employed. In a disclosed aspect, spike identification may be accomplished using an ensemble empirical mode decomposition (EEMD) technique as described in *Ensemble empirical mode decomposition: A noise-assisted data analysis method*, by Z. Wu and N. E. Huang, Adv. Adapt. Data Anal., vol. 1, no. 1, pp. 1-41, 2009, the entirety of which is incorporated by reference herein. The EEMD technique is first applied to each trace of data, and several (e.g., four) intrinsic mode functions (IMF) and one residual are obtained. By using EEMD, high-frequency components of a data trace may be eliminated as IMFs and the high-energy low-frequency electrical spikes may be retained in the residual. In the application of EEMD, the noise level may be set between 0 and 0.2 and the ensemble number between 1 and 100. Then, all local peaks and the prominences of the peaks are extracted from the residual, for example by using a Matlab built-in function "findpeaks". From the prominences, values that are more than a threshold factor (e.g., 15 times the interquartile range above the upper quartile) are selected as outliers. As the locations of the selected outliers may not be but close to the locations of the electrical spikes, segments (e.g., 25 milliseconds) of the original data trace centered at the locations of the selected outliers are extracted, and the location of the maximum value of each segment is determined as the location of a potential electrical spike. Finally, for each location corresponding to the potential electrical spike, if the original data of a time length (e.g., 12.5 milliseconds) before or after it do not cross zero, one electrical spike is identified. After that, the number of electrical spikes for each event is fed into the neural network for the classification. Moreover, if at least one electrical spike is identified for a data trace, data segments between the closest zero crossings on each side of the identified electrical spikes are set as values of zero (or otherwise neutral values) for the data trace. Then, STSD, LTSD, and the standard deviation of the entire trace are calculated again for each data trace with identified electrical spikes to update the moveout attribute and its location that are fed into the neural network. Additionally, the frequency threshold for each trace calculated in the data pre-processing procedure and the frequency corresponding to the highest power spectral energy and its fraction of the total power energy for each trace are also fed into the neural network.

Figure 16:
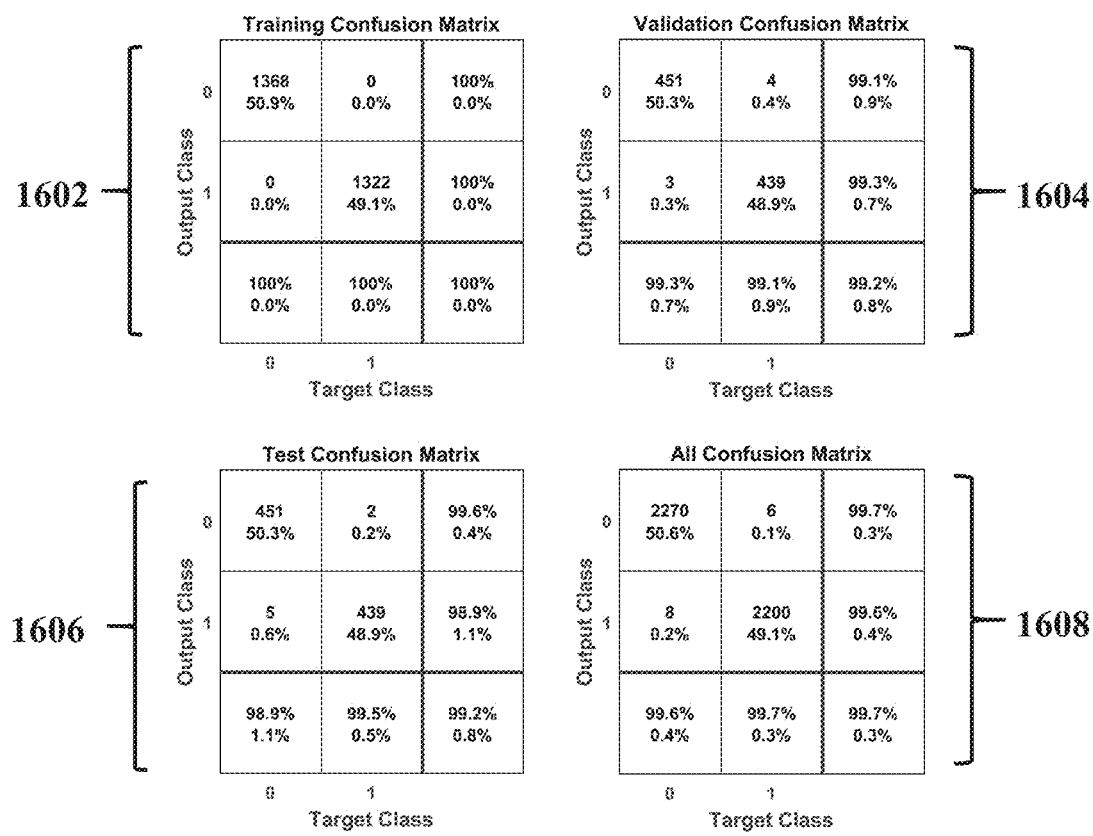
FIG. 16 is the binary noise identification result performed by the neural network.

In total, if the number of data levels is determined as 8 in the data pre-processing procedure, 169 input variables are fed into the neural network, which may be normalized and scaled to have a mean of zero and a standard deviation of one. The parameters of the neural network are set to provide a suitable output. For example, the number of hidden layers may be set to around 5 and the number of neurons in each hidden layer may be set to be around 200. A regularization factor (e.g., 0.9) may also be used to prevent the overfitting. As non-noise events are of significant interest and need to be further analyzed, a better accuracy may be required for the identification of them. Thus, an error weight (e.g., 5) may be applied to non-noise events in the training process of the neural network. All data are randomly assigned to be in a training set, a validation set, and a test set, e.g., with proportions of 60%, 20%, and 20%, respectively. In the end, the trained neural network with the most accurate result may be used for the binary noise identification. The classification performed by an exemplary output of the neural network is shown in FIG. 16, including confusion matrices for the training set 1602, the validation set 1604, the test set 1606, and the combined set 1608. In the confusion matrices, "0" stands for noise events and "1" stands for non-noise events. The confusion matrix for the combined set 1608 shows the neural network has determined there are 2270 noise events and 2200 non-noise events. When these numbers are compared to Table 1, which shows 2278 noise events and 2206 non-noise events were input to the disclosed method, it can be seen that an accuracy of 99.7% is obtained for all data.

Microseismic Event Triggering

According to some aspects of the present disclosure, data panels containing non-noise events, or events having non-noise attributes, may be further analyzed to determine if the data triggers one or more predetermined criteria to be considered to be an event of interest and thus selected for further analysis. Such criteria may include one or more of the following: peak amplitude (relative or absolute), ratio of short-term to long-term average (STA/LTA), wavelet transform calculations, apparent velocity, number of geophones and/or receivers that raise a trigger signal, number of overlapped windows of triggered signals, comparison of attributes derived from adjacent windows and other methods known to those skilled in the art. In some embodiments, an apparent velocity filter may use the ratio of the distance between two receivers and the time difference between common waveform arrivals to determine if the signal is "admissible" as a potential seismic event. If too slow, i.e., slower than the speed of sound in the surrounding medium, then the event may be discounted as likely noise. Note that a plane wave arriving at two receivers at the same time would correspond to an infinite apparent velocity. While nearly simultaneous arrivals at two receivers may indeed occur, this typically does not occur all along a receiver array. Events that are recorded at all receivers in a string nearly instantaneously are generally the result of some electrical noise source.

Trigger values may be calculated for each data panel using an STA/LTA analysis, amplitude thresholding, wavelet transform calculations, or combinations thereof. For example, in embodiments using STA/LTA, the analysis may proceed as follows. For each data trace, denoted by V(t), the STA may be evaluated as a backward-moving average of the trace, with a window length equal to a few tens of milliseconds, for example, between 5 and 30 milliseconds, or more preferably, 10 milliseconds. The LTA may be similarly evaluated, but with a larger window length, typically hundreds of milliseconds, for instance, between 50 and 300 milliseconds, or more specifically, 100 milliseconds. Next, the ratio of the above quantities may be computed as the STA/LTA ratio. The times at which the STA/LTA ratio exceeds a predetermined threshold may be recorded. In some embodiments, this STA/LTA ratio threshold may be between 2 and 5, or more preferably, 3.

Optionally, the above STA/LTA analysis may be performed after filtering the data traces by removing any extreme frequency components in the traces. If such filtering is performed, the bounds on allowable frequencies may be chosen in a conservative fashion so as to not discard any microseismic events of interest. For instance, a band-pass filter with bounds [50, 750] Hz may be an acceptable choice of a filter for this purpose. Alternatively, STA/LTA calculations may be preceded by wavelet filtering techniques.

In some embodiments, the STA/LTA analysis may also be augmented by an amplitude thresholding procedure, wherein the times at which the amplitude of the data trace exceeds a configured threshold are also determined. As described next, two types of amplitude thresholding may be carried out: absolute and relative. In absolute thresholding, the times at which the absolute value of the trace amplitude, $|V(t)|$ exceeds a fixed, pre-configured threshold are marked as triggered. The threshold may be chosen between $0.5 \times 10^{-7}$ m/s to $3 \times 10^{-7}$ m/s, and preferably about $10^{-7}$ m/s.

In contrast, in a relative thresholding procedure, $|V(t)|$ is compared to a suitable statistic of the data trace, denoted here by $S(V(t))$. S may be selected, for example, as the mean, median, Root-Mean-Square, or the maximum value of $|V(t)|$ over the entire length of the data panel. It should be understood that the above list is not exhaustive, and other statistics may be employed depending on the specific case at hand. The times at which the ratio $|V(t)|/S(V(t))$ exceeds a pre-configured threshold are marked as triggered. The value of the pre-configured threshold depends on the statistic S chosen. For example, if S is chosen as the mean of $|V(t)|$, the threshold can be set anywhere between 20% and 50%, preferably 33%.

In certain embodiments, if both STA/LTA and amplitude thresholding are performed, the intersection of the times recorded from both analyses may be marked as triggered. In other implementations, the union of two or more triggering algorithms could be selected.

Figure 5:
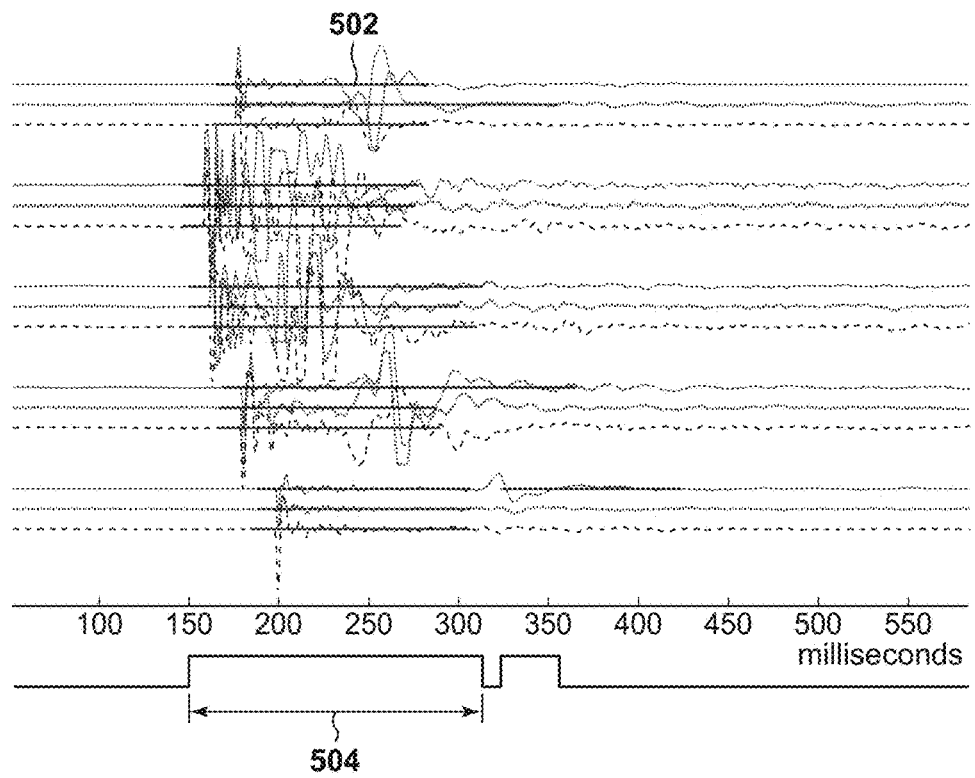
FIG. 5 illustrates exemplary triggers for a casing failure data segment.

To illustrate the calculation of trigger values, FIG. 5 shows an exemplary data panel corresponding to a casing failure event. This data panel includes data measured over approximately 500 milliseconds by 5 tri-axial sensor receivers generating 3 data traces (or 1 trace set) each. For each data trace in the data panel, a combination of STA/LTA analysis and amplitude thresholding criteria was used to calculate the triggers on the trace. In this context, calculating the triggers on a trace may be viewed as determining a binary trigger value at each time on the data panel—i.e., at any given time, the trigger value is 1 if the data trace is triggered at that time, or 0 otherwise. An example of such a triggered portion (hereafter, "triggered window") is indicated by the heavy solid line 502 on a data trace recorded by the shallowest sensor receiver. The triggering process is completed once the triggered windows on all data traces of the data panel have been calculated.

According to some aspects of the present disclosure, a sensor receiver may be marked as "triggered" according to any predetermined receiver triggering criteria, such as requiring that at least one trace on the sensor receiver has been triggered. A triggered window of the sensor receiver may be defined as a time interval for which the sensor receiver is triggered. Next, the data panel as a whole may be marked as a "triggered data panel" if predetermined data panel triggering criteria are met; otherwise the data panel is not considered to have triggered. For example, one such predetermined data panel triggering criteria may be that at least two sensor receivers are simultaneously triggered. It should be understood that whether a data panel is considered a triggered data panel or not at a given time may be determined using a variety of alternative criteria, such as requiring a different number of triggered receivers or directly aggregating the triggers on the channels, among many others. Furthermore, the triggered time interval may be advanced by a few milliseconds to include precursor seismic data and held as a triggered state for a minimum duration to facilitate data overlap on adjacent receivers that have some amount of moveout (time-shift) of the event.

For instance, in FIG. 5, the time window indicated by 504 would be an example of a triggered window on a data panel, obtained using the predetermined criterion that at least two sensor receivers must be simultaneously triggered and that at least one triggered sensor receiver has at least two triggered channels. In this implementation, the addition of the requirement of another channel on at least one of the triggered receivers ensures that at least one of the horizontal channels is triggered simultaneous to the other two channels, which may correspond to vertically oriented sensors. The triggered times on the data panel are all potential candidates for the arrival of the P- and S-waves on the sensor receivers. As such, in some aspects of the invention, the subsequent event analysis and classification may be performed using only the triggered windows or portions of the data panel.

In other implementations, the continuous time record may be searched for triggers and when the trigger occurs, the reference start time of the triggered data panel may be set a certain amount in advance of the trigger time so as to preserve a desired portion of data in advance of the trigger. This is an alternative to the approach shown in FIG. 4 to determine data panels. In some instances, records may be selected using both methods, one for immediate use and another for archival recording.

In some embodiments, the above triggering calculations may be performed on a standard computer at the well pad, and the triggered event files may be transferred to a central location for further processing. A web-based server application may be configured to interface to multiple pads for the purpose of bringing all of the data to a central location that is accessible to data analysts. At the server, additional processing of the triggered event files may occur, including detection of events of interest and rejection of noise events. The entire data stream may be stored either in a ring buffer or on a server. The full data stream can be continuously or periodically transferred to a computer where both automated processing and data analysts can process the time record in its entirety. In this approach, the triggering analysis may also be performed on the data analysts' computer, possibly using different trigger values, which may provide additional benefits.

Noise Identification

According to some aspects of the present disclosure, once the triggers have been identified on individual data traces, a frequency-based procedure may be employed to identify noisy traces in the data panel and subsequently remove them from the triggered dataset. This procedure can identify high-frequency noise such as the mechanical noise caused by rod pumped wells as the rods scrape against the production tubing (earlier exemplarily illustrated in FIG. 3H). Among many characteristics that may be used to identify such noise events, one may observe in FIG. 3H, for example, that the rod pump noise record shows higher frequency content than several of the other data types. In practice, a great many noise events may be captured for every event of interest to operations. These extraneous data records can be time consuming to transfer and process manually if they are not removed from further processing. However, they may be added to a noise log to capture the criteria by which each such noise event was discarded. Note that rod noise may in some instances resemble CMR (as seen by comparing FIG. 3H and FIG. 3D) and that processes to recover CMR may be designed to address this possibility. In practice, in the rare chance that continuous such events occur, it is always possible to test for rod noise or CMR by stopping the rod pumps for a short time interval. If the noise ceases, the source must have been the rod pumping motion.

Figure 6A:
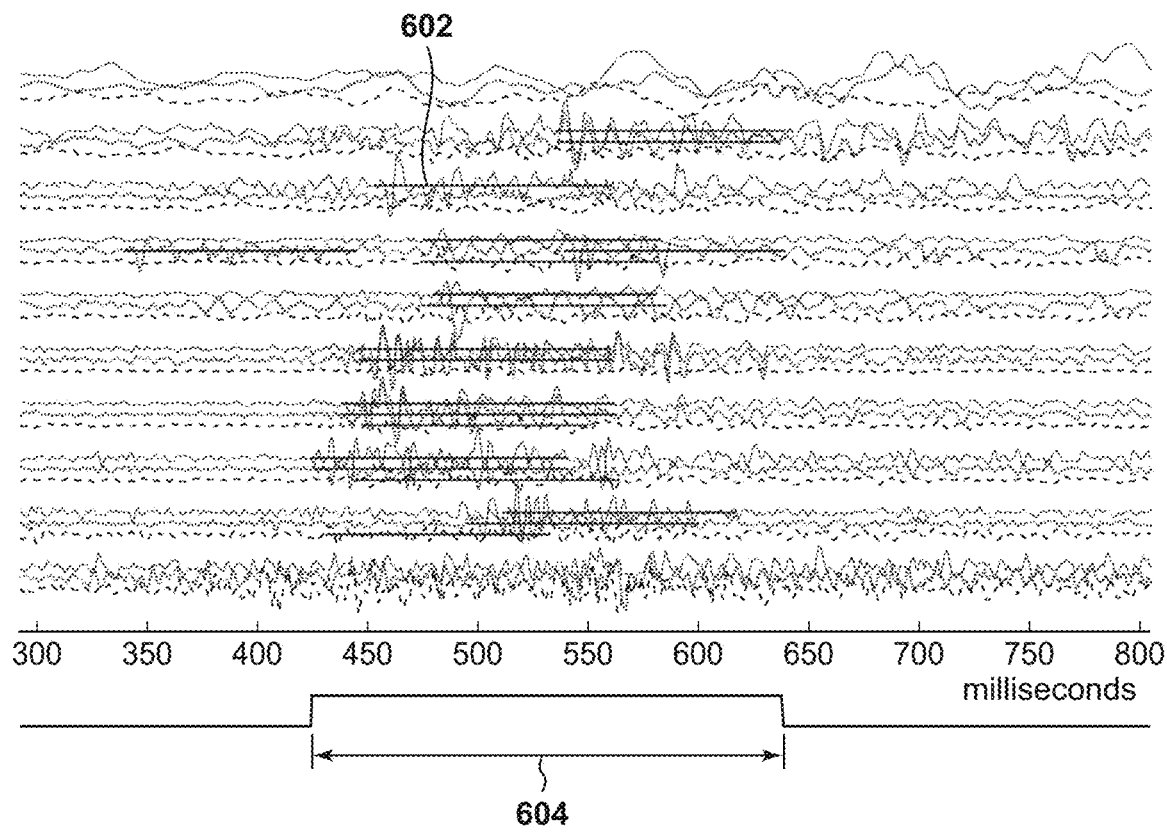
FIG. 6A and FIG. 6B illustrate exemplary triggers before and after noise identification, respectively.
Figure 6B:
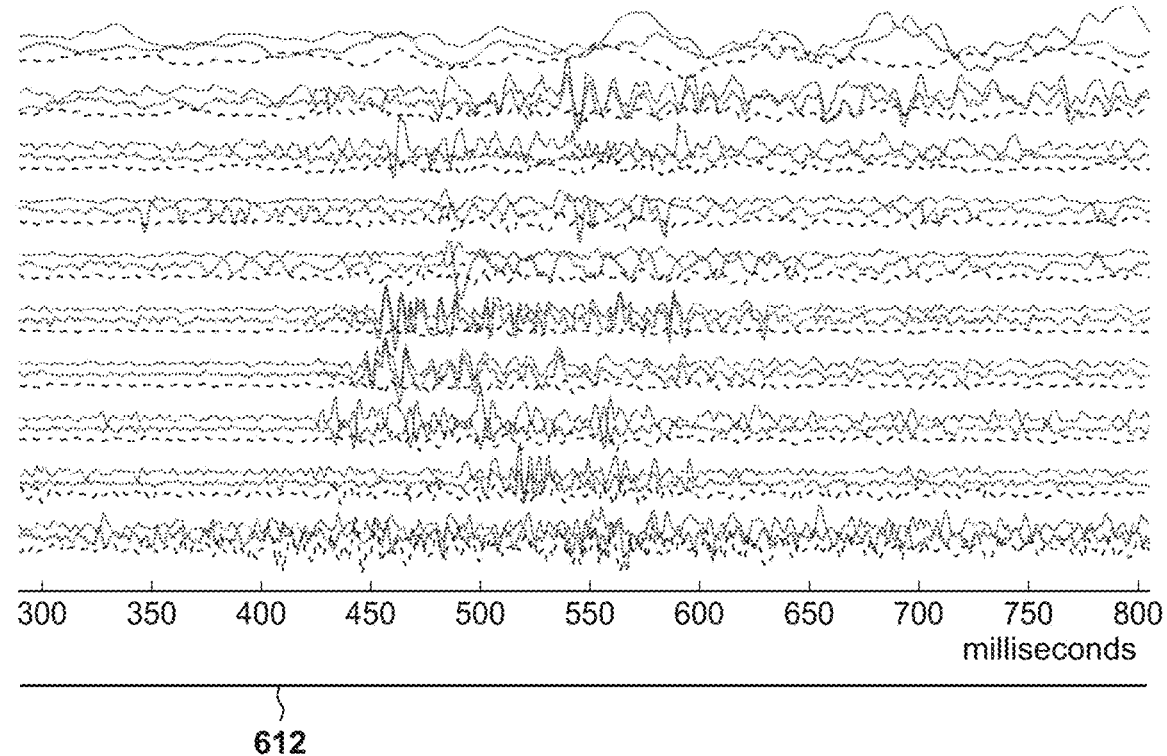

To illustrate noise identification according to some embodiments of the present disclosure, an exemplary triggered data panel without identifying rod noise is shown in FIG. 6A, and the same data panel is shown in FIG. 6B after removing traces that were identified as noise using a frequency-based procedure. While an exemplary procedure will be described herein, it should be understood that the present disclosure contemplates other known methodologies suitable for achieving similar results.

In the example illustrated by FIG. 6A and FIG. 6B, a conventional signal processing software package was used to compute the spectral densities of the time-series of the data traces from the entire data panel, for all the receiver traces (which may also be referred to as channels). The spectral density of a time-series, denoted by $p(\omega)$, describes the power contained in the signal as a function of frequency, per unit frequency. The normalized cumulative spectrum (denoted by $\gamma(w)$) may then be computed as the integral of the spectral density between a suitable lower bound $\omega_0$ and $\omega$, divided by the total energy of the signal obtained by integrating the power from $\omega_0$ to $\infty$ (infinity). Mathematically, this quantity is described by:

$$\gamma(\omega) = \frac{\int_{\omega_0}^{\omega} p(\omega) d\omega}{\int_{\omega_0}^{\infty} p(\omega) d\omega}. \quad \text{(Eq. 1)}$$

where $\gamma(\omega)$ is a continuous, monotonically increasing function of w, and satisfies the limiting conditions: $\gamma(\omega_0)=0$, and $\gamma(\infty)=1$. The value of $\omega_0$ depends on frequency characteristics. Typically, $\omega_0$ may be chosen to be smaller than the lowest frequency component of a microseismic signal. For example, $\omega_0=0$ Hz may be a suitable value for the lower bound. In practice, a periodogram estimate may be used as a substitute for the spectral density $p(\omega)$.

Next, for each receiver trace or channel, the corresponding frequency $\omega$ that satisfies $\gamma(\omega_{45})=0.95$ may be computed. In other words, $\omega_{95}$ may be calculated such that 95% of the total energy of the time-series is contained between $\omega_0$ and $\omega_{95}$. This is an option that might be useful given that the majority of the energy in noisy microseismic data is typically distributed across high frequencies. As such, the contributions from lower frequencies may be relatively small. In contrast, events such as casing failures tend to peak at lower frequencies in their spectral density, and have less energy spread across the higher frequencies. It should be noted that, in this context, "high" and "low" depend on the specifics of the source of the noise, the frequency response of the seismic sensors, the data acquisition system, and the acoustic attenuation caused by the rock. Moreover, it should be understood that using 95% of the total energy as in the foregoing example is only an exemplary value, and this is not intended to restrict the scope of the present disclosure. Persons of skill in the art will recognize that one may instead choose any value representing a majority of the signal's energy, for example, between 60% and 100%, or, higher than 90%.

Continuing with a 95% example, every trace where $\omega_{95}$ exceeds a calibrated threshold value $\omega$ may be classified as "noisy" while the remaining traces may be classified as possibly containing data pertaining to a microseismic event of interest. The calibrated threshold value $\omega$ may be determined in an empirical fashion by analyzing the spectral densities of training data comprising known microseismic events and noise events. The value of $\omega$ may be chosen so as to achieve reliable detection of noise while minimizing the misclassification rate in the training dataset. In some embodiments, a suitable value of $\omega^*$ may be between 150 Hz and 300 Hz, and for example, 250 Hz.

In the example illustrated in FIG. 6A and FIG. 6B, w was set to 250 Hz, a value chosen based on the analyses of known microseismic and noise events. All data traces with $\omega_{95}>\omega^*$ were labeled noisy, and any triggers on that trace discarded. Here, "discarding" a triggered window may be viewed as setting the trigger value to 0 for all times in the triggered time window. For example, in FIG. 6A, 602 indicates a triggered window on a data trace of the third sensor receiver. Upon performing the noise identification procedure, all triggered windows (including 602) were eliminated, as may be appreciated from FIG. 6B. A similar process may be repeated for all traces in a triggered data panel, thereby discarding the triggers and trigger windows on all noisy traces. Such traces therefore may not play any role in the subsequent calculations. Then, any remaining triggered traces may be labeled as noise-free traces.

The noise identification process described above assumed that the quantities $p(\omega)$ and $\gamma(\omega)$ are computed using the data traces from the entire data panel. This approach is suitable for short data panels, i.e., wherein the frequency characteristics may be assumed to be uniform across the entire data trace. In other embodiments, the noise identification may be performed by placing greater emphasis on the frequency spectra around the triggered time-windows, and lesser on the times far from the triggered windows. This may be accomplished by computing Short-Time Fourier Transforms (STFT), spectral densities and normalized cumulative power spectra of the data trace around each distinct triggered window and discarding the triggered windows on the basis of the aforementioned thresholding procedures. Different types of window functions may be used in STFTs, including, but not limited to, Bartlett window, Hann window, Hamming window etc. As a particular case of the Short-Time Fourier Transform with a Gaussian weight function, one may compute the Gabor transform of the data trace, which automatically places greater weight on local data. The spectral densities and the normalized cumulative spectra then become functions of time, in addition to frequency. At each triggered time of a given data trace, the local normalized cumulative spectrum may be used to identify noisy triggers on the trace. This approach is suitable in cases where the frequency characteristics of the data trace are expected to vary with time.

According to some aspects of the present disclosure, after noise identification, the trigger windows for each remaining sensor receiver may be computed using any receiver triggering criteria as described earlier, such as requiring at least one data trace of the sensor receiver to be triggered. Then, trigger windows may be identified for the overall data panel according to predetermined data panel triggering criteria as described above (e.g., requiring that at least two sensor receivers be simultaneously triggered). Subsequently, any data panel with at least one triggered window may be labeled as a "non-trivial data panel." It should be understood that the criteria for selecting what constitutes a non-trivial data panel may vary and require more than one remaining triggered trace or other indicators of noise-free triggered activity. For example, the receiver triggering criteria may be that sensor receivers are triggered at all times when at least one of their corresponding data traces is triggered. The data panel may be considered "non-trivial" whenever at least two sensor receivers are triggered and that at least one triggered sensor receiver has at least two triggered channels, as an example of data panel triggering criteria.

The result of the foregoing noise identification procedure is illustrated in FIG. 6B. In FIG. 6A, the triggered window 604 had been obtained as a result of receiver and data panel predetermined triggering criteria applied without discarding any trace level triggers. After identifying all of the noise traces, the triggered window 604 was completely discarded, as indicated by 612 in FIG. 6B.

Prior to event location calculations, it may be determined if the event is energetic enough to be a particular type of event, such as a casing failure. This may be accomplished by multiplying the maximum amplitude of the data (see Eq. 2) from each sensor receiver with a reference distance, which for example can be the maximum of the distance between the wellheads of producing wells and the passive seismic monitoring well, in a production operations implementation of the present disclosure. The resulting quantity may be an initial estimate of the total event energy, also referred to as a Reference RPPV (Range×Peak Particle Velocity). If the product does not exceed a conservatively chosen threshold, then the event may be considered not energetic enough to be a casing failure, for example.

Event Location Solution

In some embodiments according to the present disclosure, the analysis of microseismic data corresponding to an event of interest may incorporate the calculation of geometric characteristics, including event location. Determining the location of an event may be performed through an iterative process that begins with an initial location and proceeds to evaluate the results of that location selection and update as needed to minimize the errors between calculated and inferred data. By way of example, the following sequence may be employed to estimate a source location:

(i) calculate a set of grid points that becomes coarser as the distance from the monitoring well increases, and optionally store this table of geometry and travel time data in a cache;

(ii) receive event data with trigger data as calculated above, and rotate the trace set from tool coordinates to an earth-based reference frame, such as Easting-Northing-Depth coordinates;

(iii) determine an initial set of P-wave arrival time picks from the triggered data panel;

(iv) calculate time windows about each pick and estimate a best-fit azimuth angle in the horizontal plane, using pre-calculated geometry tables;

(v) determine a vertical surface at this best-fit azimuth angle, comprising a 2-D set of grid points passing through the grid point closest to the top receiver;

(vi) calculate azimuth, inclination, and travel time errors at the calculated grid points on the 2-D surface, and determine the grid point on this surface that has minimum sum of errors;

(vii) optionally, determine one or more S-wave arrivals and recalculate the location by minimizing the adjusted errors; and (viii) search surrounding points to identify any grid points with lower total error, if any, and iterate the search until current location is a confirmed minimum total error. Optionally, interpolate grid points to refine the source location estimate if so desired.

These elements are discussed in more detail below.

Calculating Grid Point Data

In one embodiment, relevant geometric and travel time data may be pre-calculated and maintained in tables in computer storage, which may be loaded during processing as needed. In some instances, this may be more efficient than calculating values "on the fly."

The surroundings of the monitoring well may be spatially discretized in 3-D, along any chosen orthonormal coordinate system, Easting-Northing-Depth for instance. The span of the discretized geometry may be selected so as to ensure it covers all potential event locations that can be detected by the current monitoring well. The search for the event location may be limited to this 3-D grid in one embodiment that is conserving of processing time at the expense of computer memory consumption. In other embodiments, it may be appropriate to perform all calculations "on the fly" and avoid a discrete grid in storage. In yet other embodiments, the final location may be interpreted from calculated grid values so as to minimize an error criterion. The resolution of discretization may be chosen based on considerations of the desired precision of the event location.

Figure 7A:
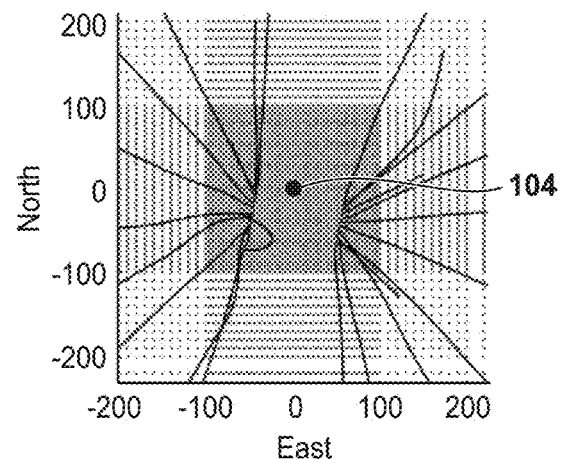
FIGS. 7A-7C illustrate different views of an exemplary production pad with monitoring well and the grid points selected for the geophysical calculations to solve for the event source locations. Specifically.
Figure 7B:
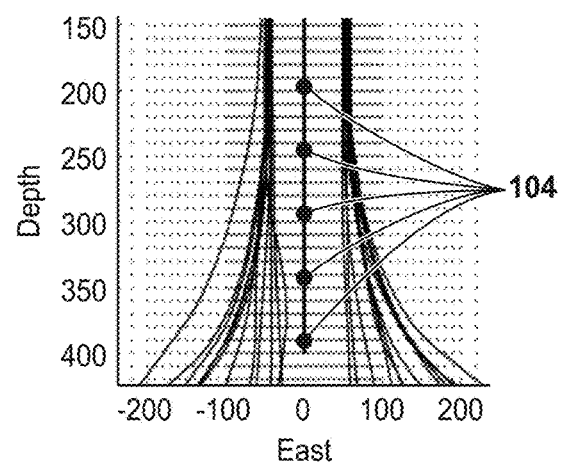
Figure 7C:
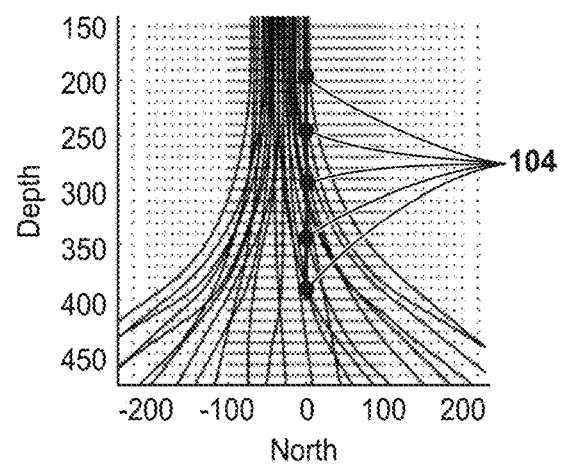

One exemplary set of grid points is illustrated in FIGS. 7A-7C, wherein FIG. 7A shows the Easting-Northing plane, FIG. 7B shows the Easting-Depth plane, and FIG. 7C illustrates the Northing-Depth plane. In these figures, the small black dots in the background represent grid points, with closer spacing throughout the production pad area. The sensor receiver array is indicated by 104, and the dark lines are the wellbore locations on the pad.

Based on the range and speeds of wave propagation in the rock medium, the travel time of P-waves and S-waves between every combination of grid-point and sensor-receiver may be predetermined in advance of the event calculation. Storing these values in a cached table provides significant acceleration of the location solution process.

The P-wave and S-wave travel times between any two points, such as a receiver and a grid point, may be calculated according to any known method. In some embodiments, a simple calculation may involve using a straight raypath between the two coordinates, and the time of travel may be calculated using an average velocity that is representative of the media along the travel path. In such instance, the azimuth angle of the raypath projection on the horizontal Easting-Northing plane may simply be the azimuth angle between source and receiver. Similarly, in the vertical planes Easting-Depth and Northing-Depth, the raypath projections on these planes may be that of a vector between the two locations. Although simple, the foregoing approach may be effective and adequate for many scenarios.

However, as the offset distance between the source and the receiver increases, and as the variability in formation velocities increases (compressive P and/or shear S), the error associated with the approach described above may grow. This is a common problem in seismic processing, and existing literature describes more general calculation techniques to determine the travel time between source and receiver. See, for example, *Solution of the Eikonal Equation By a Finite-difference Method* by F. Qin, K. B. Olsen, Y. Luo, and G. T. Schuster, SEG-1990-1004, and *Finite-difference Solutions of the 3-D Eikonal Equation* by T. Fei, M. C. Fehler, and S. T. Hildebrand, SEG-1995-1129, both of which are incorporated herein by reference in their entirety. These methods typically are solutions to the Eikonal equation and Snell's law.

For curved raypaths in complex media, and possibly deviated monitoring wellbores, the azimuth and inclination angles may differ from the coordinate vector between the source and receiver. Most of the techniques to calculate travel time along curved raypaths may also estimate the angles of impingement at the receiver. Such improved estimates of both travel times and angle of impingement may be used as refined estimates of straight path calculations. The error between straight raypath and more refined calculations varies substantially depending on various factors of the monitoring configuration, source location, and formation velocities.

Receive Trace Sets and Rotate to Earth Coordinates

The event data panel may be first processed through the trigger calculations described above. If the data panel is not rejected for noise, the calculations may proceed with data from the previous step. Determining an event location may then involve rotating the sensor data to earth coordinates, such as Easting-Northing-Depth ("END coordinates") for instance. Sensor receiver data may be projected onto any preferred orthonormal coordinate system. The sensor receiver orientation information required for this rotation may be obtained from the calibration procedures described above, and the rotations are performed via coordinate rotations as may be found in many mathematical references. Note that the trigger time calculations pertain also to the rotated dataset as this is an equivalent set of data.

Figure 8A:
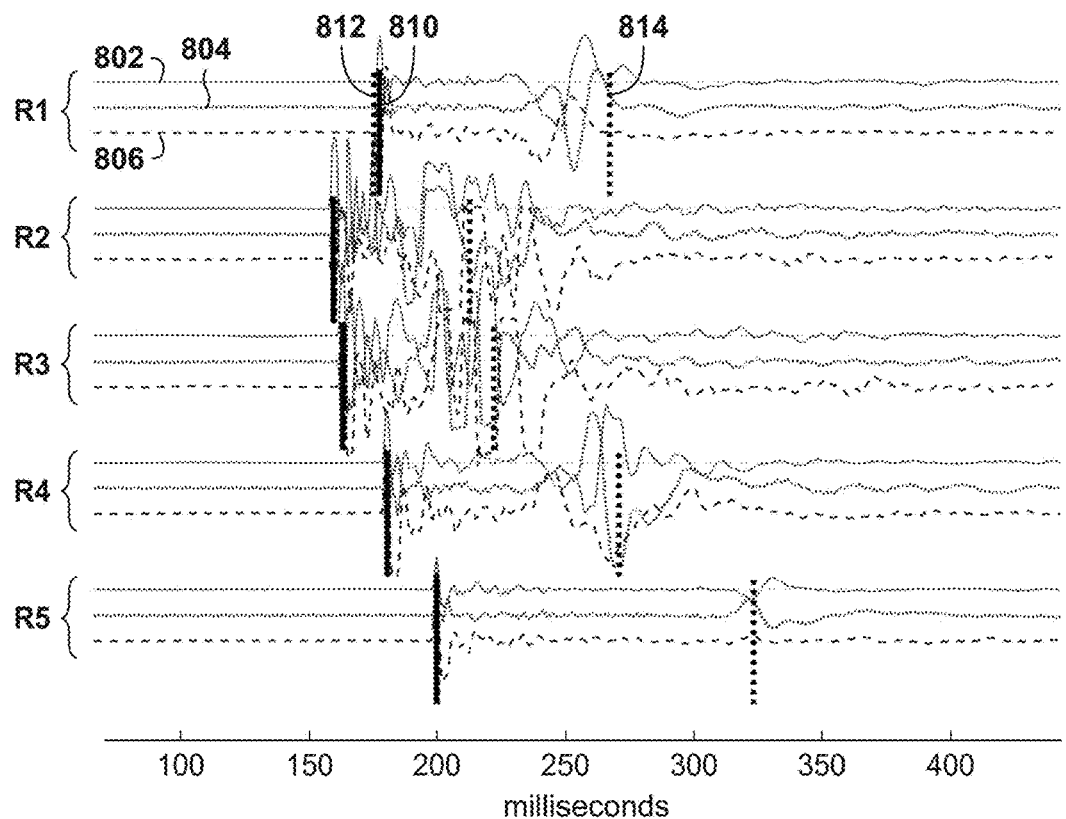
FIG. 8A is a display of the event of FIG. 5 with picked P-wave arrivals and calculated P and S picks, shown in actual recorded time.

As an example, FIG. 8A shows the data segment from FIG. 5 rotated to the END coordinate system. The data segment comprises five trace sets corresponding to receivers R1, R2, R3, R4, and R5, each with an East component, a North component, and a Depth component. For instance, with reference to the trace set corresponding to receiver R1, trace 802 corresponds to the East component, trace 804 corresponds to the North component, and trace 806 corresponds to the Depth component.

Select Initial P-Wave Picks

In some embodiments, the arrival time of the P-waves (or hereafter, "pick") may be determined on a minimum number of sensor receivers, such as two or three. For each receiver with a valid trigger on its data panel, the data amplitude m(t), (or, equivalently, velocity or acceleration) may be calculated according to the following:

$$m(t) = \sqrt{V_E(t)^2 + V_N(t)^2 + V_D(t)^2} \quad \text{(Eq. 2)}$$

where, $V_E$, $V_N(t)$ and $V_D(t)$ respectively denote the seismic data traces within the sensor receiver's data panel in Easting-Northing-Depth for instance. As previously described, the receiver data may be projected onto any preferred orthonormal coordinate system to calculate m(t).

According to some embodiments, the next step in the location analysis may involve identifying all the local minima ($\bar{t}_i$) and local maxima ($t_i$) of m(t) for each triggered trace set. The first local maxima $t_i^*$ at which $m(t_i^*)$ exceeds a configured threshold (either absolute or relative) value may be marked as the arrival time of the P-wave on that sensor receiver or trace set. Alternatively, the step ratios of successive local maximum values $s(t_i) = m(t_i)/m(t_{i-1})$ may be computed, and the first time $t_i^*$ for which $s(t_i^*)$ exceeds a configured absolute threshold may be identified and marked as a possible arrival time of the P-wave. This process is designed to capture the maximum values of each pulse of an event, and it may be repeated for all the sensor receivers whose data panels have been triggered. For events which do not have significant P energy, this procedure may result in a pick of an S-wave arrival time.

Cataloguing the maximum values of each cycle of the event provides a reduced data set that captures the arrival times ($t_i$), peak amplitude ($m_i$), amplitude step ($s_i$), and polarity ($p_i$) of each cycle of acoustic energy, which may be included in a matrix of the form $[t_i, m_i, s_i, p_i]$. In one implementation, polarity may vary between 1 (P-like) to 0 (S-like), or alternatively −1 (S-like). Note there is often a low amount of background signal present when a P-wave arrives, whereas there may be residual P energy present when an S-wave arrives. For this reason, selecting a P pick may be cleaner than selecting an S pick, which may not have data as closely oriented with the SH-SV plane.

The fidelity of event location calculations may depend on the number of receivers with valid P-wave arrival time picks. Without a sufficient number of valid P-wave picks, the calculations may become error prone, eventually leading to incorrect event classifications. Thus, optionally, after the P-wave arrivals have been computed on the sensor receivers, additional criteria may be used to determine if the number of sensor receivers is sufficient to warrant further event analysis. If the number of sensor receivers with valid P-wave arrivals is less than a predetermined value, which may be either absolute (e.g., 3) or relative to the total number of working sensor receivers (e.g., 30%), the event may not be automatically analyzed any further. Such events can be marked for a manual analysis. If certain criteria are met, such as high energy level, these events may be designated with high priority for manual review.

For example, in FIG. 8A, solid vertical lines (such as 810 for R1) indicate the P-wave arrival picks on each trace set. An event location has been automatically calculated, and the first set of vertical dotted lines (such as 812 for R1) show the calculated P-wave arrivals for each trace set. Although one P-wave arrival pick and one P-wave arrival is shown for each of the five trace sets, it may be difficult to distinguish them in FIG. 8 as they are shown very close together. In any event, FIG. 8 also shows a lagging set of dotted vertical lines (such as 814 for R1) for the calculated S-wave arrival times. No S-pick values are shown.

Determine a Best-Fit Azimuth Angle

The azimuth angle from source to receiver may be best calculated over a time interval of roughly one to a few oscillations. However, the data at this point includes arrivals that are shifted in time because of the different travel times to each receiver. Simply selecting a common time window may yield too much data to calculate azimuth angle. Accordingly, a convenient transformation to help facilitate selection of an appropriate time interval to determine the event azimuth may be to change from recorded time to "corrected time", wherein the different P-wave arrivals may be aligned.

Figure 8B:
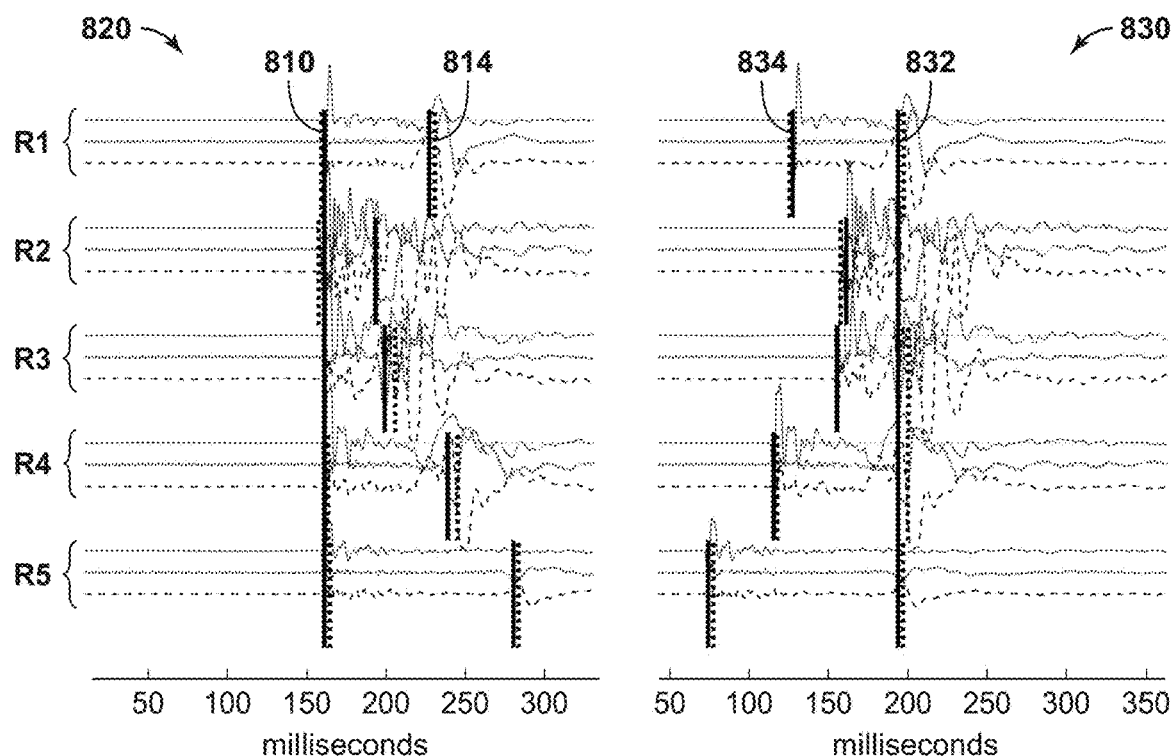
FIG. 8B is a split display showing exemplary trace sets for five receiver levels, with P-wave travel time corrections and S-wave travel time corrections, respectively, illustrated on the left panel and the right panel.

As an example, it may be useful to consider a data segment transformed by shifting the time axes for each receiver level according to the travel time difference between some reference time and the picked or calculated arrival at each receiver. These time shifts may be accomplished using data picks and/or data cross-correlation calculations. FIG. 8B is a split display showing exemplary data segment of five trace sets for five receiver levels, where the left panel 820 includes P-wave travel time corrections and the right panel 830 includes S-wave travel time corrections. Specifically, in 820, the rotated P-SH-SV coordinate data is corrected for the P-wave travel time. In 830, the data is corrected for the S-wave travel time. In this example, the reference value to which all traces are shifted is the time of the first pick; however, any other reference value may be chosen.

In 820, all P picks such as 810 are aligned, and the P arrival data is also aligned. However, the S arrivals 814 are not aligned. The S arrivals are said to be under-corrected as the time shift was too small to line up the S arrivals. On the other hand, in 830, which is corrected for the S-wave travel times, the S arrivals such as 832 are aligned. It is evident, however, that the P picks 834 are not aligned. The P picks have now been over-corrected since the time shifts are too large. These time shifts correct for the moveout of the arriving energy of each of the P-waves and S-waves, respectively.

When so aligned, it is possible to examine small windows about the same corrected time axis across all receivers to examine the orientation of the arrivals in the Easting-Northing, Easting-Depth, and Northing-Depth planes. This is referred to as a "hodogram" analysis. Hodograms are 2-D plots that depict the microseismic waveforms in phase-space, and they can be used to determine the directions of arrival of seismic waves onto each sensor receiver, the so-called angle of impingement. Specifically, hodograms can be used to infer the azimuth and inclination angles of the event relative to a sensor receiver. For each sensor-receiver, hodograms may be computed by considering a window of time (typically a few tens of milliseconds long) spanning the sensor receiver's P or S arrival picks.

Figure 8C:
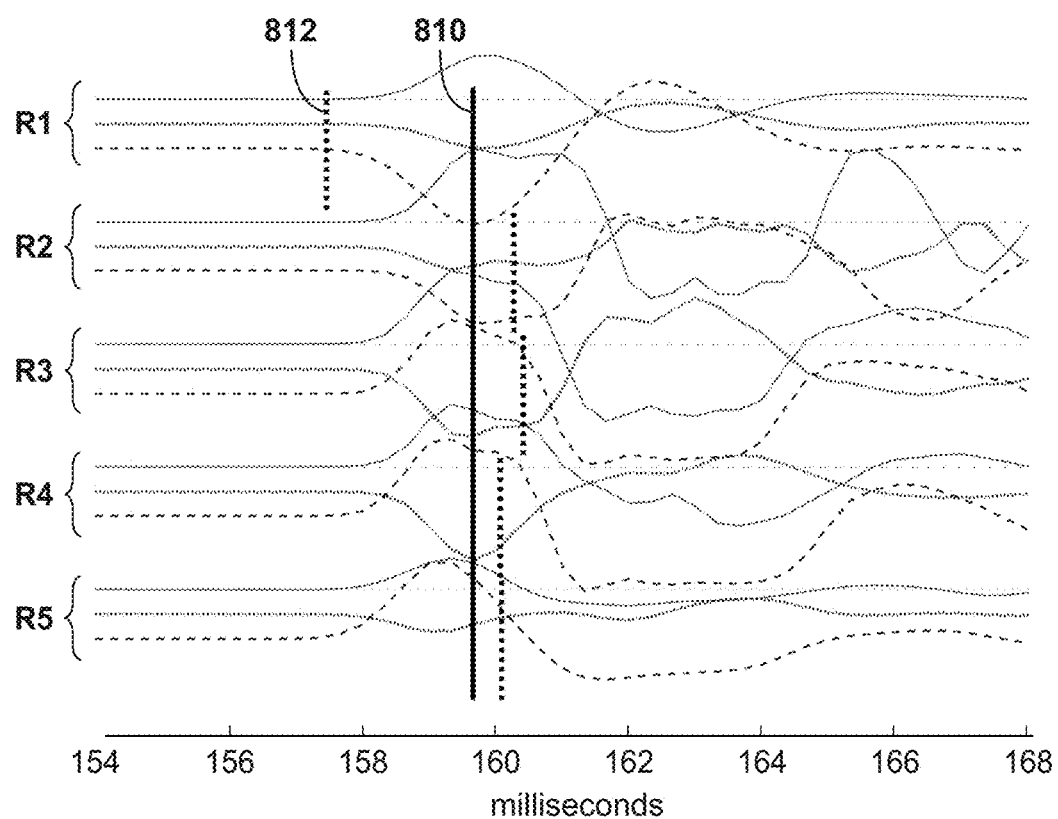
FIG. 8C provides a short time window for the event of FIG. 5 displayed in P-wave corrected time.

In FIG. 8C, data from the P-corrected display 820 is presented alone, with a shorter time window to provide more accurate hodogram analysis. In this example, the time window is 14 milliseconds in length, comprising a few cycles of particle motion. Longer or shorter time windows may be selected, this value is just one example.

Figure 8D:
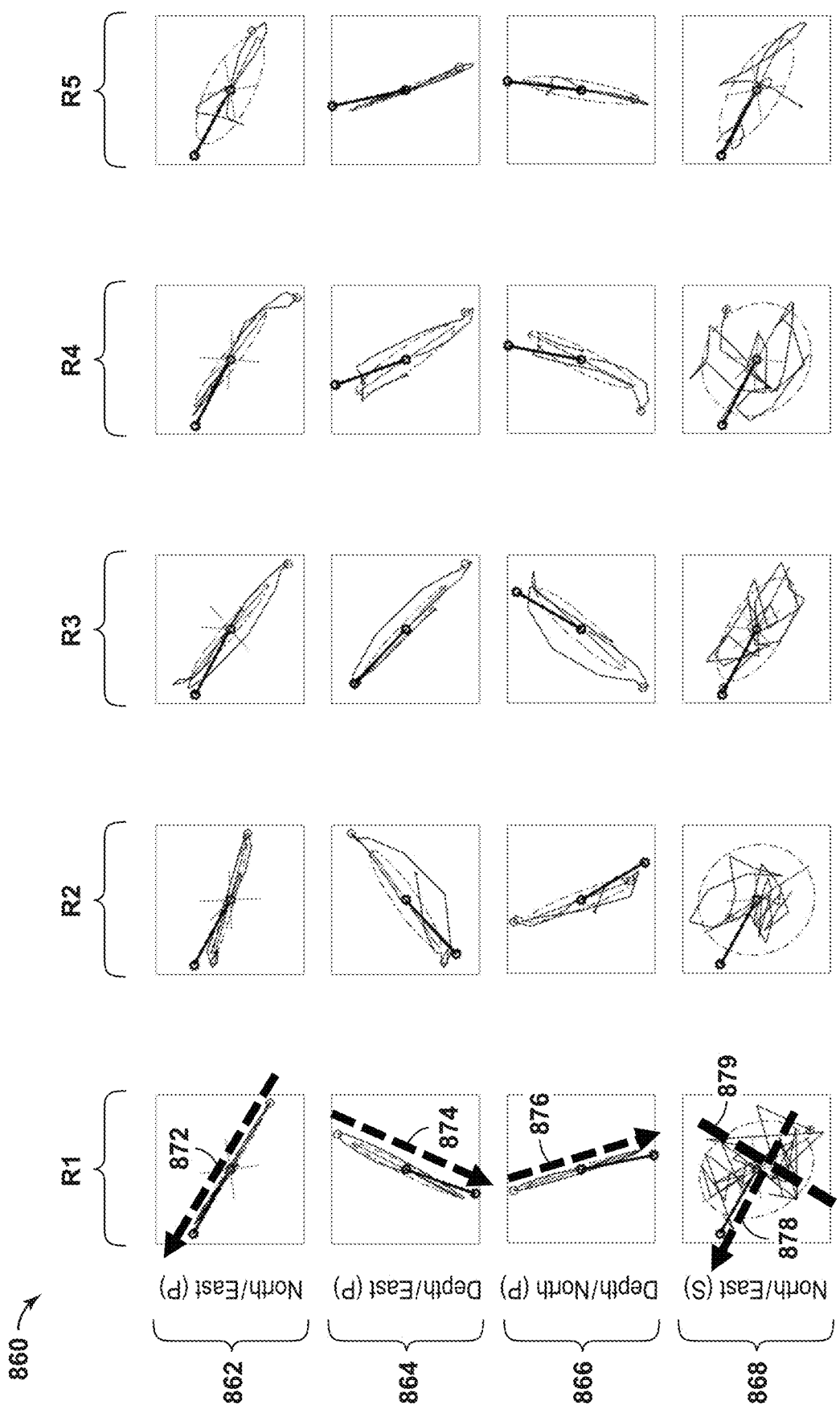
FIG. 8D illustrates an example of a hodogram display of the event components shown in FIG. 8C.

FIG. 8D illustrates an exemplary set of hodograms 860 on data from the five sensor receivers, R1, R2, R3, R4 and R5, corresponding to the data windows of FIG. 8C. Rows 862, 864 and 866 show the P-wave hodograms in the Northing-Easting, Easting-Depth and Northing-Depth planes, respectively, for each sensor receiver R1, R2, R3, R4 and R5. For each sensor receiver, the arrows marked in the hodograms align with the principal component direction of the corresponding waveform. For P-wave hodograms, these directions point directly toward (or away from) the location of the event. As may be appreciated from FIG. 8D, the azimuth angle 872 and those along the top row in panel 862 for all sensor receivers are approximately equal, since the monitoring well in this example is nearly vertical. However, in the vertical plane, the inclination angles in panels 864 and 866 (i.e., 874 and 876, respectively) are significantly different across the sensor receivers because the array spans a wide vertical region about the event, and the event is relatively close to the array.

S-wave hodograms may also be plotted for sensor receivers with valid S-wave picks. Row 868 illustrates exemplary S-wave hodograms for receivers R1, R2, R3, R4 and R5, displayed using an S-corrected time axis that is a subset of 830. Since the particle motion for S-waves is orthogonal to the direction of wave propagation, the vector 878 pointing to the event location and the receiver should be oriented at least somewhat normal to the principal component 879 in the S-hodogram. There are several reasons why the S-wave hodogram is not as sharp an indicator of direction as the P-wave hodogram, but it can provide some degree of confirmation that the S-wave arrival is present.

For each sensor receiver, the time window considered for a P-wave hodogram analysis may be iteratively refined so as to obtain the required sharpness (i.e., a dominant principal component) and thus a more accurate direction of the seismic wave propagation. However, in many cases this may not be required.

The azimuth and inclination angles resulting from all such hodograms may be calculated, stored, and used in subsequent calculations. For each combination of grid point and sensor receiver with a valid P-pick, the difference between the calculated azimuth (describe above) and azimuth determined from the sensor receiver's hodogram analysis is calculated as the "azimuth error." The same is true for inclination errors calculated along vertical planes.

Determine a Vertical Surface Along Azimuth Angle

To render a 3-D problem in 2-D, it is beneficial to first determine a 2-D surface that includes a convenient reference and the event source location. For this purpose, one choice is to use the location of the first sensor receiver as a reference. This 2-D surface may be determined by searching in a horizontal plane near the first receiver and determining those points with the least azimuthal error as one traverses the geometric grid points from one side to the other.

Figure 9:
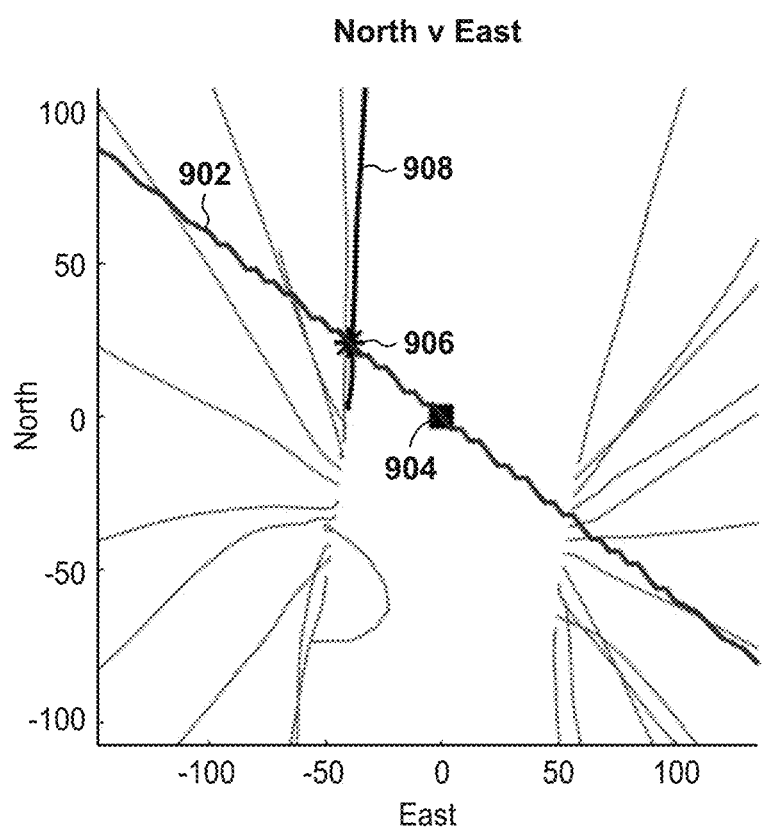
FIG. 9 is an Easting-Northing view of an exemplary pad showing a monitoring well and a 2-D surface constructed through the event source location.

FIG. 9 shows an Easting-Northing view of an exemplary pad showing a monitoring well and a 2-D surface constructed through the event source location. An example of a sub-planar surface is seen in FIG. 9 as the wavy line 902 passing from the Northwest to the Southeast quadrant, with the monitoring well represented by the square 904 in the center, and the event location shown by the asterisk 906. The event is located on wellbore 908 shown by the darker line.

Calculate Component Errors and Determine the Grid Point with Minimum Total Error For each sensor receiver with a valid P-arrival pick, the difference between the modeled P-wave arrival times and the picked P-wave arrival times may be calculated. This yields the initial "P-wave travel time error" between grid-points and corresponding sensor-receiver pairs. The differences between measured and calculated azimuth and inclination angles are also evaluated.

For each grid point, at least the following geometric attributes may be calculated with respect to each sensor receiver:

Range: The Euclidean distance between the grid point and the sensor receiver.

Azimuth: The angle between the projection of the line-segment connecting the grid point to the sensor receiver onto the Easting-Northing plane and a reference horizontal line pointing north.

Inclination: The angles between the line-segment connecting the grid point to the sensor receiver and its projection onto reference Easting-Depth and Northing-Depth planes.

According to some aspects of the present disclosure, for every combination of grid point and sensor receiver with a valid P-arrival pick, the difference between the calculated inclination angle (described above) and the inclination angle determined from the sensor-receiver's hodogram may be determined as the "inclination error." Then, for each pair of grid point and sensor receiver, the travel time, azimuth, and inclination errors may be normalized and summed up to compute a "total error" for that pair. This summation of errors may be performed by assigning different weights to each error based on the degree of confidence in the calculation of that error. Thus, for example, we might equate 5 degrees of angular error with 1 millisecond of time error, facilitating normalization of the different error types. The grid point with the least total error may be marked as the initial solution location for the microseismic event source.

Optionally, in some embodiments, the accuracy of event location calculations may be further improved by identifying sensor receivers with erroneous arrival picks and omitting them from the analysis. This may be accomplished automatically or manually, depending in part on the execution mode of the processing.

Such sensor receivers may be identified in at least one method using the following exemplary procedure. For each sensor receiver, the event location may be determined by ignoring that receiver from the calculation process (i.e., considering all the sensor receivers except the one under analysis). The event location determined as such may be compared to the location obtained by considering all the sensor receivers. If the change in the event location is larger than a chosen value, the sensor receiver under analysis may be permanently omitted. This process may be successively repeated for all sensor receivers, marking receivers for permanent omission along the way, until the change in event location is acceptable. The event location calculation may be repeated one final time, using only data from those sensor receivers that have not been permanently omitted from the analysis.

Computational efficiency is gained by the reduction of a 3-D problem to 2-D by use of the vertical surface at the determined azimuth angle. The problem is reduced to one of calculating the grid point on this surface with minimum error as calculated above. Calculation efficiency may be increased in some embodiments by starting with the errors from the initialization step. In the nested loop in which the azimuth, inclination, and time errors are combined, when the accumulated error exceeds the total error at the initial source location or the error from a previous step, that iteration may be terminated since it is no longer a candidate for the title of "minimum error".

Table 2 provides a table of values of picks, calculated values, and errors between the two to provide an illustration of the error calculations that are minimized in this procedure. The "weighted difference" for the angular contributions assumes a multiplier of 0.2 for an equivalence of 5 degrees equal to 1 millisecond. Note that the inclination errors are determined in each of the two vertical planes along the axes and are then combined with projection multipliers of sine and cosine squared, such that the total inclination angle weight is 1. Either an L1 norm or an L2 norm may be used in this procedure; both are illustrated.

TABLE 2

|  | R1 | R2 | R3 | R4 | R5 | L1 Error | L2 Error |
|---|---|---|---|---|---|---|---|
| Measured Azimuth | 301.0 | 301.0 | 301.0 | 301.0 | 301.0 |  |  |
| Calculated Azimuth | 300.7 | 285.9 | 309.7 | 307.7 | 298.1 |  |  |
| Difference | 0.3 | 15.1 | −8.7 | −6.7 | 2.9 |  |  |
| Weighted Difference | 0.1 | 3.0 | −1.7 | −1.3 | 0.6 | 6.74 | 14.28 |
| Measured E-D Inclination | −27.5 | −56.3 | −134.0 | −147.0 | −159.4 |  |  |
| Calculated E-D Inclination | −32.4 | −70.7 | −130.4 | −154.3 | −163.0 |  |  |
| Difference | 4.9 | 14.4 | −3.6 | 7.3 | 3.6 |  |  |
| Weighted Difference | 1.0 | 2.9 | −0.7 | 1.5 | 0.7 |  |  |
| Projection Multiplier = 0.735 | 0.7 | 2.1 | −0.5 | 1.1 | 0.5 | 4.97 | 6.71 |
| Measured N-D Inclination | 17.1 | 20.6 | 139.6 | 154.3 | 169.9 |  |  |
| Calculated N-D Inclination | 20.9 | 59.7 | 144.8 | 163.9 | 169.6 |  |  |
| Difference | −3.8 | −39.1 | −5.2 | −9.6 | 0.3 |  |  |
| Weighted Difference | −0.8 | −7.8 | −1.0 | −1.9 | 0.1 |  |  |
| Projection Multiplier = 0.265 | −0.2 | −2.1 | −0.3 | −0.5 | 0.0 | 3.07 | 4.67 |
| Measured P-wave Arrival | 177.5 | 159.7 | 163.3 | 180.7 | 200.0 |  |  |
| Calculated P-wave Arrival | 175.5 | 160.3 | 164.1 | 181.1 | 200.4 |  |  |
| Difference | 2.0 | −0.6 | −0.8 | −0.4 | −0.4 | 4.20 | 5.32 |
| Sum Total Error |  |  |  |  |  | 19.0 | 31.0 |

Figure 10A:
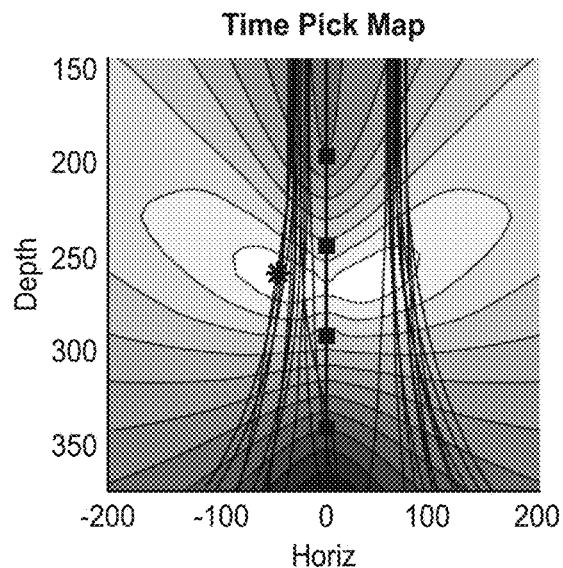
FIGS. 10A-10D illustrate different components of an event source location solution method. Specifically.
Figure 10B:
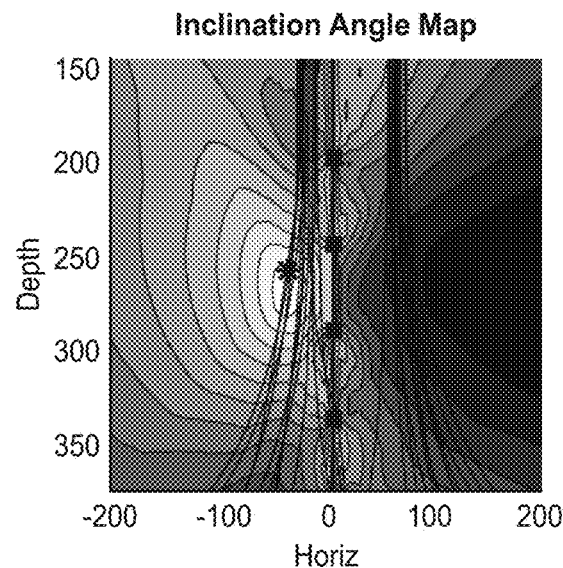
Figure 10C:
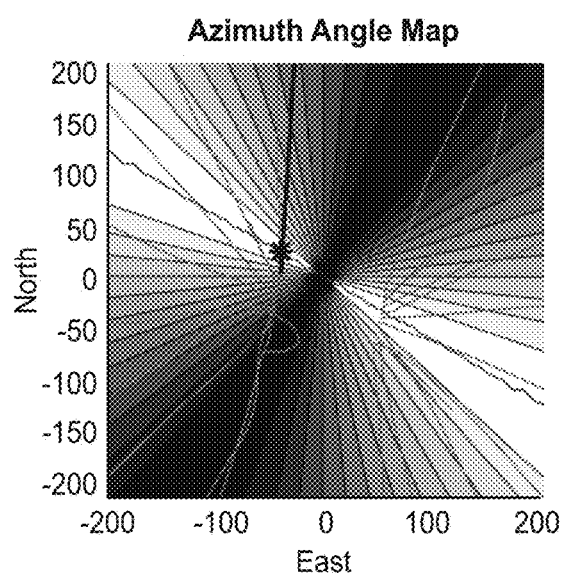
Figure 10D:
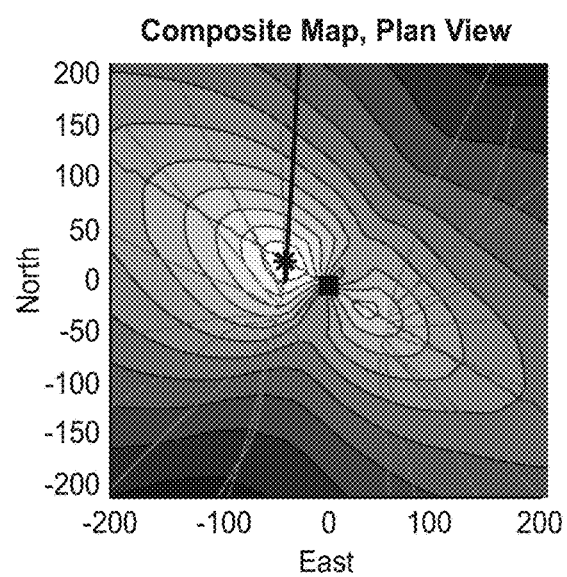

FIGS. 10A-10D provide an additional view of how these errors are determined for one receiver. Specifically, FIG. 10A shows a symmetric error function resulting from travel time differences; FIG. 10B shows an asymmetric error function from the inclination angle differences; FIG. 10C shows the error function in plan view resulting from azimuth angle differences; FIG. 10D is a plan view of the composite (or total) error map. The symmetric error function illustrated in FIG. 10A indicates that time errors constrain the solution in radius and depth but not azimuth. FIG. 10B shows the importance of the inclination errors to constrain the solution to one side of the well, which neither time (FIG. 10A) nor azimuth angle (FIG. 10C) can accomplish. Inclination also provides a depth constraint. FIG. 10C shows that the solution is constrained to the 2-D surface described previously.

At this stage in the process, a grid point on a 2-D surface has been identified that has a minimum weighted sum of azimuthal, inclination, and time errors, for the current P picks. In one embodiment, no S-wave picks have been considered thus far.

Determine S-Wave Arrivals as Appropriate

For certain classes of events, the inclusion of one or more S-wave arrival times can provide an important contribution to the event location. To search for S-wave arrivals, polarization analysis may be used in one exemplary method.

A coordinate system that facilitates polarization analysis is one that is "pointed" at the source location from each receiver. The axis oriented along the direction from the receiver to the source is the "P" axis corresponding to the compressive P-wave. Perpendicular to the P axis is the "SH" horizontal shear axis located in the horizontal plane, as well as the "SV" vertical shear axis oriented perpendicular to both the P and SH axes. This may be referred to as the "PS" coordinate system, where it is understood that there is a different PS system at each receiver. Naturally, the better the source location solution and the implied calculations, the better the data in PS coordinates represents proper separation of P and S acoustic modes.

Figure 11:
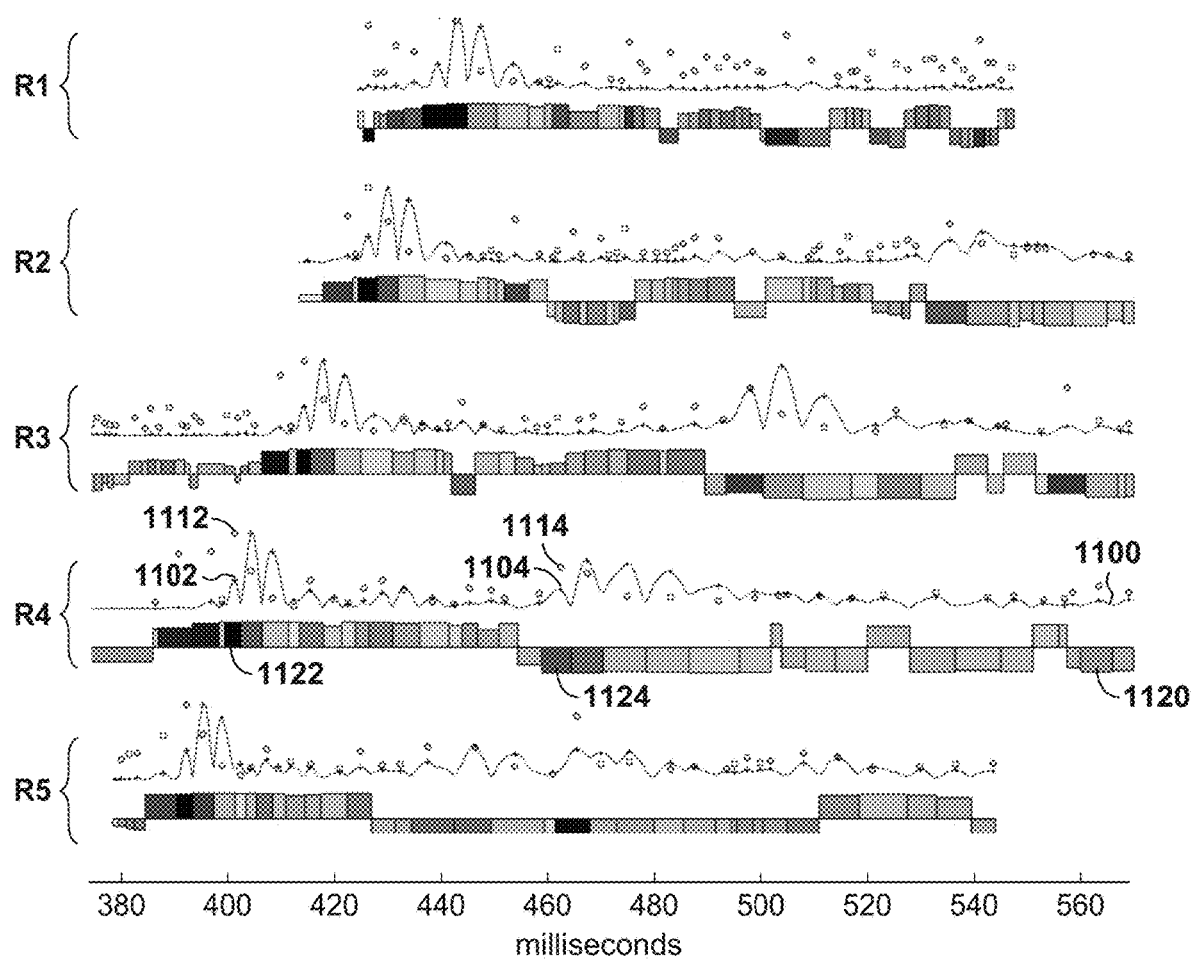
FIG. 11 is an exemplary snapshot of stripes calculation outputs with two distinct windows of triggers, used to evaluate event polarity to determine P-wave and S-wave arrivals on sensor receivers.

FIG. 11 is an exemplary illustration of the result of a procedure described to identify the polarity of each pulse of a trace set, referred to as the "stripes" procedure. With respect to R4, for example, the amplitude m(t) of the trace set is indicated by the solid line 1100. The local maximum data amplitudes $m(t_i)$ of the energy pulses are indicated by the tick marks 1102 at the local maxima $(t_i, m_i)$ of the data amplitude trace 1100, and the corresponding step values $s(t_i)$ are shown as small circles 1112. In one embodiment, the P-wave arrivals on the sensor receivers R1, R2, R3, R4, and R5 are identified as the first local maximum values $t_i^*$ at which $m(t_i^*)$ exceed a pre-configured value. For example, this pre-configured value may be one-third of the maximum value of $m(t_i)$ of each trace set. However other values and criteria may be used within this general framework of assessing the arrival of energy pulses and determining their magnitude and orientation. Here, 1102 and 1112 refer to the specific arrival time of the P-wave on receiver R4.

For each such energy pulse, defined as the time interval between adjacent minima of m(t), the polarity $p(t_i)$ may be calculated. This polarity may be determined in a number of different ways. The series of boxes 1120 are plotted along the same time axis as 1100 to illustrate the polarity of each pulse. The box 1122 is an upwards tick that indicates more P-like than S-like orientation, whereas the later arrival (indicated by 1104, 1114, and 1124) is marked by a box that ticks downwards to show more S-like orientation. The heights of the boxes 1122 and 1124 are determined by the ratio of P to S magnitude, in this case the relative root-mean-square (RMS) values determined for each energy pulse, and the shade of the box is related to the pulse step size $s(t_i)$ compared to the maximum step size for the time window. Therefore, the magnitude peak 1102 indicates a candidate P arrival, with a high step size 1112 and a dark, positively-oriented polarity box 1122. On the other hand, peak 1104 is a candidate S arrival, with a relatively high step size 1114 and a dark, negatively-oriented polarity box 1124.

In FIG. 11, the locations of the local maxima $(t_i)$ on the time series are depicted by tick marks on the plotted amplitude curve, such as those indicated by 1102 and 1104. The seismic data record for a receiver may thereby be reduced to a smaller set of arrival peak amplitudes, amplitude steps, and the corresponding polarity. This data depopulation to the set $[t_i, m_i, s_i, p_i]$ for each receiver may be used advantageously by an automated data processing system as many fewer arrival times need be considered. It should be understood that this illustration is provided as an example only and other methodologies known in the art for calculating arrival times on each sensor receiver may be used with other aspects of the disclosure.

Optionally, according to some aspects of the disclosure, in addition to P-wave arrivals, S-wave arrivals may also be determined for each sensor receiver. An exemplary procedure to detect S-wave arrivals may be as follows. The local minima $(\bar{t}_i)$ and maxima $(t_i)$ of m(t) have been computed as described above. For each trace set corresponding to a sensor receiver, the first local maxima $t_i^{**}$ that lies in a triggered window following the time window containing the P-wave pick may be identified and considered as a possible S-wave arrival on that sensor receiver or channel. Then the process may be repeated according to predetermined criteria and iterated to converge to the minimum error. This procedure might be optimal if there is sufficient separation between the P and S energy pulses.

The triggering process for S-wave arrivals may also be performed using a different criterion from P-wave triggers. For example, in situations where STA/LTA criteria does not lead to triggering of the S-wave arrival, one may choose to perform only an amplitude-based thresholding disregarding the step value for an interval following the P arrival, looking for the initiation of S-like polarity. In yet other embodiments, the current event solution determined from the P picks may have associated (calculated) S arrival times. These times may not be correct, as the calculated times in a data panel wherein only P-wave arrivals have been picked may be different from the picked times when S-wave arrivals are also picked. When processing an event in manual mode, this may be recognized by the analyst and remedied by making at least one S pick, which may be enough to move the solution for certain classes of events.

Heel events, for example, occur deep in the formation, whereas a solution based only on P arrivals and hodogram analysis often yields locations with calculated S arrivals that are early relative to the observed S-wave times. The initial source location may be estimated using the P-wave picks based on methods disclosed herein, or by any known alternate approach. For each receiver, a search starting at the location of the calculated S pick may be conducted, looking at either earlier or later arrivals, but in a preferred embodiment initially looking for later arrivals. The calculated energy pulse matrix $[t_i, m_i, s_i, p_i]$ may be evaluated to determine the closest, high amplitude S-like peak value as a trial S pick. With one such pick, the event location may be updated and then the updated values of the energy pulse matrix may be compared with the new calculated S-picks. This process may be iterated to convergence using a sufficiently robust number of S-picks, ensuring that calculated S arrivals are picked reasonably close to corresponding energy pulse arrivals that have appreciable S-like polarization values $(p_i \sim 0)$. In this process, the ratios between successive amplitudes $m_i$ and the change in polarization angles $p_i$ may be used to select the arrival pulse that indicates the arriving S-wave. In yet another implementation, local maxima following the calculated S-wave arrival may be considered in priority order determined by the combined step value and polarity change from P-like to S-like. With candidate S picks, the location solution can be calculated and the error assessed. Note there may be greater variation between calculated and picked S arrivals than the difference in P arrivals, in part the result of azimuthal anisotropy and/or shear wave splitting.

Figure 12A:
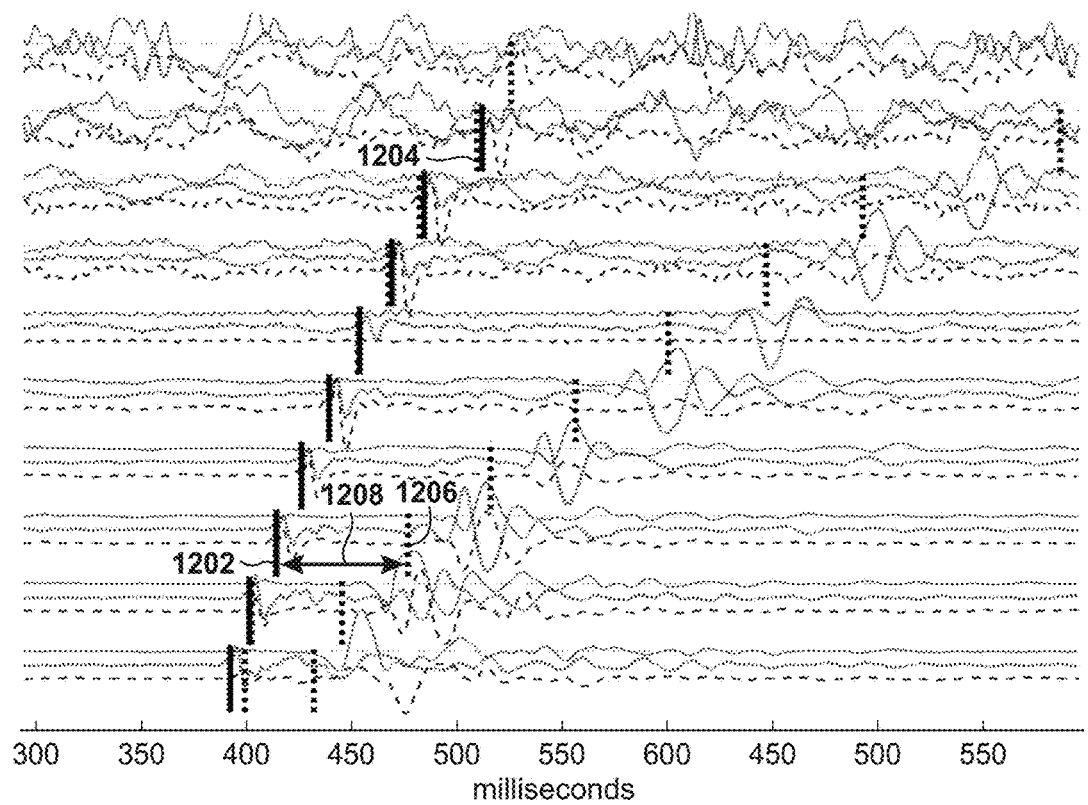
FIG. 12A illustrates an exemplary location identification process for a deep event using P-wave arrival picks only.
Figure 12B:
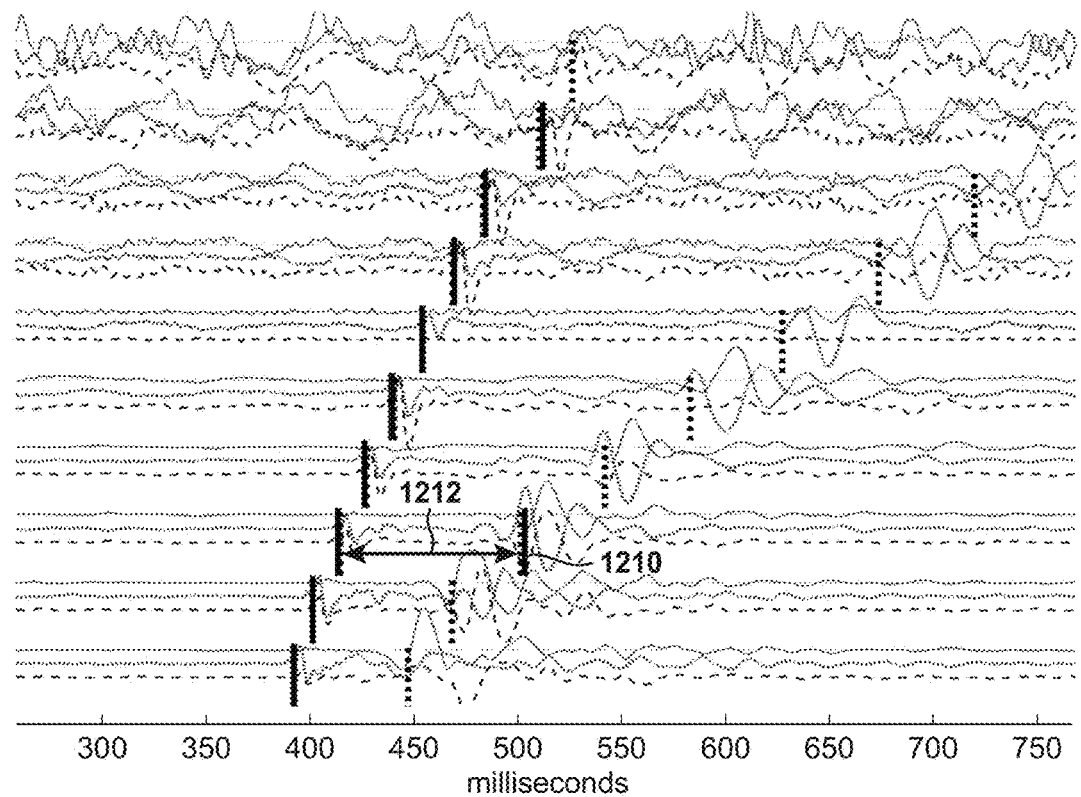
FIG. 12B illustrates the exemplary location identification process of FIG. 12A including an S-wave arrival pick.
Figure 12C:
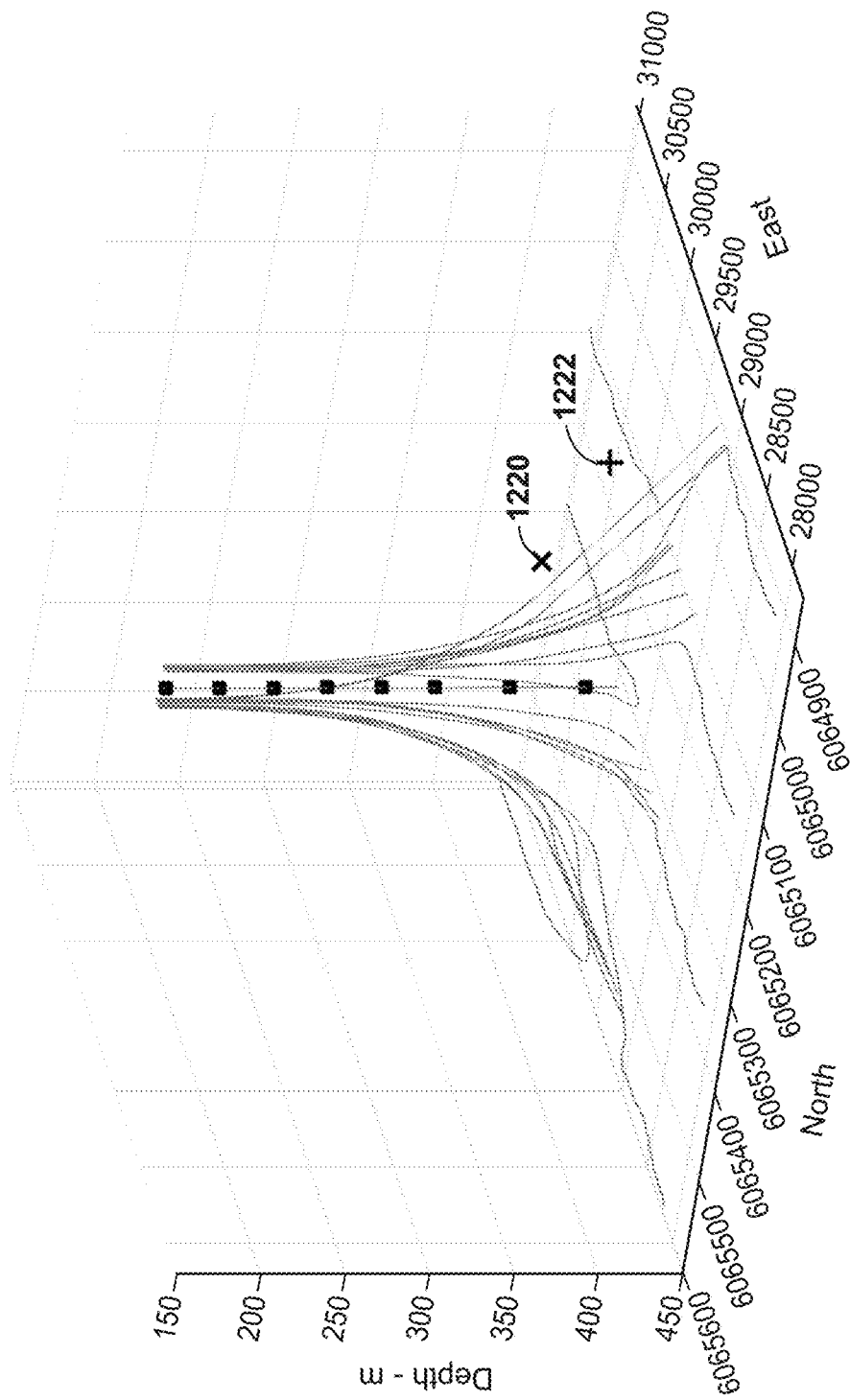
FIG. 12C illustrates the difference between the two event locations of FIG. 12A and FIG. 12B in a map view.

FIGS. 12A-12C illustrate the effect of using S-wave picks in an event location calculation. Specifically, FIG. 12A shows a data panel corresponding to an exemplary heel event, wherein only the P-wave arrivals have been picked using the procedure described above. In this example, a sensor array of the monitoring system includes ten sensor receivers, each equipped with tri-axial installation of three geophones. The P-wave picks are indicated by solid vertical line segments, such as 1202 corresponding to the P-wave pick on the eighth sensor receiver. The P-wave arrivals at various sensor receivers estimated from travel time calculations are shown as vertical dotted line segments 1204. Continuing to focus on the eighth receiver as an example, numeral 1206 indicates an exemplary S-wave arrival calculated using travel time estimates based on the initial location. The P-S time interval 1208 corresponds to the difference in the calculated arrival times of the P-wave and S-wave at the receiver. With only the P-wave picks available, the calculation in this example places the event at a depth of 370 meters and range of 70 meters, at the location marked 1220 in FIG. 12C.

Continuing with this example, FIG. 12B illustrates the same data panel where, in addition to the P-wave picks, the S-wave pick 1210 on the eighth sensor receiver has been set. The time interval 1212 corresponds to the difference in P- and S-arrivals at this receiver based on the updated event location. With this additional S-pick considered in the event location calculations, the event is located at a depth of 430 meters and a range of 95 meters, as shown by 1222 in FIG. 12C. As may be appreciated by comparing the time intervals 1208 and 1212, the fact that the latter is longer indicates that the event is located further away from the seismic sensors than the solution given by 1208.

In contrast to the example illustrated in FIGS. 12A-12C, it may be detrimental to include the S-wave picks in the location of events such as casing failures that occur in the intermediate depths. This is primarily because solutions based on P arrivals and inclination angles have been found to be accurate for events located within about 100 meters of the monitoring well, and uncertainty in the S-wave velocity model is a source of error for these intermediate depths. While, in some instances, shear wave azimuthal anisotropy may be suspected, the velocities are not known precisely for all depths. Thus, in some embodiments of the present disclosure, the microseismic analysis may include a step of identifying if the event is shallow, intermediate or deep, prior to recalculating the event location using S wave arrivals. In one embodiment, a process based on event depth may be used to determine whether the S-wave arrival times should be included in the event location calculation.

Search Surrounding Grid Points and Interpolate Grid

In certain circumstances, it may be recognized that the event source location is close to, but not precisely located on, the 2-D surface that was constructed. In certain embodiments, a local search may then be performed to determine if there is a nearby grid point that has lower total error than the point on the grid. If so, then the offset grid point with minimum error is presumed to be the source location and the "step around" procedure may be repeated. This process may iterate until the grid point with a local minimum error is obtained.

In other embodiments, an interpolation scheme may be used to refine the source location estimate from the surrounding grid point data.

Event Attributes

According to some aspects of the present disclosure, values for event attributes of an event reflected in a non-trivial data panel may be calculated. In this process, an event solution (i.e. event location) may be used to calculate some attribute values, but the location may not necessarily be required or useful in the calculation of all attribute values. In this context, an attribute may be any characteristic of the microseismic data that can be measured or calculated. For example, a peak event velocity of the measured signals may be determined, or the amplitude or magnitude of the event. The event flux or a measure of the cumulative energy in the particular time window being analyzed may also be determined. Other attributes include: event polarity (explosive or implosive); proximity to one or more of the monitored wells; ratio of P-wave to S-wave peak velocity or cumulative energy; ratio of SH-wave (horizontal S) and SV-wave (vertical S) peak velocity or cumulative energy; event depth; frequency spectral characteristics; consistency between channels and depth levels; ratio of cumulative amplitudes of adjacent overlapping time windows within each channel-time offset from events related to production operations.

In yet other embodiments, other geometric characteristics may be calculated such as distance between event location and sensor receivers, distance between event location and offset wellbores, distance between event location and reservoir layers, and distance between event location and natural fractures or faults, may be determined and relied upon as the basis for further estimation of attributes of an event that form the basis of an event classification.

In the following paragraphs, some of these attributes are further described and their calculation procedure is exemplified. Most of the calculations may be performed in commercial software packages such as MATLAB®.

Event Magnitude

The event magnitude is an attribute that indicates the strength of a microseismic event. In a strict usage of the term, "event magnitude" is expressed in decibels (dB) or in the Richter scale. In the following, we use the term interchangeably to denote any quantity that is indicative of the energy of the microseismic event. In particular, event magnitude may refer to one or more of Peak Particle Velocity (PPV), Energy Flux, Moment Flux, RPPV, or the presence of a "clipped" signature. Each may be defined as follows:

Peak Particle Velocity (PPV):

For each sensor receiver (indexed by k), the Peak Particle Velocity may be computed as:

$$PPV^k = \max_{t \in T_P^k}\{\sqrt{V_x^k(t)^2 + V_y^k(t)^2 + V_z^k(t)^2}\} \quad \text{(Eq. 3)}$$

where $V_x^k(t)$, $V_y^k(t)$ and $V_z^k(t)$ are the velocity components of the trace set recorded by the seismic sensors of the sensor receiver k, in a time-window $T_P^k$ that straddles the P-wave arrival. This time-window is typically a few tens of milliseconds in duration. The overall peak particle velocity (PPV*) may be computed as the mean or the maximum of the peak particle velocities across all the functioning, noise-free sensor-receivers with valid P-wave arrival picks.

Energy Flux:

For each sensor receiver, the P-, SH- and SV-energy fluxes may be evaluated as follows:

$$E_P^k = \frac{4\pi\rho\alpha}{R_P^2} \times (r^k)^2 \times \int_{T_P^k} V_P(t)^2 dt \quad \text{(Eq. 4)}$$

$$E_{SH}^k = \frac{4\pi\rho\beta}{R_{SH}^2} \times (r^k)^2 \times \int_{T_S^k} V_{SH}(t)^2 dt \quad \text{(Eq. 5)}$$

$$E_{SV}^k = \frac{4\pi\rho\beta}{R_{SV}^2} \times (r^k)^2 \times \int_{T_S^k} V_{SV}(t)^2 dt \quad \text{(Eq. 6)}$$

where $\rho$ is the rock density, $\alpha$ and $\beta$ are the speeds of propagation of the P-waves and S-waves in the rock, $r^k$ is the distance between the sensor receiver (k) and the event source; $R_P$, $R_{SH}$ and $R_{SV}$ are the P-, SH- and SV-radiation pattern coefficients respectively (see, e.g., S. Talebi et al., *Microseismic Detection of Casing Failures at a Heavy Oil Operation*, U.S. Rock Mechanics Symposium, American Rock Mechanics Association (ARMA-07-208) 2007, incorporated herein by reference); $T_P^k$ is a window of time (typically tens of milliseconds long) that encompasses the P-wave signal, and $T_S^k$ is a time-window (typically larger than the P-window, but still several tens of milliseconds long) that encompasses the S-wave; $V_P(t)$, $V_{SH}(t)$ and $V_{SV}(t)$ are respectively the sensor receiver velocity components along the direction of wave-propagation (P-), along the shear plane in a direction where the particle displacement is parallel to the strata (SH-), and along the shear plane in a direction normal to the strata (SV-).

Moment Flux:

For each sensor receiver (indexed by k), the P-, SH- and SV-moment fluxes may be evaluated as follows:

$$M_P^k = \frac{4\pi\rho\alpha^3}{R_P} \times r^k \times \int_{T_P^k} U_P(t)dt \quad \text{(Eq. 7)}$$

$$M_{SH}^k = \frac{4\pi\rho\beta^3}{R_{SH}} \times r^k \times \int_{T_S^k} U_{SH}(t)dt \quad \text{(Eq. 8)}$$

$$M_{SV}^k = \frac{4\pi\rho\beta^3}{R_{SV}} \times r^k \times \int_{T_S^k} U_{SV}(t)dt \quad \text{(Eq. 9)}$$

where $U_P(t)$, $U_{SH}(t)$ and $U_{SV}(t)$ are the far-field displacement components at the event source along the P-, SH- and SV-directions respectively (remaining variables described above).

RPPV*:

The RPPV attribute for each sensor-receiver, denoted by $RPPV^k$, may be calculated as:

$$RPPV^k = r^k \times PPV^k \quad \text{(Eq. 10)}$$

the overall RPPV, denoted by RPPV* may be calculated as the maximum or the average RPPV of all the sensor-receivers.

Clipped Signature:

In certain microseismic data acquisition systems, particularly 12 or 14-bit systems, high energy microseismic events may lead to particle velocities (or accelerations) that are higher than the calibrated range of the sensor receivers. When the waveforms of such events arrive at the sensor receivers, the data collected by the receivers may plateau at the upper and/or lower bound of the design range. In FIG. 3A, for instance, an example of such a plateau on the receiver 304 is indicated by 314. The presence of such plateaus, hereafter "clipped signatures", is another indicator of a high magnitude event. A sensor receiver may be marked as "clipped" if at least one of its seismic sensors has a clipping signature near the P-wave arrival. The fraction of clipped sensor receivers is evaluated as the ratio of the number of clipped sensor receivers to the total number of sensor-receivers with a valid P-wave arrival pick.

Polarity (or Percentage of Explosive Sensor Receivers)

Event polarity is an attribute that indicates whether the microseismic event is implosive or explosive in nature. In certain embodiments, polarity may be defined as the fraction of sensor receivers with an explosive first motion of the P-wave arrival, as compared to the total number of working sensor-receivers.

Proximity

The proximity attribute may be evaluated as the minimum distance between the calculated event location and the candidate wells on which a microseismic event may occur. Proximity may also include calculating a distance between event location and sensor receivers, a distance between event location and offset wellbores, distance between event location and wellbore intervals, the event depth d*, a distance between event location and reservoir layers, and a distance between event location and natural fractures or faults. Here, wellbore intervals of interest may include perforation locations and wellbore equipment (such as packers, sliding sleeves, casing joints, casing shoes, screens, etc.).

Horizontal Vs. Vertical Shear (SH/SV Ratio)

The velocities recorded by the seismic sensors of each sensor-receiver may be projected onto a 3-D coordinate system aligned along the P-, SH- and SV-directions. For each sensor receiver, the ratio of its velocities along the SH and SV directions yields the SH/SV ratio:

$$SH/SV^k = \frac{\max_{t \in T_S^k}\{|V_{SH}(t)|\}}{\max_{t \in T_S^k}\{|V_{SV}(t)|\}} \quad \text{(Eq. 11)}$$

the overall SH/SV ratio, denoted by SH/SV*, may be evaluated as the average or maximum of the SH/SV values of selected sensor receivers.

P Vs. S Amplitude (P/S Ratio)

For any sensor receiver, the ratio of the Peak Particle Velocity components along the direction of wave propagation (P-) and the shear plane (S-) yields the P/S ratio for that sensor-receiver:

$$P/S^k = \frac{\max_{t \in T_P^k}\{|V_P(t)|\}}{\sqrt{\max_{t \in T_S^k}\{V_{SH}(t)^2\} + \max_{t \in T_S^k}\{V_{SV}(t)^2\}}} \quad \text{(Eq. 12)}$$

an overall P/S ratio, denoted by P/S*, may be computed as the mean or maximum of the P/S ratios of selected sensor-receivers.

The above discussion is intended as a summary of various event attributes that may be associated with particular events of interest and may be evaluated according to the description above, but it should be understood that the present disclosure contemplates other physical attributes of microseismic events and data that may be quantified and/or assessed according to techniques and methods known in the art. Embodiments described herein are intended to incorporate the evaluation of characteristic attributes of seismic data that may assist in the identification and categorization of particular events of interest. In addition, the methodologies described above for quantifying and assessing various attributes are exemplary and not intended to exclude from the present disclosure other applicable approaches known in the art.

Point-Based Classification

According to additional aspects of the present disclosure, in some embodiments, a microseismic event may be classified by using a points-based system that assigns a total score to the event on the basis of one or more of the event attributes described above. The total score may be evaluated as the sum of the scores from each of the attributes selected as the basis for an event classification, or any other mathematical combination. As an illustration, an exemplary classification using a points-based system may be implemented as follows.

Magnitude Score:

The magnitude score may be a number assigned to one of the aforementioned attributes that indicate the event strength. For example, if RPPV is used as the attribute, the magnitude score may be based on RPPV* (the overall RPPV value). In general, the higher the RPPV*, the higher the score that may be assigned. If the primary objective of the classifier is to detect high-energy microseismic events such as casing failures, negative scores may also be assigned as a penalty for events with RPPV* lower than a conservatively chosen threshold. As an example, a preferred score range for RPPV* may be as shown in Table 3:

TABLE 3

| RPPV* Ranges (m²/s) | RPPV Score |
|---|---|
| >10⁻³ | 12 |
| (3 × 10⁻⁴, 10⁻³] | 9 |
| (10⁻⁴, 3 × 10⁻⁴] | 0 |
| ≤10⁻⁴ | −20 |

Alternately, or in addition to the above, a "clipping score" may be assigned to the event if there is at least one clipped sensor receiver, or if the fraction of clipped sensor receivers exceeds a threshold. Generally, the higher the number of clipped sensor receivers, the higher the score assigned to the event should be. For instance, this score may be assigned as follows: if the fraction of clipped sensor receivers exceeds 0.5, 8 points may be assigned, and if the fraction lies between 0.3 and 0.5, 4 points may be assigned. For other values, 0 points may be assigned. Similar to the above, a magnitude score may be assigned to the moment and energy flux attributes, if they serve as suitable indicators of the event magnitude.

Polarity Score:

If a primary objective of the classifier is to detect explosive microseismic events, such as casing failures, an event polarity score may be assigned on the basis of the percentage of explosive sensor-receivers. This score may also depend on the number of working sensor-receivers in the monitoring well. As an example, the following score ranges shown in Table 4 may be used:

TABLE 4

| No. of Sensor Receivers | % Explosive Range | Polarity Score |
|---|---|---|
| ≥5 | >80% | 10 |
|  | (70%, 80%] | 7 |
|  | (55%, 70%] | 2 |
|  | ≤55% | 0 |
| <5 | >80% | 10 |
|  | (67%, 80%] | 7 |
|  | (60%, 67%] | 2 |
|  | ≤60% | 0 |

Proximity Score:

A proximity score may be assigned on the basis of the proximity attribute. In general, the closer the event is to an active well, the proximity score may be higher. Negative proximity scores may also be assigned to events that are located far from active wells. In addition, the proximity score may also depend on the number of working sensor receivers. For instance, an exemplary score range for this attribute may be as indicated in Table 5:

TABLE 5

| No. of Sensor-Receivers | Proximity (m) | Proximity Score |
|---|---|---|
| >5 | ≤20 m | 5 |
|  | (20 m, 40 m] | 0 |
|  | >40 m | −20 |
| ≤5 | ≤35 m | 5 |
|  | (35 m, 70 m] | 0 |
|  | >70 m | −20 |

SH/SV Score:

An SH/SV score may be assigned on the basis of SH/SV* (the overall SH/SV attribute). When the primary objective of the classifier is to detect casing failures, the SH/SV score may be low, since it is not a clear indicator of casing failures. As an example, an SH/SV score may be assigned as follows: if the microseismic data is recorded in a format higher than 14-bit, 5 points may be assigned if SH/SV*<0.5 and 3 points assigned if 0.5≤SH/SV*<1. For data recorded with 14-bit systems, the SH/SV term is not used because casing failure events typically clip when recorded with 14-bit systems, rendering this metric unable to be determined.

P/S Score:

Finally, a P/S score may assigned on the basis of the P/S* (the overall P/S ratio attribute). An exemplary range for this score, when the primary objective is to identify casing failures, may be as follows: if the microseismic data is recorded using a 24-bit system, 3 points may be assigned if 0.3<P/S*<2.5, and 0 points assigned if P/S* lies outside this window. For data recorded with 14-bit systems, the P/S score is unused because the signal is likely clipped.

It should be understood that the above exemplary score ranges are provided for illustration only and the present disclosure contemplates any scoring methodology that generally ranks attributes and assigns "points" or other metric according to the principles explained herein. The points assigned to attribute values may be based at least on two considerations: (i) the likelihood that the microseismic event did occur, based solely on the observed value of the attribute, and (ii) the accuracy with which the attribute itself may be calculated or measured. For example, if the objective of the classifier is to detect casing failures, the following principles may be relied on:

Magnitude:

Casing failures tend to be very energetic. As such, events with a low magnitude (e.g., low RPPV* value) are unlikely to be casing failures. Thus, the magnitude score for such events may also be low or even negative as a penalty. On the other hand, since a high magnitude is also a strong indicator of a casing failure, a high magnitude score may be assigned if the selected magnitude attribute is large.

Proximity:

Casing events must always be located near a wellbore. As such, if an event locates far away from a well, it is very unlikely to be a casing failure. Thus, events located far from all wells may be assigned low or even negative points as a penalty for the Proximity score. On the other hand, an event located near a well does not strongly imply that the event is necessarily a casing failure. As such, for such events, a medium-high score may be assigned. The proximity cutoffs may be lower if there are more than 5 receivers since the event location is likely to be more accurate with additional receivers at closer spacing and 24-bit recording.

Polarity:

Casing events are also explosive in nature. Thus, a medium-high polarity score may be assigned when a large fraction of sensor receivers has explosive first motion signatures. However, low fractions do not rule out casing failures, so the least polarity score may be greater than the least proximity score in certain embodiments.

SH/SV Ratio:

Since SH/SV is not a defining attribute of a casing failure, in some embodiments, the range of scores for SH/SV may be lower than the range assigned to the Proximity and RPPV attributes. It may not be assigned a score if there are uncertainties in the accuracy of the SH/SV calculation itself.

P/S Ratio:

Similar to SH/SV, the range of scores assigned to P/S may also be smaller than the range assigned to Proximity and RPPV attributes. It may not be assigned a score if there are uncertainties in the accuracy of the P/S calculation itself.

Total Event Score:

In some embodiments according to the present disclosure, a "total event score" may be computed on the basis of at least two of: a magnitude score (e.g. RPPV*), a polarity score, a proximity score, a SH/SV score, and a P/S score described above. For example, a point-based classification system designed with a primary objective of identifying casing failures may rely on higher overall scores as indicators of a higher degree of certainty that a detected event is caused by a casing failure. For instance, using score ranges described above, any event with an overall score of 27 points may be classified as casing failure.

Further granularity may be incorporated into this basic classification framework by including additional attributes in the analysis. For example, the event depth (d*) may be used to rule out a wide range of microseismic events, without requiring the calculation of other event attributes. For instance, when d* is sufficiently low, preferably <70 m, the event may be classified as a surface event, likely caused by operational activities on the ground. In other embodiments, a d* value that is too high may indicate a deep microseismic event, which may not warrant immediate attention. In yet other embodiments, instead of or in addition to event depth, Delta Flow-Pressure (DFP) alarms may be included as an additional attribute. For example, if the microseismic event is accompanied by a DFP alarm, the event may indicate a loss of wellbore integrity.

Finally, an event may be classified on the basis of the total score alone or in combination with additional attributes as described above. Classifier tools contemplated herein include manual or computer-based algorithms or programs that enable identification to which of a set of categories a new observation belongs, based on a training set of data containing observations (or instances) whose category membership is known. Classifiers are examples of a broader class of "pattern recognition" tools, an actively researched area of supervised machine learning and artificial intelligence. The task of "training" a classifier refers to running a chosen machine learning model with a data set of observations or features whose labels are known, and iteratively adjusting the parameters of the model so that the predictions of the model match the labels assigned to the training data set. A second validation data set may also be utilized to test the trained model and further adjust the model parameters to obtain good predictive performance.

A qualitative likelihood of the event being caused by a casing failure may be assigned in the following exemplary fashion: events with a total score between 27 and 30 points may be labeled as "Low Probability Casing Failures," those with a total score between 30 and 32 points may be classified as "Medium Probability Casing Failures," and those with a total score higher than 32 points may be classified as "High Probability Casing Failure." As another example, for situations where the producer/injector wells near the located event are equipped with surface or conductor casing(s), a total event score exceeding a predetermined value (e.g., 27 points), with an event depth d* of less than the maximum surface or conductor casing depth, may indicate that the event may be classified as a casing slip. As yet an additional example, in situations where the total event score exceeds a predetermined value (e.g., 27 points) and the wellhead pressures of the candidate injection wells indicate a high-pressure injection ongoing at the time of the event, the event may be classified as a "High Pressure Casing Failure." In other situations, the event may be classified as a "Low Pressure Casing Failure." It should be understood that the foregoing are not an exclusive list of possible classification outcomes based on a total score and/or additional attributes, and many permutations are possible and contemplated herein on the basis of the general principles that have been described.

In addition, in alternative embodiments, other classification methodologies may be utilized to classify a detected microseismic event into categories, including at least one from the following: casing failure, cement crack, heave event, heel event, CMR, surface event, rod noise, electrical noise, wellbore noise. For example, a standard classification algorithm may be employed using a software package such as MATLAB® or Python to identify events on the basis of at least one of PPV, energy flux, moment flux, RPPV*, percentage of explosive sensor receivers, proximity, SH/SV ratio, P/S ratio, fraction of clipped sensor receivers, and other attributes described above. The classification algorithm may be, for example, a Decision Tree, a Discriminant Analysis (linear or polynomial), a Support Vector Machine, a k-Nearest Neighbor Classifier, an Ensemble-based classifier, or a Neural Network. The classifier may be trained using a training dataset of labeled microseismic events with an appropriately chosen cross-validation parameter to avoid over-fitting. The classifier can also be trained using toolboxes offered by software packages such as MATLAB® or Python, or other machine-learning algorithms known in the art. Once trained, the classifier can be utilized in real-time to classify events into one of the above categories.

Non-Seismic Data

In some embodiments according to the present disclosure, operational (i.e. non-microseismic) surveillance data, such as wellhead pressures or temperatures, injection or production flow rates, Delta Flow-Pressure alarms, nitrogen soak alarms etc., may optionally be utilized to optimize microseismic event classification and enhance casing integrity monitoring. These quantities are described next.

Wellhead Pressures/Temperatures:

The pressures and/or temperatures measured in a window of time encompassing the microseismic event at the wellheads of injector and/or producer wells near the calculated event location.

Injection/Production History:

The fluid injection/production rates measured over a window of time encompassing the microseismic event. Overall history or changes in the well status may contribute to determining a classification for an event, for example time relative to a steaming cycle.

Figure 13A:
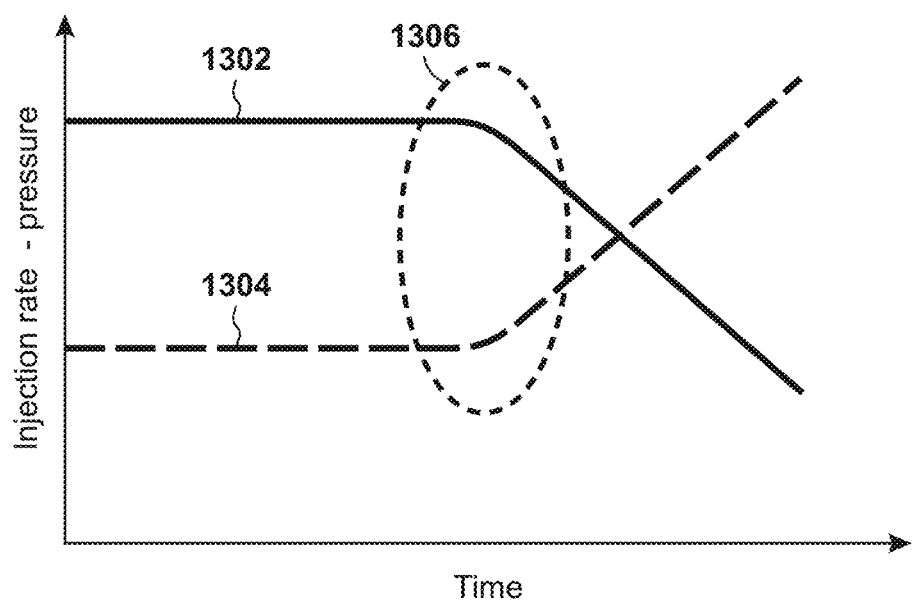
FIG. 13A is an exemplary chart illustrating possible trends in injection rate and well head pressure for a casing failure event.

Delta Flow-Pressure (DFP) Alarms:

The "Delta Flow-Pressure" method comprises continuously recording well head pressures and injection rates and monitoring their relative trends. For example, in a situation where the well head pressure begins to rapidly drop and the injection rate simultaneously starts increasing, a wellbore integrity issue may be suspected and an alarm condition occurs. An example of this situation is illustrated in FIG. 13A, which provides a chart showing the injection rate and well head pressure over time. As wellhead pressure (indicated by line 1302) goes down and injection rate (indicated by line 1304) goes up, a DFP alarm may be raised for potential loss of integrity around the time indicated by area 1306.

Figure 13B:
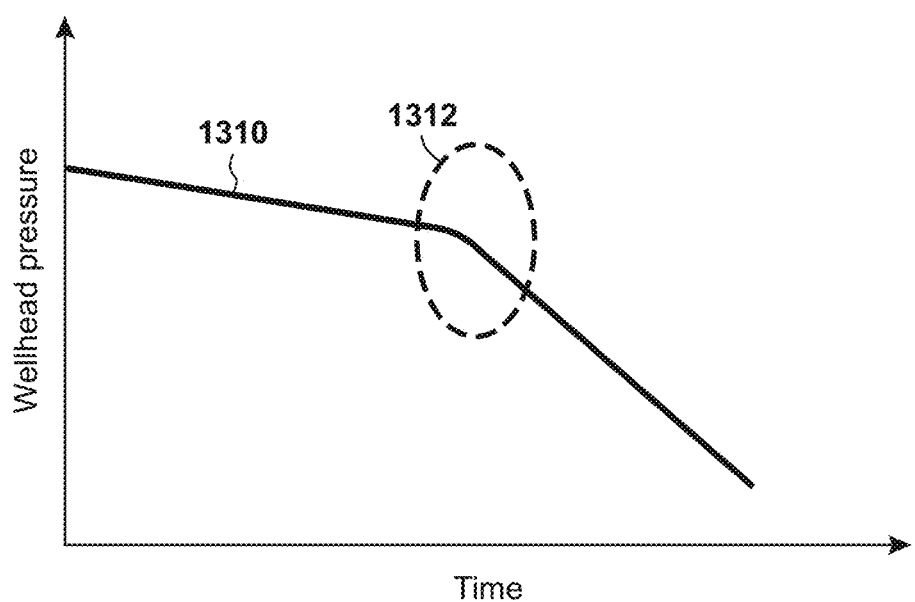
FIG. 13B is an exemplary chart illustrating a nitrogen soak trend.

Nitrogen Soak Alarms:

In the soaking phase of a CSS cycle, nitrogen (or a fluid of higher density than steam) may be injected into the wellbore to stabilize the wellbore and prevent the reservoir pushing back the steam injected during the steaming phase. In some cases, the nitrogen levels in the well may drop or become unstable with a downward trend. In such cases, a well integrity issue may be suspected. FIG. 13B is an exemplary illustration of this phenomenon. The well head pressure 1310 begins to rapidly drop around the time indicated by 1312. At this time, a nitrogen soak alarm may be raised for a potential loss in casing integrity.

In addition to the above, other non-seismic operational data such as well head pressures or temperatures and downhole pressures or temperatures may also be used to validate the microseismic event classification.

In one example, operational surveillance data may be utilized in conjunction with the microseismic event attributes calculated after the event has been located. As such, in this process, the continuously recorded microseismic data may be analyzed to locate the event, and the operational surveillance data may play a secondary role, such as in classifying the event, or to validate the classification. For instance, the microseismic signatures of heel events, caused by sharp changes to the injection or production rates in a well, tend to be very similar to deep casing failures. Thus, it may not always be possible to distinguish these two types of events using only microseismic data. In this case, the classification may rely on non-seismic attributes such as the well head pressure or temperature in a window of time encompassing the event, the injection rate into, and/or production rate from the candidate wells. If, prior to the event, there is a sharp change in the well head pressure within a threshold level, the event may be classified as a heel event instead of a deep casing failure. Alternatively, if there is a sharp drop in the well head pressure that exceeds the threshold level, the event may be interpreted as a casing failure.

As another example, the operational surveillance data may be utilized as the primary mode of surveillance. In this approach, triggers may be generated when anomalies in production or injection states are indicated by such data. For instance, a delta flow-pressure alarm may be triggered due to a sudden drop in well head pressure. This trigger may be used to initiate further processing steps that involve retrieving the microseismic data collected by the seismic sensors and sensor receivers in a window of time around the time of the alarm, and performing a microseismic analysis to identify if a microseismic event occurred in this window. If a seismic event did occur, the location of the event may help narrow down the potential causes of the anomaly.

Applications of Event Classification

Once a microseismic event is classified, the classification of the event may drive one or more changes to the production and/or injection operations. For example, one or more of the following actions may be taken: discontinuing injection into or production from the identified wellbore, injecting weighted fluid into the wellbore, injecting nitrogen into the wellbore, temporarily shutting in the wellbore, abandoning the well entirely, reducing steam injection rate or pressure, isolating the casing and continuing production within tubing to reduce pressure in the reservoir and avoid feeding the compromised pipe with reservoir fluids, monitoring the selected wellbore with additional diagnostic tools (e.g., distributed fiber-optic temperature sensors, production logging, injection logging), performing casing integrity check of the selected wellbore(s), selecting another wellbore to assess for a change in temperature in known water-filled formations, selecting another wellbore to assess a change in light hydrocarbon fractions in known aquifers.

In particular, casing failures occurring at the depths of the sealing formation (intermediate depths) are often the most important microseismic events. They may warrant immediate initiation of remedial procedures and may lead to disruptions to normal operations. Accordingly, after a casing failure is identified by a microseismic analysis as described above, the following actions may be taken to further confirm if a casing failure occurred: perform a casing integrity check of the candidate wellbores and/or monitoring the candidate wellbores with additional diagnostic wireline tools. Casing integrity checks may be performed, for example, by using an electromagnetic scanner mounted on a production logging tool that detects for anomalies in the casing. Other methods for checking casing integrity include fluid shots, caliper runs, scraper tests or using Distributed Temperature/Acoustic Sensing via fiber optic cables mounted on a coiled tubing in the monitoring well to detect temperature anomalies. Once a casing failure has been confirmed, the following actions or a subset of the following actions may be taken on the identified wellbore(s) if the casing failure occurred after the reservoir reached high pressure during the injection phase: discontinue fluid (steam) injection into the identified wellbore, shut-in the identified wellbore, inject high density fluid in the identified wells to prevent reservoir fluids entering the formation at the failure interval, or isolate the failure and abandon the identified well. If the casing failure occurred during the nitrogen soak phase following a high-pressure injection, the operator may continue to inject nitrogen or a denser fluid to stabilize the fluid flow below the failure. If the casing failure occurred during a low pressure injection cycle, wherein the wellbore pressure at the casing failure is low enough that the fluids cannot penetrate the overburden rock, the operator may continue producing the well until the end of the cycle and perform additional casing integrity checks and remediation steps as required prior to the next steaming cycle.

If a microseismic analysis identifies a casing failure within a few meters of the reservoir depths, the type of action taken may depend on the injection pressure in the wellbore at the casing failure. In CSS operations, for example, if the injection pressure in the wellbore exceeds the fracture pressure of the reservoir rock, the wellbore may be shut-in until additional diagnostics are performed to confirm the casing failure. On the other hand, if the wellbore pressure was lower than the fracture pressure, the operator may continue injecting steam into the well at reduced rates to prevent the reservoir reaching fracture pressures until the end of the injection cycle. Once the injection cycle concludes, further casing integrity checks may be performed to confirm the casing failure. If the microseismic analysis indicates that the event is predominantly implosive (e.g., if the Polarity Score is less than 0.5), the identified well may nevertheless be identified for future casing integrity checks.

In a similar manner, heel events, may also prompt further checks for a potential loss of wellbore integrity. This is especially true if heel events are detected repeatedly on the same well over time. In general, operational noise, surface noise and high-frequency mechanical noise events do not demand any immediate action, and thus the actions taken for these events are largely up to the discretion of the operator.

In the context of operations, cement cracks may be of interest. Once candidate wells with possible multiple cement cracks have been identified by the microseismic analysis, further production/injection logs, may be performed to evaluate the cement integrity behind the production casing, including temperature logs, cement bond logs, noise logs, etc.

A search for Continuous Microseismic Radiation (CMR) may be conducted: (a) if a series of heave events in the intermediate overburden layers has been recorded or if a known failure exists in a high pressure well, or (b) if a significant DFP alarm is triggered without a seismic event. The CMR search may detect fluid migration into the overburden through natural fractures or mechanically weak layers of rock. CMR may occur after loss of fluid due to a casing break. Depending on the severity of the CMR, the identified wells may be shut-in to conduct casing integrity checks to pinpoint the location(s) of the leak. A CMR search may or may not be accompanied with a temporary cessation of rod pump motion to provide a quiet monitoring environment.

Shear dominated events such as heaves are usually the result of benign shifts of the formations that result from dilation of the reservoir during CSS. In rare cases, such events might indicate fluid migration into the overburden if there was a breach in the sealing formation. When shear dominated events have been identified by microseismic analysis during operations, the surveillance systems on the candidate wells near the event may be enhanced, for example, through additional pressure monitoring. Several recent monitoring wells have the potential for running a distributed fiber optic temperature sensor, which could provide additional data on the subsurface conditions. A casing integrity check may be performed, or the well could be marked for a future integrity check. Other possible actions include reducing steam injection volumes and/or rates.

Operation Integrity Surveillance Method

Figure 14:
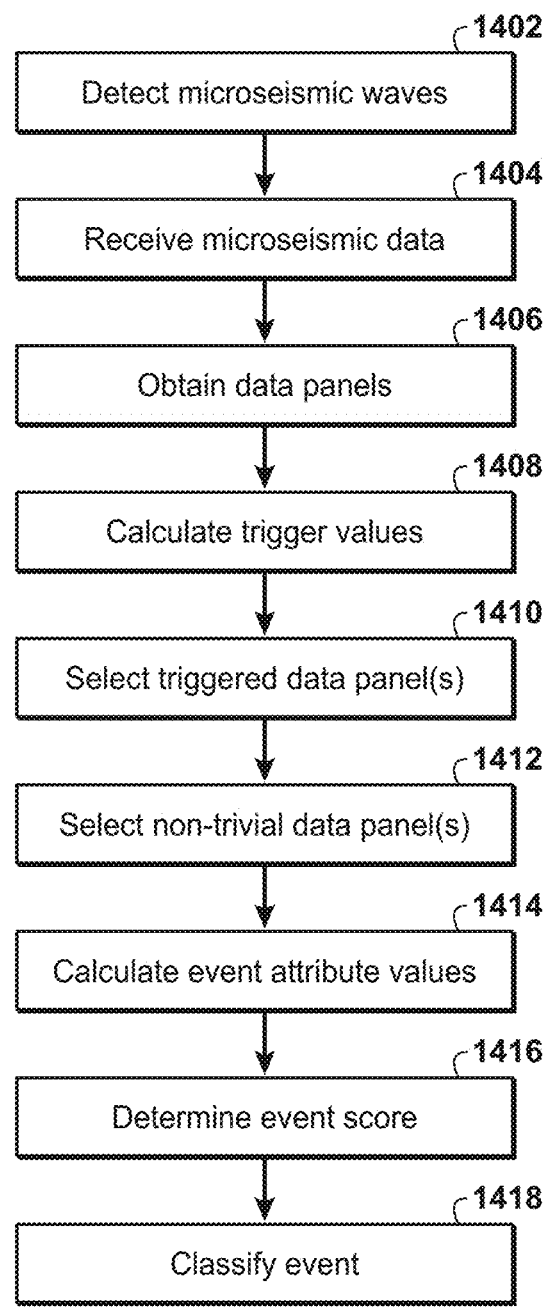
FIG. 14 is a flow chart of a method for monitoring well integrity according to some aspects of the disclosure herein.

With reference to FIG. 14, a method for monitoring operation integrity during hydrocarbon production or fluid injection operations is illustrated. At step 1402, the method may begin by detecting microseismic waves in a subsurface area of operation using a seismic monitoring system as those described elsewhere herein. The method may further comprise, at step 1404, receiving, from the seismic monitoring system, microseismic data representative of the microseismic waves. The microseismic data may then be processed, at step 1406, to obtain a plurality of data panels corresponding to microseismic data measured over a predetermined time interval. For example, the microseismic data may be divided into data segments of specified length, and the data segments may be divided into the data panels. In certain embodiments, the data segments may be filtered prior to dividing the data segments into the data panels. In other embodiments, the data panels may overlap. For example, the overlap may be between 10% and 50%. In yet other embodiments, the predetermined time interval may be between 0.5 and 3 seconds.

According to disclosed aspects, a neural network analysis is used to determine whether any of the data panels, or other subdivision of the microseismic data, includes a noise event or a non-noise event. For any data panel or other data subdivision including a non-noise event, the method disclosed herein may further comprise, at step 1408, calculating, for each data panel, trigger values for data traces corresponding to sensor receivers of the microseismic monitoring system. For example, trigger values may be calculated using an STA/LTA analysis, absolute amplitude thresholding, relative amplitude thresholding, wavelet transform calculations, or combinations thereof. In some embodiments where at least one trigger value is calculated using an STA/LTA analysis, an STA window of the STA/LTA analysis may be between 5 and 30 milliseconds, an LTA window of the STA/LTA analysis may be between 50 and 250 milliseconds, and an STA/LTA ratio threshold of the STA/LTA analysis may be between 2 and 5. In other embodiments where trigger values are calculated using relative amplitude thresholding, a relative amplitude ratio of the amplitude thresholding may be between 20 and 50%.

The method may further comprise, at step 1410, selecting, as a triggered data panel, at least one data panel that satisfies predetermined triggering criteria. For example, in some embodiments, the predetermined triggering criteria may comprise that the at least one data panel has overlapping triggered time windows for data from at least two sensor receivers. Or the predetermined criteria may comprise that the at least one data panel has overlapping triggered time windows for data from at least two sensor receivers and that at least one of the triggered sensor receivers has at least two triggered channels. Then, at step 1412, the method may include selecting, as a non-trivial data panel containing microseismic data representative of an event, at least one triggered data panel that satisfies spectral density criteria. For example, the non-trivial data panel may be selected using a spectral density selection criteria. In some embodiments, the spectral density criteria may comprise that the frequency of the 90% cumulative spectral density of the data panel is below 300 Hz. In other embodiments, the spectral density selection criteria may comprise that the frequency of the 90% cumulative spectral density of the data panel is below 300 Hz in a window of data between 0.1 to 0.5 seconds around a triggered window of the data panel.

According to some aspects of the present disclosure, a method described herein may further comprise, at step 1414, calculating a value for each of at least two event attributes of a plurality of event attributes of the event. In some embodiments, the plurality of event attributes comprises magnitude, proximity, polarity, P/S ratio, and SH/SV ratio. Magnitude may further comprise at least one of peak particle velocity, energy flux, moment flux, and RPPV. Proximity may comprise at least one of distance between event location and sensor receivers, distance between event location and offset wellbores, distance between event location and wellbore intervals, distance between event location and reservoir layers, and distance between event location and natural fractures or faults. In yet other embodiments, the plurality of event attributes may further comprise event depth.

In some embodiments, calculating a value for each of at least two event attributes of a plurality of event attributes may comprise determining an event location, and using the event location to calculate at least one of the values. For example, determining an event location may comprise calculating a set of grid points comprising geometry and acoustic travel time data; rotating the triggered data panel to an Earth coordinate system; determining an initial set of P-wave arrival times for the triggered data panel; calculating a time window about each P-wave arrival time; calculating an azimuth angle in an horizontal plane for each P-wave arrival time; determining a vertical surface on the set of grid points by estimating a best-fit azimuth angle; calculating azimuth, inclination, and travel time errors for grid points on the vertical surface; determining a grid point on the vertical surface that has minimum total error; searching in three dimensions around the grid point, including the grid point, for a location with a lowest total error; and selecting, as the event location, the location with the lowest total error. In yet other embodiments, the event location may be adjusted by determining one or more S-wave arrival times for the triggered data panel; recalculating azimuth, inclination, and travel time errors on the vertical surface; determining a new grid point on the vertical surface that has minimum total error; searching in three dimensions around the new grid point, including the new grid point, for a location with a lowest total error; and selecting, as the event location, the location with the lowest total error. The event location may in turn be used to calculate a proximity value by determining at least one of a distance between event location and sensor receivers, a distance between event location and offset wellbores, distance between event location and wellbore intervals, a distance between event location and reservoir layers, and distance between event location and natural fractures or faults.

A method according to the present disclosure may further include, at step 1416, determining an event score based on the values of the plurality of event attributes. For example, determining an event score may comprise calculating a score for each of the at least two event attributes, and combining the scores for the at least two event attributes. The score for each of the at least two event attributes may be indicative of a likelihood that the event occurred based solely on the value for a given attribute, and an accuracy of said value. Alternatively, determining an event score may comprise calculating a magnitude score, a polarity score, a proximity score, an SH/SV score, and a P/S score; and adding the magnitude score, polarity score, proximity score, SH/SV score, and P/S score to obtain the event score. Next, the method may include, at step 1418, classifying the event into at least one event category of a plurality of event categories based on the event score. For example, the plurality of event categories may comprise casing break, casing slip, CMR event, heel event, heave event, cement crack, surface noise, and rod noise.

Figure 15:
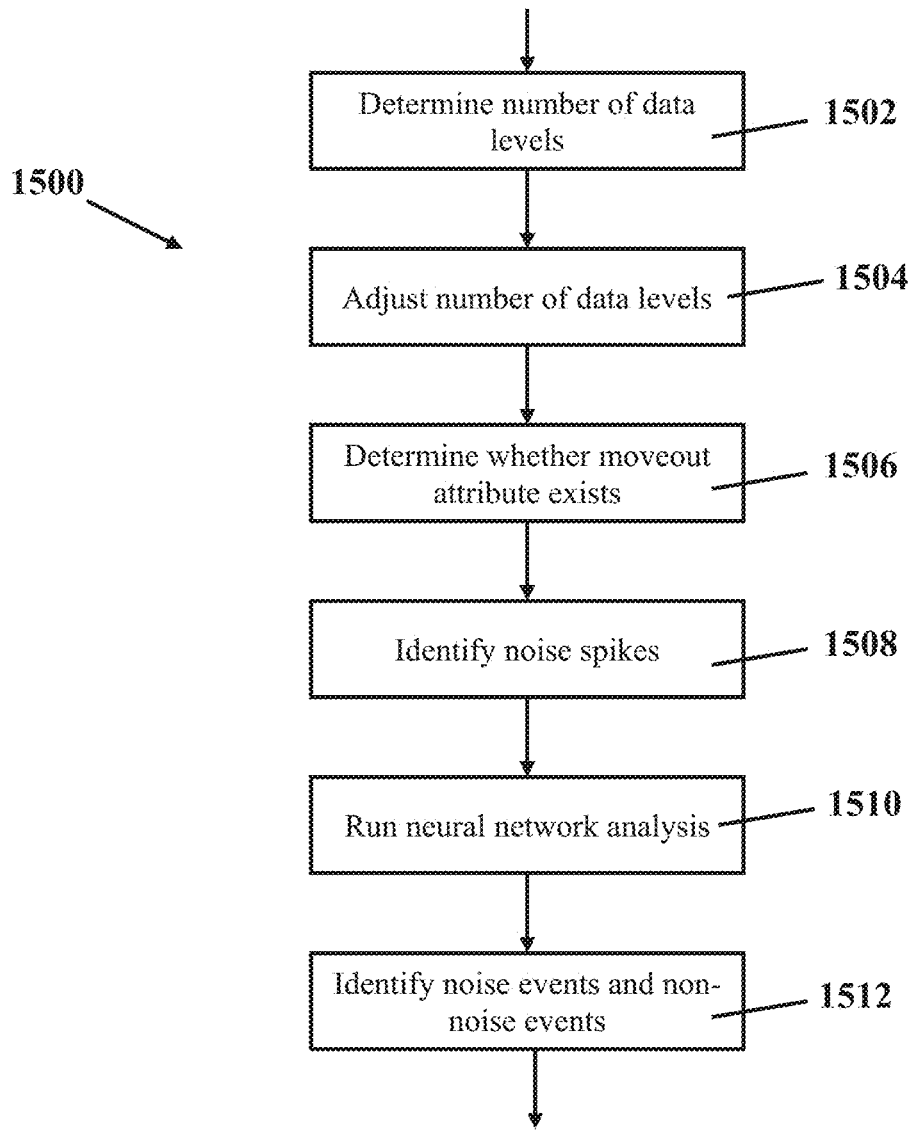
FIG. 15 is a flow chart of a method that may be used with the method shown in FIG. 14.

FIG. 15 is a flowchart depicting a method of 1500 for determining whether a data panel, or other subdivision of the microseismic data, includes a noise event or a non-noise event. Method 1500 may be used with the method shown in FIG. 14 as disclosed herein. Method 1500 may include steps for: determining a number of data levels to be used in the neural network analysis (1502), and for each dataset, adjusting a number of data levels associated with each dataset to match the determined number of data levels, wherein each dataset is associated with a respective array of seismic receivers (1504). The adjusting may include adding data levels to the dataset, the added data levels having neutral data values or zeroed data values therein. Additionally or alternatively, the adjusting may include discarding data levels in the dataset by calculating, for each trace of each data level, short-time (STSD) and long-time (LTSD) moving standard deviations of data in said each trace, calculating STSD-to-LTSD ratios (SLR) for each trace, identifying a maximum SLR and a location of the maximum SLR for each trace, calculating a frequency threshold for each trace such that a predetermined portion of energy of said each trace is contained below the frequency threshold, and discarding a data level if the frequency threshold is below a cutoff frequency for at least 50% of the traces in the data level. If, after discarding the data level, the number of the remaining data levels exceeds the determined number of data levels, it is determined which data level of the remaining data levels has a lowest maximum SLR, and said data level is discarded. This process is repeated until the number of the remaining data levels equals the determined number of data levels. At block 1506 it may be determined whether a moveout attribute exists for each trace, the moveout attribute being the maximum SLR and its location, and the moveout attribute may be fed into the neural network analysis. The moveout attribute may also include a maximum STSD value over the standard deviation of said each trace, and the location of the maximum STSD value. At block 1508, noise spikes may be identified and fed into the neural network analysis. At block 1510 the neural network analysis is run using the above identified input parameters and according to known principles. At block 1512 the neural network analysis identifies noise events (i.e., events with noise attributes) and/or non-noise events (i.e., events with non-noise attributes). Data panels having including only noise events may be discarded, and data panels including any non-noise events may be further processed according to aspects disclosed herein.

Returning to FIG. 14, the method of FIG. 14 optionally may comprise validating the event classification using at least one type of operational surveillance data (not shown). Operational surveillance data may include wellhead pressures, injection rates, delta flow-pressure alarms, nitrogen soak trends, wellhead temperature, casing head pressure, casing head temperature, downhole pressure, downhole temperature, injection flow rate, and production flow rate. In certain other embodiments, the method may comprise adjusting one or more operation parameters based on the event classification (not shown). Such operation parameters may include fluid density, fluid viscosity, fluid composition, fluid injection rate, fluid injection pressure, nitrogen injection rate, and nitrogen injection pressure. Alternatively or additionally, the method may comprise performing a casing integrity check if the event category is a casing failure (not shown).

It should be understood that the method illustrated in FIG. 14 is only one example of the possible processes and methodologies that may be implemented according to the disclosure herein. As another example (not illustrated), a method for monitoring operation integrity during hydrocarbon production or fluid injection operations may comprise detecting microseismic waves in a subsurface area of operation using a seismic monitoring system; receiving, from the seismic monitoring system, microseismic data representative of the microseismic waves; processing the microseismic data to obtain a plurality of data panels corresponding to microseismic data measured over a predetermined time interval; determining, with a neural network analysis, whether an event is a noise event or a non-noise event; if the event is a non-noise event, calculating, for each data panel, trigger values for data traces corresponding to sensor receivers of the microseismic monitoring system; selecting, as a triggered data panel representative of an event, at least one data panel that satisfies predetermined triggering criteria; calculating a value for each of at least two event attributes of a plurality of event attributes of the event; and using a classification algorithm to classify the event into at least one event category of a plurality of event categories based on the values, as described elsewhere herein. In some embodiments, using a classification algorithm may include training the classification algorithm using a training dataset of microseismic data corresponding to known event types, and using the trained classification algorithm and the values for the at least two event attributes to classify the event. Such classification algorithm may be a Decision Tree, a Discriminant Analysis, a Support Vector Machine, a k-Nearest Neighbor Classifier, an Ensemble-based classifier, or a Neural Network.

As yet another example (not illustrated), a method for monitoring operation integrity during hydrocarbon production or fluid injection operations may comprise detecting microseismic waves in a subsurface area of operation using a seismic monitoring system; receiving, from the seismic monitoring system, microseismic data representative of the microseismic waves; processing the microseismic data to obtain a plurality of data panels corresponding to microseismic data measured over a predetermined time interval; determining, with a neural network analysis, whether an event is a noise event or a non-noise event; if the event is a non-noise event, calculating, for each data panel, trigger values for data traces corresponding to sensor receivers of the microseismic monitoring system; selecting, as a triggered data panel, at least one data panel that satisfies predetermined triggering criteria; selecting, as a non-trivial data panel containing microseismic data representative of an event, at least one triggered data panel that satisfies spectral density criteria; determining an event location; and using the event location to classify the event into at least one event category of a plurality of event categories.

Automated Processing

It may be appreciated that the methods disclosed herein may be advantageously implemented in an automated fashion that provides benefits in terms of reduced processing time and faster diagnosis of undesirable conditions, leading to more rapid intervention to address operations integrity issues. Leveraging current technology, it is possible for a casing failure to be detected within a matter of minutes by the methods and systems disclosed herein, whereas prior processes have required hours at a minimum Automated event processing is also a crucial component in any closed-loop system that can autonomously take actions based on the event classification. For example, if a casing failure is detected by the automated event processing system, controller devices (either centrally located or distributed at multiple locations) may be programmed to automatically shut-in the candidate well. The manual method is also dependent on personnel schedules and thus susceptible to associated issues related to time of day and other factors. Automated notification of alarms is feasible when the false positive alarm rate is low enough such that staff respond to such notices as credible alarm conditions, and where the false negative rate is sufficiently low such that the system is trustworthy. Such notices include but are not limited to email, text message, instant messaging, phone call, and other similar communication methods.

In this regard, a more effective system with rapid turnaround and response provides substantial benefits to operational integrity and environmental performance. For example, a more rapid response to a casing failure can lead to a reduced volume of fluid incursion into the overburden.

System Implementation

All methods and processes described herein may be implemented by conventional computer systems. For example, such a computer system may include a central processing unit (CPU) coupled to a system bus. The CPU may be any general-purpose CPU, although other types of CPU architectures (or other components) may be used that support the operations described herein. Those of ordinary skill in the art will appreciate that, while only a single CPU may be sufficient, additional CPUs may be present in the computer system. Moreover, the computer system may comprise a networked, multi-processor computer system that may include a hybrid parallel CPU/GPU system. The CPU may execute various logical instructions according to teachings disclosed herein. For example, the CPU may execute machine-level instructions for performing processing according to the methods described above.

Computer systems contemplated herein that may implement the disclosed teachings may include computer components such as non-transitory computer-readable media. Examples of computer-readable media include random access memory (RAM), which may be SRAM, DRAM, SDRAM, or the like. The computer system may also include additional non-transitory, computer-readable media such as read-only memory (ROM), which may be PROM, EPROM, EEPROM, or the like. RAM and ROM may store user and system data and programs, as is known in the art. The computer system may also include one or more input/output (I/O) adapters, communications adapters, graphics processing units, user interface adapters, display drivers, and display adapters.

The I/O adapter may connect additional non-transitory, computer-readable media such as one or more storage devices, including, for example, a hard drive, a compact disc (CD) drive, a floppy disk drive, a tape drive, and the like, to the computer system. Such storage device(s) may be used when RAM is insufficient for the memory requirements associated with storing data for implementations of the present techniques. The data storage of the computer system may be used for storing information and/or other data used or generated as disclosed herein, including microseismic data. In some embodiments, such a network may advantageously utilize remote "cloud" storage systems and other networked systems. Storage device(s) may also be used to store algorithms or software designed to implement the teachings herein. Further, one or more user interface adapters may couple user input devices, such as a keyboard, a pointing device, and/or output devices, to the computer system. A display adapter may be driven by the CPU to control a display driver and a display on a display device, for example, to present microseismic data and information generated through application of the microseismic analyses of the present disclosure.

The architecture of a computer system suitable to implement methods described above may be varied as desired. For example, any suitable processor-based device may be used, including without limitations, personal computers, laptop computers, computer workstations, and multi-processor servers. Moreover, the present technological advancements may be implemented on application specific integrated circuits (ASICs) or very large scale integrated (VLSI) circuits. In fact, persons of ordinary skill in the art may use any number of suitable hardware structures capable of executing logical operations according to the present technological advancement. Input data to the computer system may include various plug-ins and library files. Input data may additionally include configuration information.

The above examples of methods that may be implemented according to the present disclosure to monitor operation integrity during hydrocarbon production or fluid injection operations will be apparent to those skilled in the art. For example, no automated systems exist today that are able to identify and classify events of interest on the basis of their particular microseismic signature. Whether by manual programming according to examples provided herein, or machine-learning algorithms, the noise-filtered, point-based classification processes disclosed herein provide significant advantages to monitoring operations, including lower costs and increased efficiency, and increased operations integrity, safety, and environmental performance.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method for monitoring operation integrity during hydrocarbon production or fluid injection operations using microseismic data, comprising:
   detecting microseismic waves in a subsurface area of operation using a seismic monitoring system;
   receiving, from the seismic monitoring system, microseismic data representative of the microseismic waves;
   processing, with a computer, the microseismic data to obtain a plurality of data panels corresponding to microseismic data measured over a predetermined time interval;
   determining, with a neural network analysis implemented on the computer, whether any of the plurality of data panels includes a noise event or a non-noise event;
   for data panels including a non-noise event, calculating with the computer, for each data panel, trigger values for data traces corresponding to sensor receivers of the microseismic monitoring system;
   selecting with the computer, as a triggered data panel, at least one data panel that satisfies predetermined triggering criteria;
   selecting with the computer, as a non-trivial data panel containing microseismic data representative of an event, at least one triggered data panel that satisfies spectral density criteria;
   calculating, with the computer, a value for each of at least two event attributes of a plurality of event attributes of the event;
   determining, with the computer, an event score based on the values of the plurality of event attributes; and
   classifying, with the computer, the event into at least one event category of a plurality of event categories based on the event score.

2. The method of claim 1, wherein determining whether any of the plurality of data panels includes a noise event or a non-noise event comprises:
   determining a number of data levels to be used in the neural network analysis; and
   for each dataset, adjusting a number of data levels associated with each dataset to match the determined number of data levels;
   wherein each dataset is associated with a respective array of seismic receivers.

3. The method of claim 2, wherein the adjusting comprises:
   adding data levels to the dataset, the added data levels having neutral data values or zeroed data values therein.

4. The method of claim 2, wherein the adjusting comprises discarding data levels in the dataset by
   calculating, for each trace of each data level, short-time (STSD) and long-time (LTSD) moving standard deviations of data in said each trace;
   calculating, for each trace, STSD-to-LTSD ratios (SLR);
   for each trace, identifying a maximum SLR and a location of the maximum SLR;
   calculating, for each trace, a frequency threshold such that a predetermined portion of energy of said each trace is contained below the frequency threshold; and
   discarding a data level if the frequency threshold is below a cutoff frequency for at least 50% of the traces in the data level.

5. The method of claim 4, wherein the discarded data level is a first discarded data level and data levels not discarded are remaining data levels, and further comprising:
   if, after discarding the first discarded data level, a number of the remaining data levels exceeds the determined number of data levels,
      (a) determining which data level of the remaining data levels has a lowest maximum SLR;
      (b) discarding the data level with the lowest maximum SLR; and
      (c) repeating steps (a) and (b) until the number of the remaining data levels equals the determined number of data levels.

6. The method of claim 2, further comprising:
   using a computer, determining whether a moveout attribute exists for each trace, wherein the moveout attribute comprises the maximum SLR and the location of the maximum SLR; and
   feeding the moveout attribute into the neural network analysis.

7. The method of claim 6, wherein the moveout attribute further comprises, for each trace:
   a maximum STSD value over the standard deviation of said each trace; and
   a location of the maximum STSD value.

8. The method of claim 2, further comprising:
   identifying noise spikes; and
   feeding the identified noise spikes into the neural network analysis.

9. A method for monitoring operation integrity during hydrocarbon production or fluid injection operations, comprising:
   detecting microseismic waves in a subsurface area of operation using a seismic monitoring system;
   receiving, from the seismic monitoring system, microseismic data representative of the microseismic waves;
   processing, with a computer, the microseismic data to obtain a plurality of data panels corresponding to microseismic data measured over a predetermined time interval;
   determining, with a neural network analysis implemented on the computer, whether any of the plurality of data panels includes a noise event or a non-noise event;
   for data panels including a non-noise event, calculating with the computer, for each data panel, trigger values for data traces corresponding to sensor receivers of the microseismic monitoring system;
   selecting with the computer, as a triggered data panel representative of an event, at least one data panel that satisfies predetermined triggering criteria;
   calculating, with the computer, a value for each of at least two event attributes of a plurality of event attributes of the event; and
   using, with the computer, a classification algorithm to classify the event into at least one event category of a plurality of event categories based on the values.

10. A method for monitoring operation integrity during hydrocarbon production or fluid injection operations, comprising:
    detecting microseismic waves in a subsurface area of operation using a seismic monitoring system;
    receiving, from the seismic monitoring system, microseismic data representative of the microseismic waves;
    processing, with a computer, the microseismic data to obtain a plurality of data panels corresponding to microseismic data measured over a predetermined time interval;

determining, with a neural network analysis implemented on the computer, whether any of the plurality of data panels includes a noise event or a non-noise event;

for data panels including a non-noise event, calculating with the computer, for each data panel, trigger values for data traces corresponding to sensor receivers of the microseismic monitoring system;

selecting with the computer, as a triggered data panel, at least one data panel that satisfies predetermined triggering criteria;

selecting with the computer, as a non-trivial data panel containing microseismic data representative of an event, at least one triggered data panel that satisfies spectral density criteria;

determining, with the computer, an event location; and using, with the computer, the event location to classify the event into at least one event category of a plurality of event categories.

11. A non-transitory computer usable medium having a computer readable program code embodied therein, said computer readable program code adapted to be executed by a computer to implement a method for monitoring operation integrity during hydrocarbon production or fluid injection operations using microseismic data, said method comprising:

receiving microseismic data representative of microseismic waves in a subsurface area of operation;

processing the microseismic data to obtain a plurality of data panels corresponding to microseismic data measured over a predetermined time interval;

determining, with a neural network analysis, whether any of the plurality of data panels includes a noise event or a non-noise event;

for data panels including a non-noise event, calculating, for each data panel, trigger values for data traces corresponding to sensor receivers of the microseismic monitoring system;

selecting, as a triggered data panel, at least one data panel that satisfies predetermined triggering criteria;

selecting, as a non-trivial data panel containing microseismic data representative of an event, at least one triggered data panel that satisfies spectral density criteria;

calculating a value for each of at least two event attributes of a plurality of event attributes of the event;

determining an even score based on the values of the plurality of event attributes; and classifying the event into at least one event category of a plurality of event categories based on the event score.

12. The non-transitory computer usable medium of claim 11, wherein the computer readable program code further includes code to implement the method for monitoring operation integrity wherein determining whether any of the plurality of data panels includes a noise event or a non-noise event comprises:

determining a number of data levels to be used in the neural network analysis; and for each dataset, adjusting a number of data levels associated with each dataset to match the determined number of data levels;

wherein each dataset is associated with a respective array of seismic receivers.

13. The non-transitory computer usable medium of claim 12, wherein the computer readable program code further includes code to implement the method for monitoring operation integrity wherein the adjusting comprises:

adding data levels to the dataset, the added data levels having neutral data values or zeroed data values therein.

14. The non-transitory computer usable medium of claim 12, wherein the computer readable program code further includes code to implement the method for monitoring operation integrity wherein the adjusting comprises discarding data levels in the dataset by calculating, for each trace of each data level, short-time (STSD) and long-time (LTSD) moving standard deviations of data in said each trace;

calculating, for each trace, STSD-to-LTSD ratios (SLR);

for each trace, identifying a maximum SLR and a location of the maximum SLR;

calculating, for each trace, a frequency threshold such that a predetermined portion of energy of said each trace is contained below the frequency threshold; and discarding a data level if the frequency threshold is below a cutoff frequency for at least 50% of the traces in the data level.

15. The non-transitory computer usable medium of claim 14, wherein the computer readable program code further includes code to implement the method for monitoring operation integrity wherein the discarded data level is a first discarded data level and data levels not discarded are remaining data levels, and further comprising:

if, after discarding the first discarded data level, a number of the remaining data levels exceeds the determined number of data levels,
(a) determining which data level of the remaining data levels has a lowest maximum SLR;
(b) discarding the data level with the lowest maximum SLR; and
(c) repeating steps (a) and (b) until the number of the remaining data levels equals the determined number of data levels.

16. The non-transitory computer usable medium of claim 12, wherein the computer readable program code further includes code to implement the method for monitoring operation integrity, further comprising:

using a computer, determining whether a moveout attribute exists for each trace, wherein the moveout attribute comprises the maximum SLR and the location of the maximum SLR; and feeding the moveout attribute into the neural network analysis.

17. The non-transitory computer usable medium of claim 16, wherein the computer readable program code further includes code to implement the method for monitoring operation integrity wherein the moveout attribute further comprises, for each trace:

a maximum STSD value over the standard deviation of said each trace; and a location of the maximum STSD value.

18. The non-transitory computer usable medium of claim 12, wherein the computer readable program code further includes code to implement the method for monitoring operation integrity further comprising:

identifying noise spikes; and feeding the identified noise spikes into the neural network analysis.

19. A method of identifying an event during hydrocarbon production or fluid injection operations using microseismic data, comprising:

detecting microseismic waves in a subsurface area of operation using a seismic monitoring system;

receiving, from the seismic monitoring system, microseismic data representative of the microseismic waves;

determining, with a neural network analysis implemented on a computer, whether any portion of the microseismic data includes a noise event or a non-noise event; and for portions of the microseismic data including a non-noise event, classifying, with the computer, the event into at least one event category of a plurality of event categories;

wherein determining whether any portion of the microseismic data includes a noise event or a non-noise event comprises:

determining a number of data levels to be used in the neural network analysis; and for each dataset, adjusting a number of data levels associated with each dataset to match the determined number of data levels; each dataset being associated with a respective array of seismic receivers;

using the computer, determining whether a moveout attribute exists for each trace, wherein the moveout attribute comprises the maximum SLR and the location of the maximum SLR;

using the computer, identifying noise spikes; and feeding the moveout attribute and the identified noise spikes into the neural network analysis.

20. The method of claim 19, wherein the adjusting comprises:

adding data levels to the dataset, the added data levels having neutral data values or zeroed data values therein.

21. The method of claim 19, wherein the adjusting comprises discarding data levels in the dataset by calculating, for each trace of each data level, short-time (STSD) and long-time (LTSD) moving standard deviations of data in said each trace;

calculating, for each trace, STSD-to-LTSD ratios (SLR);

for each trace, identifying a maximum SLR and a location of the maximum SLR;

calculating, for each trace, a frequency threshold such that a predetermined portion of energy of said each trace is contained below the frequency threshold; and discarding a first data level if the frequency threshold is below a cutoff frequency for at least 50% of the traces in the data level, wherein data levels not discarded are remaining data levels;

if, after discarding the first discarded data level, a number of the remaining data levels exceeds the determined number of data levels,
  (a) determining which data level of the remaining data levels has a lowest maximum SLR;
  (b) discarding the data level with the lowest maximum SLR; and
  (c) repeating steps (a) and (b) until the number of the remaining data levels equals the determined number of data levels.

22. The method of claim 21, wherein the moveout attribute further comprises, for each trace:

a maximum STSD value over the standard deviation of said each trace; and a location of the maximum STSD value.

* * * * *